US00RE46385E

(19) United States
(12) Reissued Patent
Kawai et al.

(10) Patent Number: US RE46,385 E
(45) Date of Reissued Patent: May 2, 2017

(54) DRIVING CONTROL DEVICE AND OPERATION DEVICE

(71) Applicant: OLYMPUS CORPORATION, Hachioji-shi, Tokyo (JP)

(72) Inventors: Sumio Kawai, Tokyo (JP); Manabu Ichikawa, Tokyo (JP)

(73) Assignee: OLYMPUS CORPORATION, Tokyo (JP)

(21) Appl. No.: 14/848,588

(22) Filed: Sep. 9, 2015

Related U.S. Patent Documents

Reissue of:
(64) Patent No.: 8,665,539
Issued: Mar. 4, 2014
Appl. No.: 13/408,774
Filed: Feb. 29, 2012

U.S. Applications:
(62) Division of application No. 14/559,194, filed on Dec. 3, 2014, now Pat. No. Re. 45,856, which is an application for the reissue of Pat. No. 8,665,539.

(30) Foreign Application Priority Data

May 11, 2011 (JP) ..... 2011-106665
Oct. 12, 2011 (JP) ..... 2011-224834

(51) Int. Cl.
*G02B 7/02* (2006.01)
*G06F 3/01* (2006.01)
(Continued)

(52) U.S. Cl.
CPC ..... *G06F 3/016* (2013.01); *G02B 7/102* (2013.01); *G03B 3/10* (2013.01); *G03B 17/14* (2013.01);
(Continued)

(58) Field of Classification Search
CPC ..... G06F 3/016; G02B 7/102; G03B 3/10; G03B 17/14; G03B 2205/0061; G03B 2205/0046
(Continued)

(56) References Cited

U.S. PATENT DOCUMENTS 6,636,197 B1 10/2003 Goldenberg
6,917,867 B2 7/2005 Huang
(Continued)

FOREIGN PATENT DOCUMENTS

JP 2005-084194 A 3/2005
JP 2005-316394 11/2005
(Continued)

OTHER PUBLICATIONS

Japanese Office Action dated Sep. 2, 2014 for Japanese Patent Application No. 2011-224834.

*Primary Examiner* — Kenneth J Whittington
(74) *Attorney, Agent, or Firm* — Volpe and Koenig, P.C.

(57) ABSTRACT

A driving control device according to the present invention includes: a fixed member; an operation member arranged to be manually rotatable with respect to the fixed member; a transducer arranged in one of the fixed member and the operation member and arranged to come into contact with an opposed surface of the other of the fixed member and the operation member; a position detecting section for detecting a position of the operation member with respect to the fixed member; and an operation force amount control section for controlling driving of the transducer to change contact friction force generated when the transducer contacts with the fixed member or the operation member. The operation force amount control section controls the transducer such that the contact friction force applied to the operation member when the operation member is manually rotated with respect to the fixed member changes to a sense of click.

10 Claims, 35 Drawing Sheets

(51) Int. Cl.
*G03B 3/10* (2006.01)
*G02B 7/10* (2006.01)
*G03B 17/14* (2006.01)

(52) U.S. Cl.
CPC ..... *G03B 2205/0046* (2013.01); *G03B 2205/0061* (2013.01); *G03B 2217/18* (2013.01)

(58) Field of Classification Search
USPC ..... 348/345, 362, 363; 359/811, 819, 822, 359/823, 825, 826, 830; 396/72, 79, 131, 396/137, 144, 505, 529, 544
See application file for complete search history.

(56) References Cited

U.S. PATENT DOCUMENTS

| | | | | |
|---|---|---|---|---|
| 7,432,635 | B2 * | 10/2008 | Kawai | 310/323.17 |
| 8,013,847 | B2 | 9/2011 | Anastas | |
| 2003/0184518 | A1 | 10/2003 | Numata | |
| 2005/0219719 | A1 * | 10/2005 | Kawai | G02B 7/08 359/819 |
| 2006/0071917 | A1 | 4/2006 | Gomez | |
| 2006/0255683 | A1 | 11/2006 | Suzuki | |
| 2006/0274033 | A1 | 12/2006 | Ruettiger | |
| 2011/0273607 | A1 * | 11/2011 | Nonaka | G03B 13/10 348/333.08 |

FOREIGN PATENT DOCUMENTS

| | | | |
|---|---|---|---|
| JP | 2005-316394 | A | 11/2005 |
| WO | WO 2006/068114 | | 6/2006 |
| WO | WO 2006/068114 | A1 | 6/2006 |

* cited by examiner

Y
X
166
164
110
142
143
122a
122
PIEZOELECTRIC BODY INITIAL STATE
T0 (STATIONARY STATE)

PIEZOELECTRIC BODY EXPANDS
T1

PIEZOELECTRIC BODY INITIAL STATE
T2

PIEZOELECTRIC BODY CONTRACTS
T3

PIEZOELECTRIC BODY INITIAL STATE
T4

PIEZOELECTRIC BODY EXPANDS
T5

PIEZOELECTRIC BODY INITIAL STATE
T6

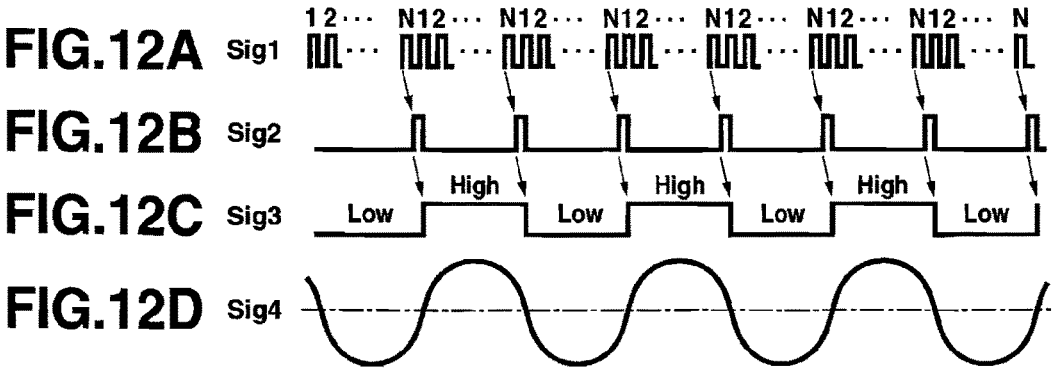
FIG.13
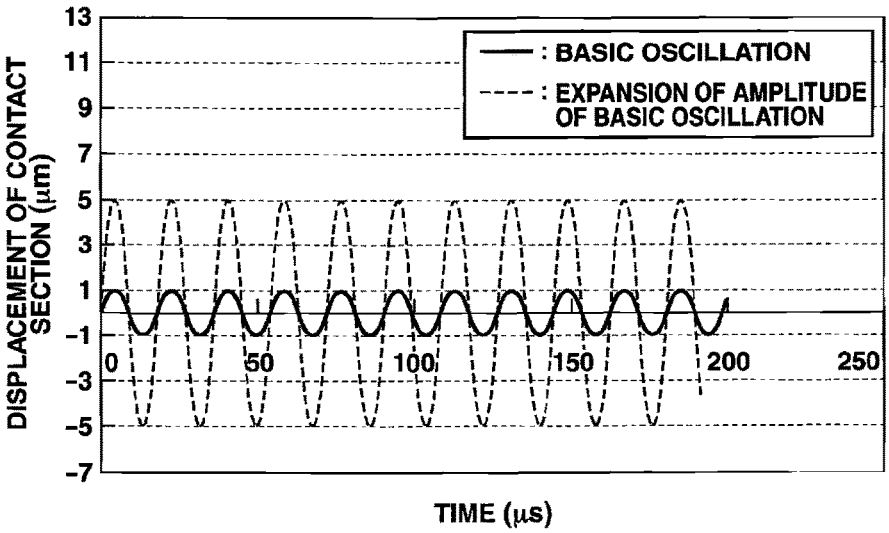

DRIVING CONTROL DEVICE AND OPERATION DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,665,539. The reissue application numbers are Ser. No. 14/559,194 and the present application.*

This application *is a divisional reissue application of U.S. patent application Ser. No. 14/559,194, filed on Dec. 3, 2014, which is a reissue application of U.S. patent application Ser. No. 13/408,774, filed on Feb. 29, 2012, which issued as U.S. Pat. No. 8,665,539 on Mar. 4, 2014, which* claims [the benefit of] *priority to* Japanese Patent Applications No. 2011-106665 filed in Japan on May 11, 2011, and No. 2011-224834 filed in Japan on Oct. 12, 2011, the contents of which are incorporated herein by this reference.

BACKGROUND OF THE INVENTION

1. Field of the Invention

The present invention relates to a driving control device that performs control such as a change of setting values according to manual operation of an operation member and an operation device that can give a sense of operation click to a manual operator through the control.

2. Description of the Related Art

There is known an interchangeable lens digital camera that is enabled to perform a change of setting values of the camera besides focus adjustment through manual operation of a focus ring. In such a digital camera, a user can change the setting values of the camera by manually rotating the focus ring in a state in which specific buttons provided in a camera body are set in advance. As setting items of the camera in changing the setting values of the camera, any one of setting items such as shutter speed, diaphragm, ISO sensitivity, white balance, and exposure correction is sequentially selected every time the user depresses the specific button in advance. Setting values of the selected setting items are changed according to manual rotation of the focus ring by the user. Display for informing the user of the change of the setting items or the setting values is also performed.

Concerning operability of the focus ring and other operation members, techniques concerning driving control devices and operation devices explained below are known.

For example, a technique disclosed in Japanese Patent Application Laid-Open Publication No. 2005-316394 is a technique that can change, in a moving device incorporated in a lens barrel section of a lens unit, contact friction of an operation ring and increase and decrease a rotation operation force amount in a wide range by arranging a transducer of an ultrasound actuator and controlling the transducer.

For example, a technique disclosed in International Publication No. 2006/068114 is a technique that can carry out, in a reproducing system including a rotator section operated by a user, rotation regulation for a click form in the rotator section with rotation torque by an electric motor and cause the rotator section to oscillate with an oscillation motor or a piezoelectric element.

SUMMARY OF THE INVENTION

A driving control device according to an aspect of the present invention includes: a fixed member; an operation member arranged to be manually rotatable with respect to the fixed member; a transducer arranged in one of the fixed member and the operation member and arranged to come into contact with an opposed surface of the other of the fixed member and the operation member; a position detecting section configured to detect a position of the operation member with respect to the fixed member; and an operation force amount control section configured to control driving of the transducer to change contact friction force generated when the transducer comes into contact with the fixed member or the operation member. The operation force amount control section controls the transducer such that the contact friction force applied to the operation member when the operation member is manually rotated with respect to the fixed member changes to a sense of click.

An operation device according to another aspect of the present invention include: a fixed member; an operation member arranged to be manually rotatable with respect to the fixed member; a load member arranged in the fixed member and configured to apply a predetermined load to the operation member when the operation member rotates; a transducer configured to frictionally come into contact with the load member in a state in which the transducer is pressed against the load member; a position detecting section configured to detect a relative position of the operation member with respect to the fixed member or the load member; an operation mode setting section configured to set an operation mode; and an operation sense control section configured to control oscillation applied to the load member by the transducer to thereby change a sense of operation obtained from the operation member when the operation member is rotationally operated. The operation sense control section causes the operation member to generate a sense of click corresponding to the set operation mode on the basis of an output from the position detecting section.

Benefits of the present invention will be further clarified from the following detailed explanation.

BRIEF DESCRIPTION OF THE DRAWINGS

FIG. 12A is a time chart showing a signal Sig1 outputted from a clock generator of a microcomputer for lens to an N-ary counter of a voltage control circuit in the piezoelectric body control circuit shown in FIG. 11;

FIG. 12B is a time chart showing a signal Sig2 outputted from the N-ary counter to a ½ frequency dividing circuit in the piezoelectric body control circuit shown in FIG. 11;

FIG. 12C is a time chart showing a signal Sig3 outputted from the ½ frequency dividing circuit to an inverter and a MOS transistor Q01 in the piezoelectric body control circuit shown in FIG. 11;

FIG. 12D is a time chart showing a signal Sig4 outputted from a secondary side of a transformer to the piezoelectric body in the piezoelectric body control circuit shown in FIG. 11;

FIG. 13 is a graph showing a state in which oscillation amplitude is changed by the voltage control circuit;

DETAILED DESCRIPTION OF THE PREFERRED EMBODIMENT

First Embodiment

First, a configuration of a digital camera to which a driving control device according to a first embodiment of the present invention is applied is explained below mainly with reference to FIG. 1.

Figure 1:
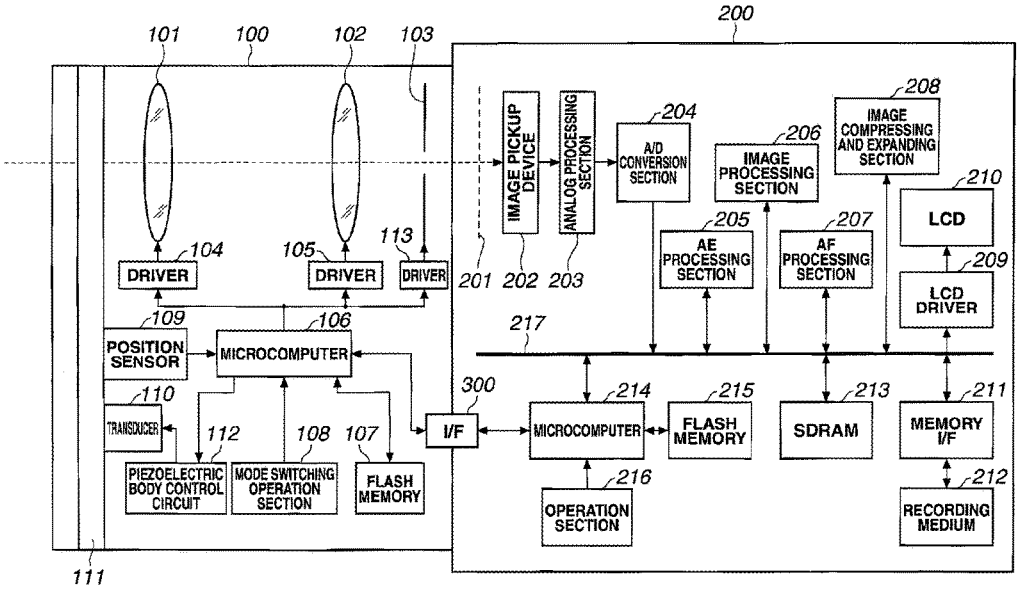
FIG. 1 is a block configuration diagram showing a schematic configuration of a digital camera to which a driving control device according to a first embodiment of the present invention is applied.

The digital camera shown in FIG. 1 includes an interchangeable lens barrel 100 and a camera main body 200, which are connected to be capable of communicating with each other via an interface (I/F) 300.

The interchangeable lens barrel 100 includes a focus lens 101, a zoom lens 102, a diaphragm mechanism 103, drivers 104, 105, and 113, a microcomputer for lens 106, a flash memory 107, a mode switching operation section 108, a position sensor 109, a transducer 110, an operation ring 111, and a piezoelectric body control circuit 112.

The position sensor 109 is an example of a position detecting section (position detecting means). The microcomputer for lens 106 and the microcomputer for main body 214 are examples of operation force amount control means (an operation force amount control section).

The camera main body 200 includes a mechanical shutter 201, an image pickup device 202, an analog processing section 203, an analog/digital conversion section (hereinafter referred to as "A/D conversion section") 204, an AE processing section 205, an image processing section 206, an AF processing section 207, an image compressing and expanding section 208, an LCD driver 209, an LCD 210, a memory interface (hereinafter referred to as "memory I/F") 211, a recording medium 212, an SDRAM 213, the microcomputer for main body 214, a flash memory 215, an operation section 216, a bus 217, and a power supply circuit (not shown).

A detailed configuration of the interchangeable lens barrel 100 is explained.

The focus lens 101 condenses an optical image of a subject on the image pickup device 202. The zoom lens 102 varies magnification of the optical image of the subject. In the interchangeable lens barrel 100, naturally, the focus lens 101 may be configured to operate during a magnification varying operation for varying the magnification of the optical image.

The microcomputer for lens 106 is connected to the drivers 104, 113, and 105, the I/F 300, the flash memory 107, the mode switching operation section 108, the position sensor 109, and the piezoelectric body control circuit 112.

The microcomputer for lens 106 performs reading and writing of information stored in the flash memory 107 and controls the drivers 104, 105, and 113 and the piezoelectric body control circuit 112.

The microcomputer for lens 106 communicates with the microcomputer for main body 214 via the I/F 300, transmits various kinds of information to the microcomputer for main body 214, and receives various kinds of information from the microcomputer for main body 214. For example, the microcomputer for lens 106 transmits information corresponding to an output signal of the mode switching operation section 108 and information corresponding to an output signal (a detection signal) of the position sensor 109 to the microcomputer for main body 214. For example, the microcomputer for lens 106 receives control information for the piezoelectric body control circuit 112 from the microcomputer for main body 214.

The microcomputer for lens 106 further controls the piezoelectric body control circuit 112 on the basis of the control information received from the microcomputer for main body 214. Further, the microcomputer for lens 106 controls the piezoelectric body control circuit 112 on the basis of an output signal of the mode switching operation section 108 and an output signal of the position sensor 109.

The driver 104 receives an instruction of the microcomputer for lens 106 and drives the focus lens 101 to perform a change of a focus position. The driver 105 receives an instruction of the microcomputer for lens 106 and drives the zoom lens 102 to perform a change of a focal length. The driver 113 receives an instruction of the microcomputer for lens 106 and drives the diaphragm mechanism 103. The diaphragm mechanism 103 is a mechanism unit for adjusting an amount of light of a subject and an amount of blur of a subject image.

The piezoelectric body control circuit 112 drives the transducer 110 (specifically, a piezoelectric body included in the transducer 110) under control by the microcomputer for lens 106.

The mode switching operation section 108 is an operation member for instructing an operation mode of the operation ring 111. Every time the mode switching operation section 108 which is the operation member is pressed, the microcomputer for lens 106 (or the microcomputer for main body 214) sequentially switches setting of the operation mode of the operation ring 111 to any one of a focus mode, a zoom mode, a photographing mode, an ISO sensitivity mode, a shutter speed mode, a diaphragm mode, a white balance mode, and an art mode (ART-mode; an operation mode in which plural kinds of image processing for performing, for example, conversion of a photographed image into a monochrome image, a picture-like image, or the like). As explained later in detail, the operation ring 111 is disposed to be fitted to, for example, an outer circumference of the interchangeable lens barrel 100 to be rotatable about an optical axis. The operation ring 111 is configured to be rotatable by manual operation by the user.

The operation ring 111 may be formed of a rotary dial member or a slide lever member provided on the camera main body 200 side. When the operation member is provided on the camera main body 200 side, operation information of the operation member is inputted to and outputted from the microcomputer 106 on the interchangeable lens barrel 100 side through the I/F 300 according to necessity.

The transducer 110 receives a control signal from the piezoelectric body control circuit 112 and controls rotation resistance of the operation ring 111. In other words, the transducer 110 is controlled by the microcomputer for lens 106 via the piezoelectric body control circuit 112. As explained in detail later, the transducer 110 includes, for example, a stacked piezoelectric body and a contact body (see FIGS. 6 to 8).

The position sensor 109 detects a rotation amount and a rotating direction of the operation ring 111 and outputs a detection signal of the rotation amount and the rotating direction to the microcomputer for lens 106. As explained in detail later, the position sensor 109 includes, for example, a GMR element (giant magneto-resistance element) provided to be opposed to a magnetic scale provided on an inner circumference side of the operation ring 111.

A schematic configuration of the camera main body 200 is explained.

The mechanical shutter 201 receives an instruction of the microcomputer for main body 214 to be driven and controls time for exposing a subject to the image pickup device 202.

The image pickup device 202 is an image pickup device formed by arranging a color filter of a Bayer array on front surfaces of photodiodes forming pixels. The Bayer array includes a line on which R pixels and G (Gr) pixels are alternately arranged in a horizontal direction and a line on which G (Gb) pixels and B pixels are alternately arranged in the horizontal direction. The Bayer array is configured by alternately arranging the two lines in a vertical direction. The image pickup device 202 receives, with the photodiodes forming the pixels, light condensed by the focus lens 101 and the zoom lens 102 and photoelectrically converts the light to output an amount of the light to the analog processing section 203 as a charge amount. The image pickup device 202 may be an image pickup device of a CMOS type or a CCD type. The image pickup device 202 is not limited to the Bayer array. For example, an image pickup device of a stacked type or an image pickup device further including the analog processing section 203 and the A/D conversion section 204 explained layer may be applied.

The analog processing section 203 applies, after reducing reset noise, waveform shaping to an electric signal (an analog image signal) read out from the image pickup device 202 and further applies gain-up processing to obtain target brightness.

The A/D conversion section 204 converts the analog image signal outputted from the analog processing section 203 into a digital image signal (hereinafter referred to as image data).

The bus 217 is a transfer path for transferring various data generated in the digital camera to the sections in the digital camera. The bus 217 is connected to the AE processing section 205, the image processing section 206, the AF processing section 207, the image compressing and expanding section 208, the LCD driver 209, the memory I/F 211, the SDRAM 213, and the microcomputer for main body 214.

Image data outputted from the A/D conversion section 204 is once stored in the SDRAM 213 via the bus 217.

The SDRAM 213 is a storing section in which various data such as image data obtained in the A/D conversion section 204 and image data processed in the image processing section 206 and the image compressing and expanding section 208 are temporarily stored.

The image processing section 206 applies various kinds of image processing to image data read out from the SDRAM 213. The image data subjected to the processing by the image processing section 206 is stored in the SDRAM 213.

The AE processing section 205 calculates subject luminance from image data. Data for calculating the subject luminance may be an output of an exclusive light measurement sensor. The AF processing section 207 extracts a signal of a high-frequency component from the image data and acquires a focusing evaluation value through AF (Auto Focus) integration processing.

The image compressing and expanding section 208 performs compression of image data by a predetermined compression system and expansion (decompression) of the image data compressed by the predetermined compression system. For example, if image data to be treated is a still image, the image compressing and expanding section 208 performs compression and expansion by a JPEG system or the like. If image data to be treated is a moving image, the image compressing and expanding section 208 performs compression and expansion by a Motion-JPEG system, a H.264 system, or the like. When image data related to a still image is recorded, the image compressing and expanding section 208 reads out image data from the SDRAM 213, compresses the read-out image data according to, for example, a JPEG compression system, and once stores compressed JPEG image data in the SDRAM 213. The microcomputer for main body 214 adds a JPEG header necessary for forming a JPEG file to the JPEG image data stored in the SDRAM 213 to create a JPEG file and records the created JPEG file in the recording medium 212 via the memory I/F 211. The recording medium 212 is, for example, a recording medium including a memory card detachably attachable to the camera main body 200. However, the recording medium 212 is not limited to this recording medium.

The LCD driver 209 causes the LCD 210 to display an image. The display of the image includes rec-view display processing for displaying image data immediately after photographing for a short time and display of a moving image such as reproduction display of the JPEG file recorded in the recording medium 212 and live view display. When the JPEG file recorded in the recording medium 212 is reproduced, the image compressing and expanding section 208 reads out the JPEG file recorded in the recording medium 212 and applies decompression processing (expansion processing) to the JPEG file and then causes the SDRAM 213 to once store the decompressed image data. The LCD driver 209 reads out the decompressed image data from the SDRAM 213 and converts the read-out image data into a video signal. Thereafter, the LCD driver 209 outputs the video signal to the LCD 210 and performs display of an image.

The microcomputer for main body 214 collectively controls various sequences of the camera main body 200. The operation section 216 and the flash memory 215 are connected to the microcomputer for main body 214.

The operation section 216 includes operation members such as a power button, a release button, a playback button, a menu button, a moving image button, and various input keys. When the user operates any one of the operation members of the operation section 216, the microcomputer for main body 216 executes various sequences corresponding to the operation by the user. The power button is an operation member for performing instruction of turn-on and turn-off of a power supply for the digital camera. If the power button is pressed, the microcomputer for main body 214 turns on or off the power supply for the digital camera.

The release button includes two-stage switches: a first release switch and a second release switch. When the release button is half-pressed and the first release switch is turned on, the microcomputer for main body 214 performs a photographing preparation sequence such as AE processing, AF processing. When the release button is fully pressed and the second release switch is turned on, the microcomputer for main body 214 executes a photographing sequence and performs photographing.

The playback button is an operation member for performing a playback instruction for a file recorded in the recording medium 212. When the playback button is pressed, the microcomputer for main body 214 executes a playback sequence and performs playback.

The menu button is an operation member for performing a display instruction for a menu for enabling a change of camera setting. When the menu button is pressed, the microcomputer for main body 214 executes a camera setting sequence and performs menu display or the like.

The moving image button is an operation member for performing a moving image photographing instruction. When the moving image button is pressed, the microcomputer for main body 214 executes a moving image photographing sequence and performs moving image photographing.

The flash memory 215 has stored therein, for example, various parameters necessary for operation of the digital camera such as a white balance gain corresponding to a white balance mode, a low-pass filter coefficient, and the like and a manufacturing number for specifying the digital still camera. The flash memory 215 has also stored therein various computer programs executed by the microcomputer 214. The microcomputer 214 executes respective kinds of processing according to a computer program stored in the flash memory 215 or by reading parameters necessary for various sequences from the flash memory 215.

A specific configuration example of the interchangeable lens barrel 100 is explained and a specific configuration for realizing operability corresponding to an operation mode in the operation ring 111 is explained in detail below.

Figure 2:
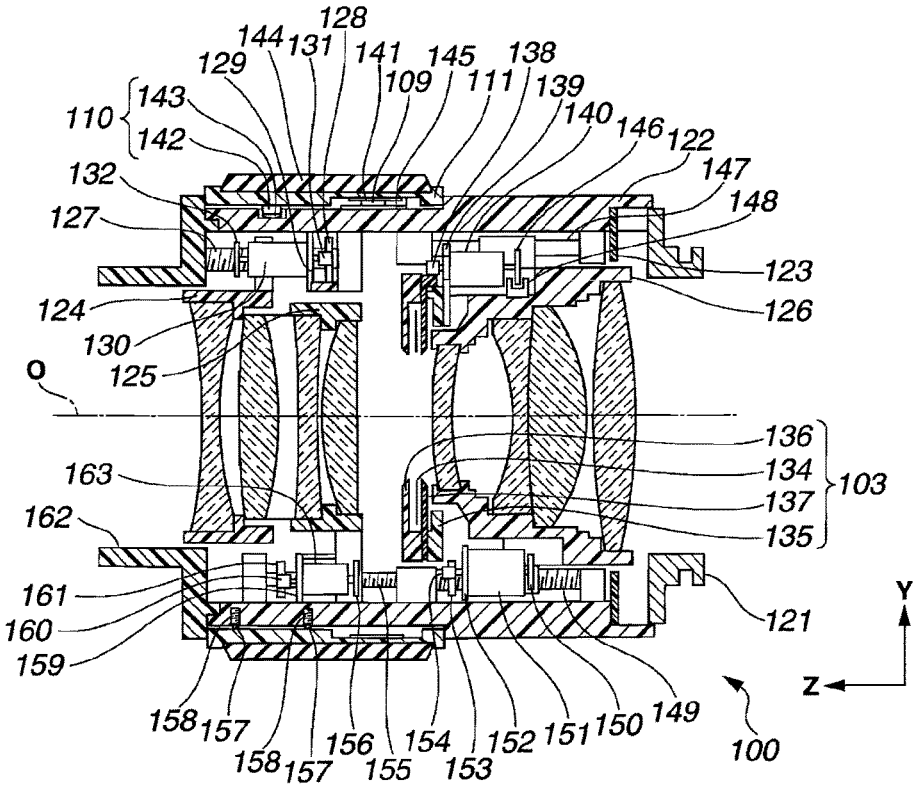
FIG. 2 is a sectional view showing a schematic configuration of a lens barrel applied to the digital camera shown in FIG. 1.
Figure 3:
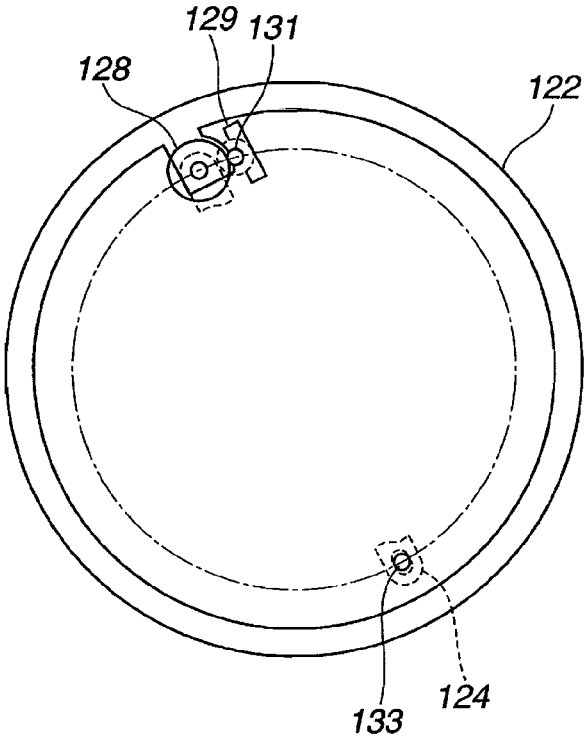
FIG. 3 is a diagram for explaining a mechanism for driving a first group frame in the lens barrel shown in FIG. 2 and is a diagram of main components of the lens barrel viewed from a subject side.

FIG. 2 is a sectional view showing an overview of the interchangeable lens barrel 100. FIG. 3 is a diagram of main components viewed from the subject side for explaining a mechanism for driving a first group frame 124 of the lens barrel shown in FIG. 2. The subject side of the interchangeable lens barrel 100 is referred to as front and the camera main body side is referred to as rear.

The interchangeable lens barrel 100 includes the first group frame 124 that holds two lenses from the front, a second group frame 125 that holds the next two lenses, and a third group frame 126 that holds the remaining four lenses and holds the diaphragm mechanism 103.

A so-called bayonet type mount member 121 for attachment to the camera main body 200 (not shown) is provided at a rear end of the interchangeable lens barrel 100. The mount member 121 is fixed to the fixed frame 122 by screws or the like. A not-shown electric signal terminal is provided in the mount member 121. When the interchangeable lens barrel 100 is mounted on the camera main body 200, the interchangeable lens barrel 100 is electrically connected to an electric board 123. Electric communication and power supply are performed between the camera main body 200 and the interchangeable lens barrel 100.

Each of driving mechanisms in the first group frame 124, the second group frame 125, and the third group frame 126 includes the same mechanism. Therefore, only the driving mechanism for the first group frame 124 is explained below.

One end of a first group feed screw 127 having a shaft shape, in which a lead screw is formed, fits in a hole of an inner circumference side projecting portion of the fixed frame 122. The other end of the first group feed screw 127 fits in a hole of the front fixed frame 162 fixed to the fixed frame 122. The first group feed screw 127 is held to be rotatable about an axis parallel to an optical axis O.

A first group screw gear 128 is firmly fixed to a rear end of the first group feed screw 127 by caulking, press-fitting, or the like. On the other hand, a first group motor 130 integral with a first motor table 129 having a tabular shape is fixed to another projecting portion of the fixed frame 122 by screws or the like. A first group motor gear 131 is fixed to one end of a rotating shaft of the first group motor 130 by press-fitting or the like. The first group screw gear 128 meshes with the first group motor gear 131. A first group position detection vane 132, in which plural slits are provided radially with respect to a center of the rotating shaft, is fixed to the other end of the rotating shaft of the first group motor 130 by press-fitting or the like.

A female screw that fits with the first group feed screw 127 is formed in a projection provided on an outer circumference side of the first group frame 124. A first group guide shaft 133 (not shown in FIG. 2), both ends of which are fixed to a projecting portion on the inner circumference side of the fixed frame 122, set in parallel to the optical axis O is held on an opposite side (see FIG. 3) of a setting position of the first group feed screw 127 with respect to the optical axis O. The first group guide shaft 133 fits in a long hole formed in the projection provided on the outer circumference of the first group frame 124 and extending in a radial direction with respect to the optical axis O. The first group guide shaft 133 is positioned in the fixed frame 122 and held by screw fitting with the first group feed screw 127.

Operation of the first group frame 124 is explained. When the first group motor 130 is rotated, the first group screw gear 128 meshing with the first group motor gear 131 rotates and the first group feed screw 127 integral with the first group screw gear 128 rotates. Then, force for rotation about the rotating shaft of the first group feed screw 127 acts on the first group frame 124 meshing with the first group feed screw 127. However, since the rotation of the first group frame 124 is stopped by the first group guide shaft 133, the first group frame 124 moves in a direction of the optical axis O by a screw pitch of the first group feed screw 127 according to one rotation of the first group feed screw 127. At this point, the first group feed screw 127 and the first group guide shaft 133 are respectively pressed by not-shown springs or the like to eliminate a backlash caused in a portion of the first group feed screw 127 and a backlash caused in a portion of the first group guide shaft 133 such that the rotation of the first group motor 130 is surely transmitted to the first group frame 124. With such a configuration, it is possible to accurately detect a position of the first group frame 124 by detecting the rotation of the motor shaft with the first group position detection vane 132 attached to the other end of the motor shaft.

The diaphragm mechanism 103 includes diaphragm vanes 134, a diaphragm table 135 rotatable around the optical axis, a diaphragm plate 137 held by a diaphragm cap 136, and a mechanism of a cam and a pin provided between the diaphragm plate 137 and the plural diaphragm vanes 134. With this mechanism, when the diaphragm plate 137 rotates, the plural diaphragm vanes 134 simultaneously operate along the cam and form a so-called iris diaphragm for stopping down an opening of the diaphragm cap 136. A gear is provided in an outer circumference side projecting portion of the diaphragm plate 137. A diaphragm motor gear 138 attached to one end of the motor shaft meshes with the gear.

Therefore, when a diaphragm motor 140 attached to the diaphragm table 135 via a diaphragm motor table 139 rotates, the diaphragm plate 137 rotates to make it possible to change a size of the iris diaphragm formed by the diaphragm vanes 134.

The operation ring 111 is explained. The operation ring 111 fits in an outer circumference of the fixed frame 122 to be rotatable about the optical axis. A cylindrical scale 141 is provided on the inner circumference side of the operation ring 111. The scale 141 is a magnetic scale in which N poles and S poles are alternately arranged in a belt shape (a width direction of the belt is the optical axis direction) in a circumferential direction at an equal pitch. A position sensor 109 is provided on the outer circumference of the fixed frame 122 to be opposed to the scale 141. The position sensor 109 is, for example, a GMR element (giant magnetoresistance element). Resistance of the position sensor 109 changes according to a change in a magnetic field of the scale 141. The position sensor 109 outputs a relative position change relative to the scale 141 as fluctuation in a voltage signal. It is possible to manually control the frames by controlling the motors according to this electric signal. Manual or automatic (e.g., autofocus) can be set by operation of an operation member (not shown in FIG. 2) included in the operation section 216 of the camera main body 200. Alternatively, it is also possible to provide an operation member such as a button, a lever, or a dial in the interchangeable lens barrel 100 and sets the manual or automatic by operating the operation member.

The motors and the position sensors are electrically connected to the electric board 123, on which main circuits of a photographing lens are mounted, through a flexible printed circuit board and controlled by the microcomputer for lens 106 mounted on the electric board 123.

The motors explained above are rotating electromagnetic motors. However, piezoelectric motors including piezoelectric bodies may be used or linear motors that directly operate in the optical axis direction may be used. If stepping motors are used as the motors, position detectors for the motors are unnecessary.

For detection of positions of the frames, a method of detecting, with a photointerrupter, position detection vanes attached to the motors is adopted. However, for example, a magnetic detection system employing GMR or a Hall element may be adopted or an electrostatic system for detecting a change in capacitance may be adopted. Further, a method of directly detecting movement of the frames rather than detecting the rotation of the motors may be adopted. Although not described herein, if a position detector for detecting an origin position of a position is set and operation for checking the origin position in a predetermined state is performed, it is possible to perform the position detection more accurately. Concerning position detection for the operation ring 111, an optical detector may be used or an electrostatic detector may be used rather than a magnetic detector.

A transducer 110 that controls rotation resistance of the operation ring 111 includes a stacked piezoelectric body 142 and a contact body 143 provided at one end. One end of the transducer 110 is fixed to the fixed frame 122. The fixed frame 122 is an example of a fixed member in which the transducer 110 is arranged. A distal end surface of the contact body 143 is pressed against and in contact with a cylindrical surface on the inner circumference side of the operation ring 111. In a state in which a voltage is not applied to the piezoelectric body 142, the contact body 143 generates friction force to keep relative positions of the operation ring 111 and the fixed frame 122. Therefore, for example, when the operation ring 111 is not manually operated, it is possible to set the transducer 110 in a non-driven state and fix and hold the operation ring 111 with frictional contact force. When the piezoelectric body 142 is caused to generate a frequency voltage, the transducer 110 oscillates in the radial direction with respect to the optical axis of the interchangeable lens barrel 100 and reduces friction force. When the supply of the frequency voltage to the piezoelectric body 142 is stopped, friction force is generated between the operation ring 111 and the fixed frame 122, an operation force amount of the operation ring 111 conspicuously increases, and resistance increases. Therefore, it is possible to generate a sense of click in the operation ring 111 by repeating the supply and the stop of the frequency voltage. It is possible to change the friction force equivalent to a click force amount, which is the resistance, by changing the oscillation amplitude of the transducer 110 by controlling a voltage applied to the piezoelectric body 142. It is also possible to control the click force amount. When a frequency of the frequency voltage is set to a predetermined value, the transducer 110 resonates and can generate extremely large oscillation amplitude. The friction force can be reduced to extremely small. At this point, it is possible to change the oscillation amplitude by slightly changing the frequency from a resonant frequency. It is also possible to change the friction force by changing the frequency.

In FIG. 2, other reference numerals denote members as explained below.

Reference numeral 144 denotes rubber provided in the operation ring 111 as slip resistance. Reference numeral 145 denotes a flexible printed circuit board. Reference numeral 146 denotes a diaphragm position detection vane. Reference numeral 147 denotes a third group guide shaft. Reference numeral 148 denotes a diaphragm position detector. Reference numeral 149 denotes a third group feed screw. Reference numeral 150 denotes a third groups detection vane. Reference numeral 151 denotes a third group motor. Reference numeral 152 denotes a third group motor table. Reference numeral 153 denotes a third group screw gear. Reference numeral 154 denotes a third group motor gear. Reference numeral 155 denotes a second group feed screw. Reference numeral 156 denotes a second group position detection vane. Reference numeral 157 denotes balls. Reference numeral 158 denotes a spring. Reference numeral 159 denotes a second group motor table. Reference numeral 160 denotes a second group motor gear. Reference numeral 161 denotes a second group screw gear. Reference numeral 162 denotes a front fixed frame. Reference numeral 163 denotes a second group motor.

A configuration related to the operation ring 111 shown in FIGS. 2 and 3 can be modified as explained below.

Figure 4:
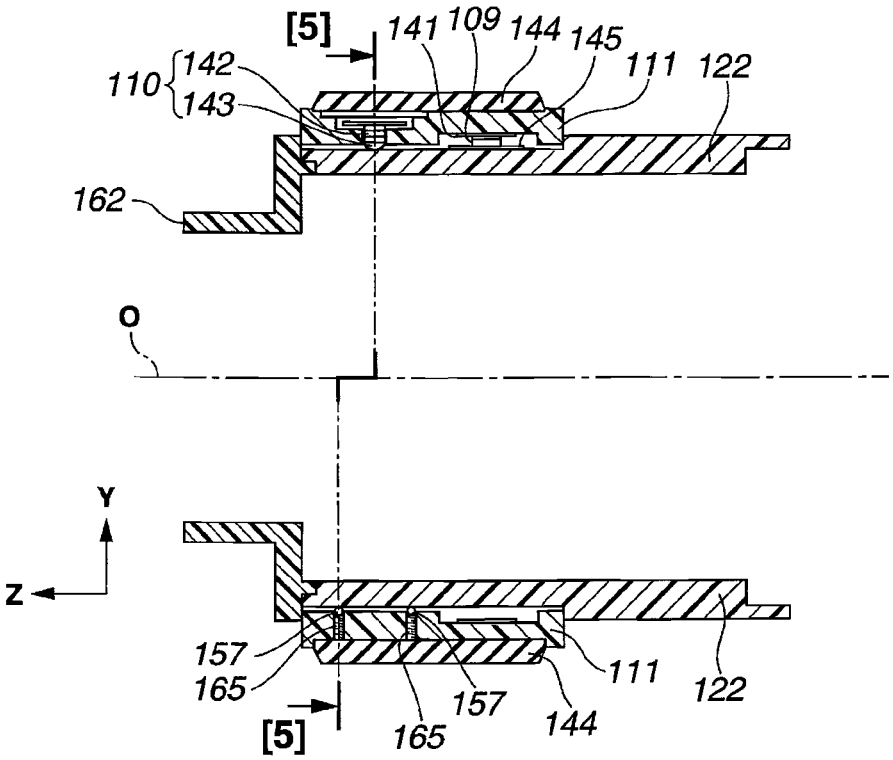
FIG. 4 is a diagram showing a modification of a configuration related to an operation ring in the lens barrel shown in FIG. 2.
Figure 5:
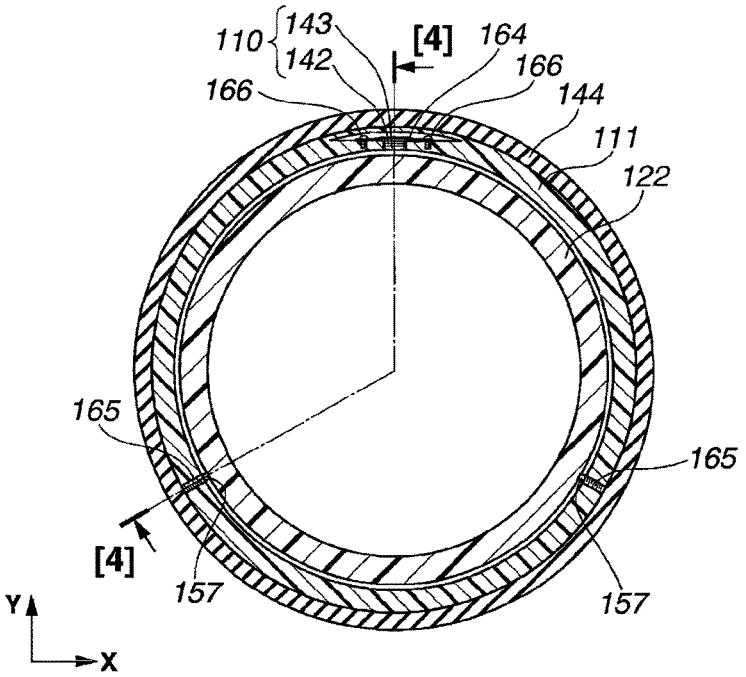
FIG. 5 is a sectional view taken along line [5]-[5] in FIG. 4.

FIG. 4 is a diagram showing a modification of the configuration related to the operation ring 111 and shows only a portion equivalent to a portion including the operation ring 111 in FIG. 2. FIG. 5 is a sectional view taken along line [5]-[5] in FIG. 4. FIG. 4 is a sectional view taken along line [4]-[4] in FIG. 5.

The modification shown in FIGS. 4 and 5 is different from the configuration shown in FIGS. 2 and 3 in that the transducer 110 is arranged on the operation ring 111 side via a pressing spring 164, which is a leaf spring for generating pressing force.

As shown in FIG. 5, on a circumference of the operation ring 111, holes for respectively holding balls 157 are provided in places about 120° from the transducer 110. Screws 165 for pressing the balls 157 in the optical axis direction are respectively screwed in the holes. Therefore, it is possible to adjust pressing force for pressing the transducer 110 against the fixed frame 122 by adjusting a pressing amount of the screws 165.

Figure 6:
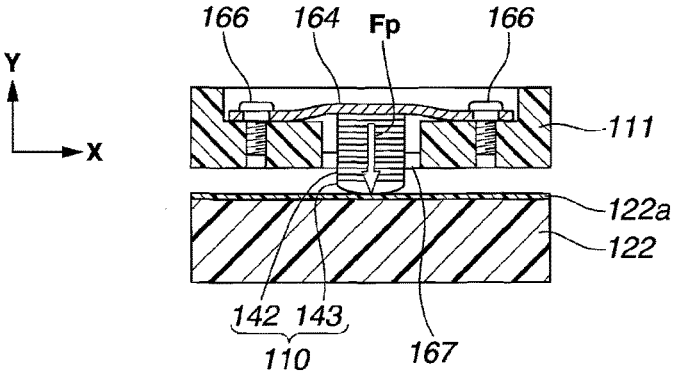
FIG. 6 is a partially enlarged sectional view of a holding section for a transducer in the lens barrel shown in FIG. 2.

As shown in FIG. 6 as well, an end face of the transducer 110 is bonded and fixed to a flat portion provided in a center of the pressing spring 164. The pressing spring 164 is fixed by screws 166 in two places in a circumferential tangential direction. When the operation ring 111 rotates one or more times, a slide conductive piece is provided between the fixed frame 122 and the operation ring 111, the operation ring 111 is brought into contact with a conductive pattern forming a cylindrical surface, and an electric signal is supplied to the piezoelectric body 142.

FIG. 6 is a partially enlarged view of a holding section for the transducer 110 shown in FIGS. 4 and 5. On the contact body 143 side of the transducer 110, rubber 167 formed of a member having oscillation attenuation properties is firmly fixed to an inner circumference of a hole provided in the operation ring 111. The rubber 167 is formed of, for example, elastomer such as urethane, a rubber member, soft resin such as polyacetar resin, cork, or felt. The rubber 167 is formed to be easily deformed in the pressing direction not to hinder oscillation of the transducer 110 in the pressing direction. On the other hand, in a direction orthogonal to the pressing direction, the rubber 167 is formed to surround the piezoelectric body 142 to prevent a position thereof from fluctuating. In a portion of the fixed frame 122 with which the contact body 143 is brought into contact, a sliding section 122a applied with coating to reduce roughness of a surface thereof and prevent friction with the contact body 143 is formed. When the coating is resin such as PTFE (polytetrafluoro-ethylene) or a material having high slidability such as diamond-like carbon, stable contact is obtained. Even if the operation ring 111 is rotated relatively to the fixed frame 122 in a state in which the transducer 110 is not oscillating, it is possible to suppress the contact body 143 and the sliding section 122a from wearing. When the sliding section 122a is formed of the material explained above, a material of the contact body 143 is desirably a material formed of a relatively hard material such as ceramics or metal to suppress roughness of a surface of the contact body 143. The material of the contact body 143 may be resin or the like and the sliding section 122a may be formed of a hard material such as metal.

Figure 7:
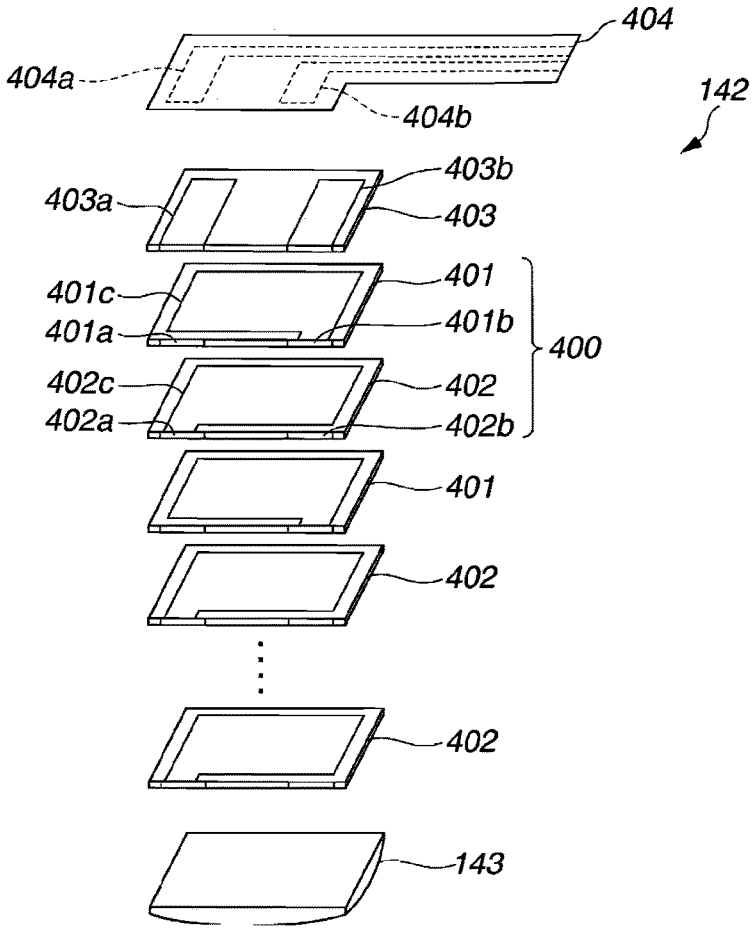
FIG. 7 is a disassembled perspective view showing a schematic configuration of a piezoelectric body that forms the transducer in the lens barrel shown in FIG. 2.
Figure 8:
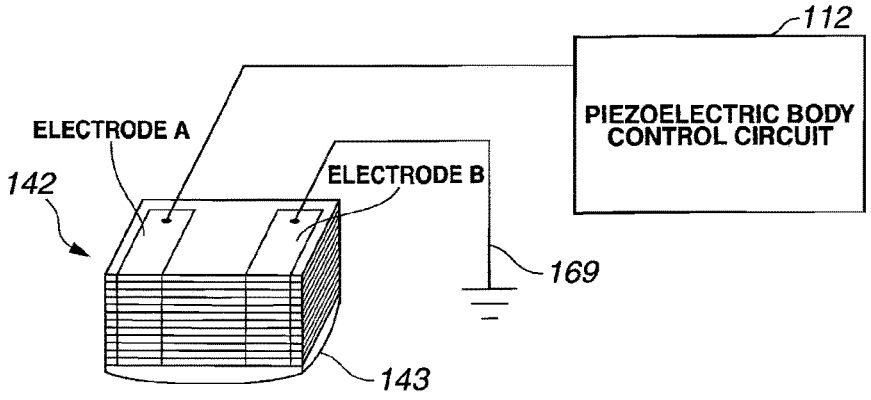
FIG. 8 is an assembly diagram showing a schematic configuration of the piezoelectric body shown in FIG. 7.

FIGS. 7 and 8 show the configuration of the piezoelectric body 142 forming the transducer 110. FIG. 7 is a disassembled perspective view showing details of the piezoelectric body 142. The piezoelectric body 142 is formed of a stacked piezoelectric body formed by stacking a large number of piezoelectric body single plates formed of piezoelectric ceramics such as lead titanate zirconate. As a basic configuration (reference numeral 400) of the piezoelectric body 142, a piezoelectric body plate A 401 having a rectangular plate shape, on a surface on one side of which an electrode C 401c functioning as an internal electrode is formed, and a piezoelectric body plate B 402 having a rectangular plate shape, on a surface on one side of which an electrode C 402c functioning as an internal electrode is formed, form a pair. A plurality of the pairs are stacked.

The electrodes C 401c and C 402c are drawn out to side surface positions different from each other. The internal electrodes are connected to every other piezoelectric body plates by electrodes A 401a and A 402a and electrodes B 401b and B 402b formed on side surfaces of a piezoelectric body obtained by stacking the piezoelectric body plates A 401 and B 402 and further stacking a piezoelectric body plate C not including an internal electrode and baking the piezoelectric body plates. Two electrodes A 403a and B 403b are formed on a surface of the piezoelectric body plate C 403 on an outermost surface.

In FIG. 7, an example in which the plural piezoelectric body single plates are stacked is shown. However, the same configuration can also be obtained by manufacturing the piezoelectric body 142 in a form in which the piezoelectric body single plates are folded. In FIG. 7, reference numeral 404 denotes a flexible printed circuit board. Reference numeral 404a denotes a pattern A of the flexible printed circuit board 404. Reference numeral 404b denotes a pattern B of the flexible printed circuit board 404.

In the stacked piezoelectric body 142 formed in this way, when a high voltage is applied between the electrode A 403a and the electrode B 403b, the piezoelectric body plates A and B are polarized in the same direction in a plate thickness direction. Therefore, when one of the electrodes A and B of the piezoelectric body 142 polarized as shown in FIG. 8 is connected to a ground 169 of the piezoelectric body control circuit 112 and a signal output terminal of the piezoelectric body control circuit 112 is connected to the other to apply a frequency voltage to the piezoelectric body 142, the piezoelectric body 142 expands and contracts in the plate thickness direction.

Figures 9A, 9B, 9C, 9D, 9E, 9F, 9G:
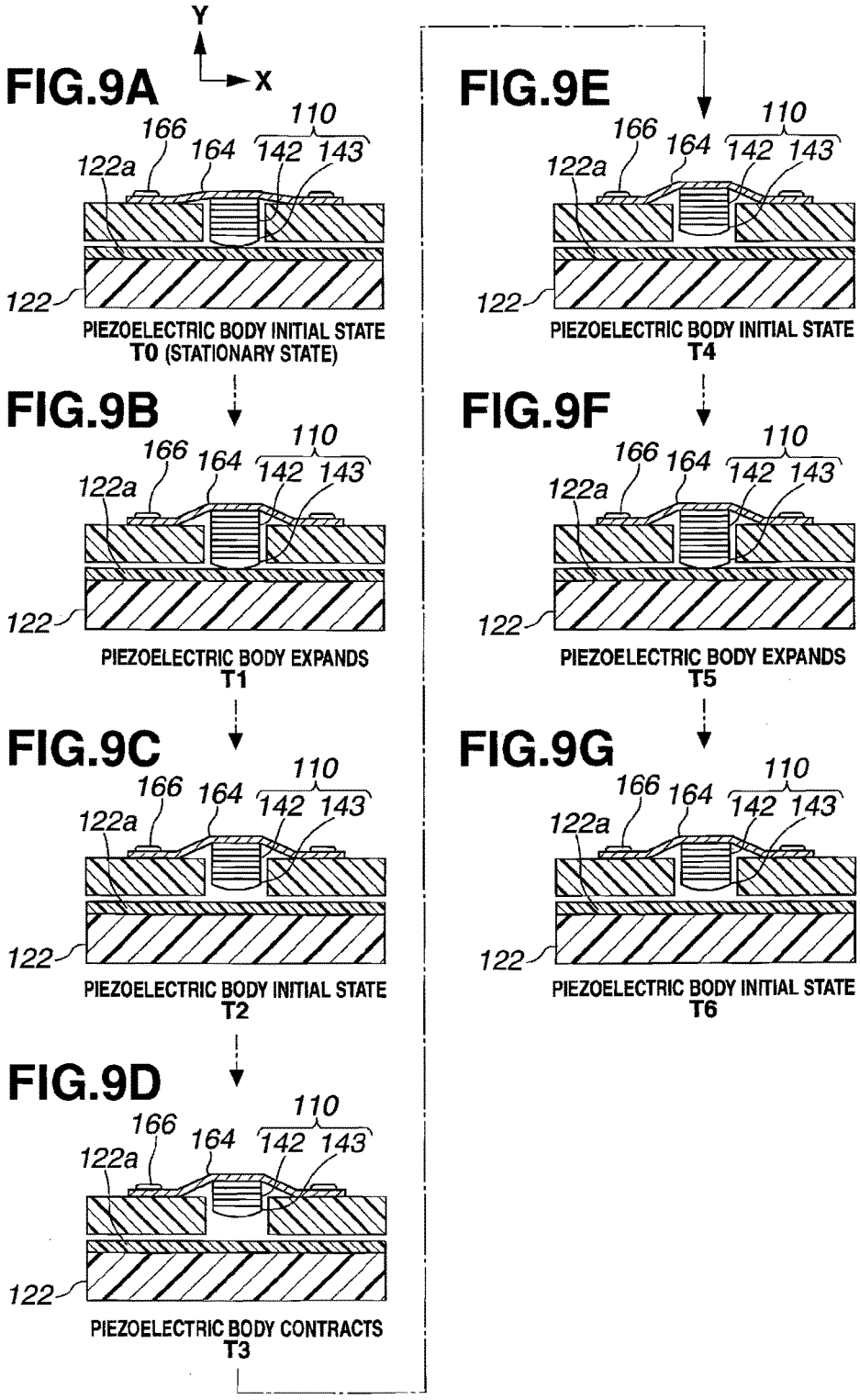
FIG. 9A is a diagram showing a state in which a fixed frame and the transducer are in an initial state (a stationary state) among states of the fixed frame and the transducer in applying a frequency voltage to the piezoelectric body shown in FIG. 8 to cause the piezoelectric body to oscillate.
FIG. 9B is a diagram showing a state in which a maximum voltage is applied to the piezoelectric body and the piezoelectric body expands to the maximum after the state shown in FIG. 9A.
FIG. 9C is a diagram showing a state in which the piezoelectric body contracts and returns to the initial state after the state shown in FIG. 9B (after maximum deformation)
FIG. 9D is a diagram showing a state in which a maximum voltage in a direction for contracting the piezoelectric body is applied to the piezoelectric body after the state shown in FIG. 9C.
FIG. 9E is a diagram showing a state in which the applied voltage to the piezoelectric body is reduced to zero and the piezoelectric body returns to the initial state after the state shown in FIG. 9D.
FIG. 9F is a diagram showing a state in which a voltage in a direction for expanding the piezoelectric body is applied to the piezoelectric body and the piezoelectric body expands again after the state shown in FIG. 9E.
FIG. 9G is a diagram showing a state in which a voltage in a direction for contracting the piezoelectric body is applied to the piezoelectric body and the piezoelectric body returns to the initial state again after the state shown in FIG. 9F.
Figure 10:
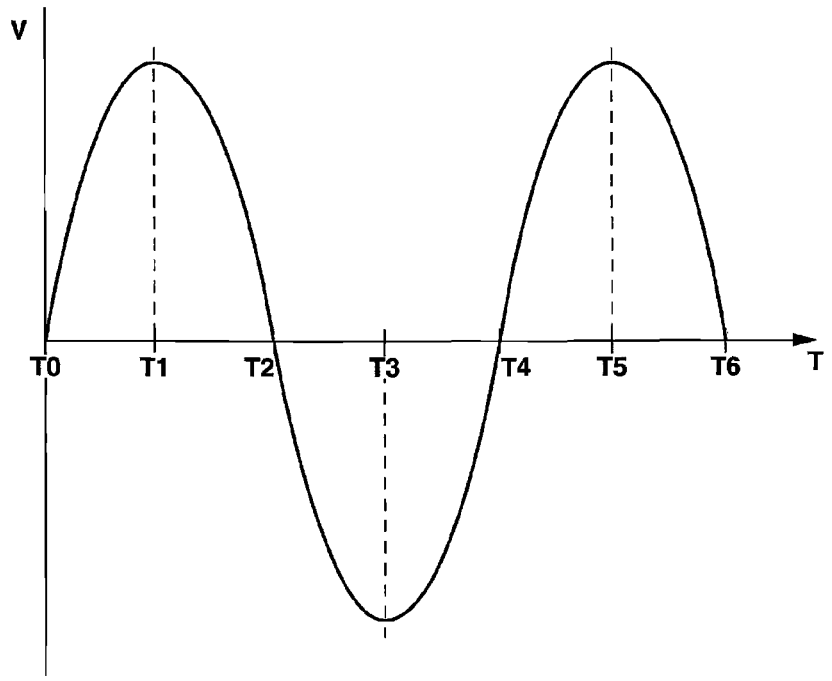
FIG. 10 is a graph showing a change with time of the frequency voltage applied to the piezoelectric body shown in FIG. 8.

A reduction in friction of a contact portion of the contact body 143 shown in FIGS. 4, 5, and 6 is explained with reference to FIG. 6 conceptually showing main components, FIGS. 9A, 9B, 9C, 9D, 9E, 9F, and 9G conceptually showing operation over time of the transducer 110, and FIG. 10 showing a change in an applied voltage in the operation over time.

FIGS. 9A, 9B, 9C, 9D, 9E, 9F, and 9G show, in every predetermined time, a change with time of states of the fixed frame 122 and the transducer 110 that occurs when a frequency voltage is applied to the piezoelectric body 142 shown in FIG. 6 to cause the piezoelectric body 142 to oscillate. FIG. 10 shows a voltage signal applied to the corresponding piezoelectric body 142 from time T0 in FIG. 9A to time T6 in FIG. 9G.

A state shown in FIG. 9A is a state in which the piezoelectric body 142 of the transducer 110 is in an initial state (a stationary state). An application state of a voltage to the piezoelectric body 142 in this state is equivalent to sign T0 in FIG. 10.

In this state, the transducer 110 is set in the operation ring 111 in a state in which one end is firmly fixed to the pressing spring 164 as explained above. A spherical surface convex portion of the contact body 143 firmly fixed to the end of the transducer 110 is pressed by the pressing spring 164 against the sliding section 122a provided on the outer circumference of the fixed frame 122. Pressing force of the pressing spring 164 generated by the pressing is indicated by sign Fp in FIG. 6.

The pressing force Fp is generated by urging force of the pressing spring 164, which is a leaf spring as shown in FIG. 6. Besides this configuration, for example, a form can also be adopted in which rigidity of the pressing spring 164 is increased, pressing coil springs are wound and arranged around shafts of the screws 166 for fixing the pressing spring 164, and the screws 166 are tightened, whereby the pressing coil spring presses the pressing spring 164. As a form different from this form, any mechanism can be applied as long as the mechanism adopts a form in which pressure is generated between the contact body 143 and the sliding section 122a such as magnetic force by a magnet.

When a voltage equal to or higher than 20 kHz of a sine wave is applied to the piezoelectric body 142 and ultrasound oscillation of about 1 μm is caused on a contact surface of the contact body 143 with the fixed frame 122, the transducer 110 rises from the fixed frame 122 and the contact body 143 hardly comes into contact with the fixed frame 122.

More specifically, in an initial state (FIG. 9A and T0 in FIG. 10) in which a voltage is not applied to the piezoelectric body 142, the contact body 143 is pressed by the pressing force of the pressing spring 164 and in contact with the fixed frame 122. When the piezoelectric body 142 is caused to oscillate, acceleration of a several tens thousand $m/s^2$ level by ultrasound oscillation is applied to the contact body 143. Therefore, as the material of the contact body 143, metal or ceramics having high rigidity is desirable. For suppression of audible sound, a material obtained by mixing a material such as ceramic powder, glass fiber, carbon fiber, or the like in resin such as PPS (poly phenylene sulfide resin) having high rigidity is more desirable. It is advisable to perform joining of the contact body 143 and the piezoelectric body 142 using an epoxy adhesive or the like having high rigidity. On the other hand, a material of the sliding section 122a with which the contact body 143 comes into contact is desirably metal or ceramics having high rigidity and abrasion resistance.

When a voltage is applied to the piezoelectric body 142 such that the piezoelectric body 142 expands, in a state in which force of a product of acceleration of displacement of the piezoelectric body 142 and mass of the transducer 110 is applied anew, the contact body 143 is pressed by the sliding section 122a, displacement acceleration gradually decreases to 0, a maximum voltage is applied to the piezoelectric body 142, and the piezoelectric body 142 expands to the maximum (FIG. 9B and T1 in FIG. 10). When generated acceleration in an initial period is extremely large, depending on conditions, the contact body 143 does not come into contact with the sliding section 122a in this state.

The piezoelectric body 142 deformed to the maximum starts to contract and returns to the initial state. At this point, the pressing spring 164 cannot sufficiently draw back displacement due to the acceleration generated by the piezoelectric body 142. A response delay occurs because the piezoelectric body 142 has a small time constant but the pressing spring 164 has a relatively extremely large time constant. Therefore, a state in which the contact body 143 does not come into contact with the sliding section 122a is realized (FIG. 9C and T2 in FIG. 10).

Subsequently, in a maximum voltage applied state in a direction in which the piezoelectric body 142 contracts, the state in which the contact body 143 does not come into contact with the sliding section 122a continues in the piezoelectric body 142 (FIG. 9D and T3 in FIG. 10).

The voltage applied to the piezoelectric body 142 decreases to zero and the piezoelectric body 142 returns to the displacement in the initial state. However, the contact body 143 does not come into contact with the sliding section 122a (FIG. 9E and T4 in FIG. 10).

Further, when a voltage is applied in a direction in which the piezoelectric body 142 expands and the piezoelectric body 142 expands, the contact body 143 comes into contact with the sliding section 122a in a predetermined place. Acceleration is applied to the fixed frame 122 in a direction away from the contact body 143 (FIG. 9F and T5 in FIG. 10).

When a voltage is applied to the piezoelectric body 142 in the contracting direction again and the piezoelectric body 142 returns to the displacement in the initial state, the contact body 143 and the sliding section 122a are not in contact with each other again (FIG. 9G and T6 in FIG. 10).

As explained above, the operation in one period of FIG. 9C to FIG. 9G is repeated. FIGS. 9A to 9C are states of transitional characteristics from a stationary state to steady oscillation occurrence. Therefore, in a steady state, FIGS. 9C to 9G are repeated.

In one period from FIGS. 9C to 9G, the contact body 143 comes into contact with the sliding section 122a only at an instance near FIG. 9F. In most time of one period, the contact body 143 and the sliding section 122a are in the non-contact state. The friction force Ff is 0 during the time. Therefore, average friction force Ff in one period is extremely small. Actually, if the operation ring 111 is caused to operate during the noncontact time, the operation ring 111 operates at the friction force Ff=0. A brake is applied with instantaneous friction force at an interval of an oscillation period of the piezoelectric body 142. However, since the oscillation period is extremely small, the operation ring 111 smoothly operates as if friction is steadily reduced. As it is seen from this operation, when the oscillation amplitude of the piezoelectric body 142 is changed, a contact time of the contact body 143 and the sliding section 122a changes. When the oscillation amplitude is reduced to be extremely small (amplitude is reduced to a value close to 0), the contact body 143 and the sliding section 122a are in a state substantially the same as the state in which the contact body 143 and the sliding section 122a are steadily in contact with each other. The friction force is Ff≈Fp, where μ is a coefficient of friction of the contact surface of the contact body 143 and the sliding section 122a and Fp is the pressing force of the pressing spring 164.

Figure 11:
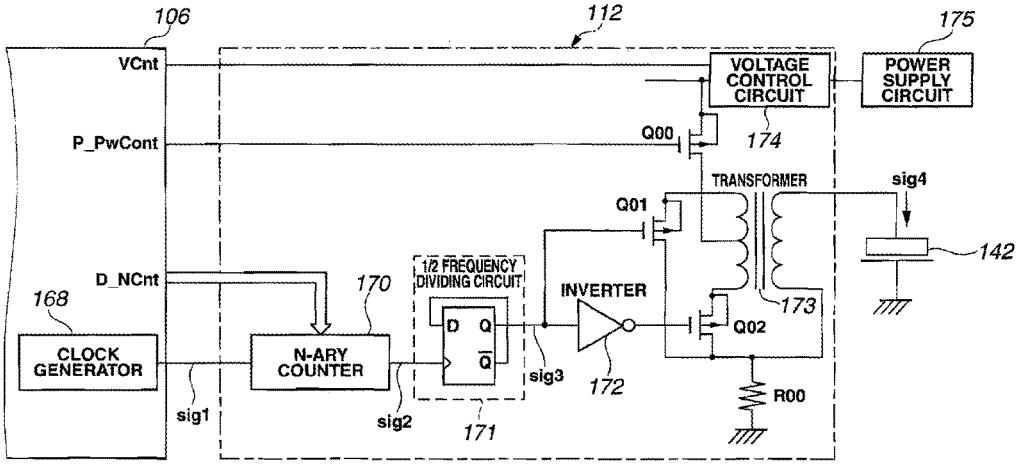
FIG. 11 is a circuit diagram showing a schematic configuration of a piezoelectric body control circuit for the piezoelectric body shown in FIG. 8.

FIG. 11 is a circuit diagram schematically showing a configuration of the piezoelectric body control circuit 112 of the piezoelectric body 142. FIGS. 12A, 12B, 12C, and 12D are time charts showing forms of signals outputted from components in the piezoelectric body control circuit 112 shown in FIG. 9.

The piezoelectric body control circuit 112 includes a circuit configuration shown in FIG. 11. In the sections of the piezoelectric body control circuit 112, signals (Sig1 to Sig4) having waveforms represented by the time charts of FIGS. 12A to 12D are generated. The piezoelectric body control circuit 112 is controlled as explained below on the basis of the signals.

As illustrated in FIG. 11, the piezoelectric body control circuit 112 includes an N-ary counter 170, a ½ frequency dividing circuit 171, an inverter 172, plural MOS transistors Q00, Q01, and Q02, a transformer 173, and a resistor R00.

According to an ON/OFF switching operation of the MOS transistor Q01 and the MOS transistor Q02 connected to a primary side of the transformer 173, the signal (Sig4) of a predetermined period is generated on a secondary side of the transformer 173. The piezoelectric body 142 is driven on the basis of the signal of the predetermined period to cause oscillation shown in FIG. 10.

The microcomputer for lens 106 controls the piezoelectric body control circuit 112 as explained below via two IO ports P_PwCont and D_NCnt provided as control ports and a clock generator 168 present on an inside of the microcomputer for lens 106.

The clock generator 168 outputs a pulse signal (a basic clock signal) to the N-ary counter 170 at a frequency sufficiently earlier than a signal frequency applied to the piezoelectric body 142. This output signal is the signal Sig1 having the waveform represented by the time chart of FIG. 12A. The basic clock signal is inputted to the N-ary counter 170.

The N-ary counter 170 counts the pulse signal and outputs a count end pulse signal every time the count reaches a predetermined value "N". In other words, the N-ary counter 170 divides a frequency of the basic clock single into 1/N. This output signal is the signal Sig2 having the waveform represented by the time chart of FIG. 12B.

In the frequency-divided pulse signal, a duty ratio of High and Low is not 1:1. Therefore, the piezoelectric body control circuit 112 converts the duty ratio into 1:1 through the ½ frequency dividing circuit 171. This converted pulse signal corresponds to the signal Sig3 having the waveform represented by the time chart of FIG. 12C.

In a High state of the converted pulse signal, the MOS transistor Q01 to which this signal is inputted is turned on. On the other hand, the pulse signal is applied to the MOS transistor Q02 through the inverter 172. Therefore, in a Low state of the pulse signal, the MOS transistor Q02 to which this signal is inputted is turned on. When the MOS transistor Q01 and the MOS transistor Q02 connected to the primary side of the transformer 173 are alternately turned on, a signal of a period like the signal Sig4 shown in FIG. 12D is generated on the secondary side.

A winding ratio of the transformer 173 is determined from an output voltage of the voltage control circuit 174 and a voltage necessary for driving of the piezoelectric body 142. The resistor R00 is provided to restrict an excessively large current from flowing to the transformer 173. The power supply circuit 175 is provided, for example, in the camera main body 200 (see FIG. 1). An output voltage of the power supply circuit 175 is supplied from the camera main body 200 to the voltage control circuit 174 provided in the interchangeable lens barrel 100 (see FIG. 1) through the I/F 300 (see FIG. 1).

An output voltage of the voltage control circuit 174 is set and an applied voltage to the piezoelectric body 142 is determined from VCnt of the microcomputer for lens 106. Oscillation amplitude of the piezoelectric body 142 is determined by the output voltage of the voltage control circuit 174. Specifically, a graph showing a state in which the oscillation amplitude is changed by the voltage control circuit 174 is FIG. 13. In this case, a contact position in a Y direction of the contact body 143 and the sliding section 122a of the fixed frame 122 changes when amplitude is expanded with respect to reference amplitude. Then, according to the amplitude expansion, time in which the contact body 143 is in contact with the sliding section 122a decreases and friction force of the contact body 143 and the sliding section 122a changes. However, even if the oscillation amplitude is expanded, the friction force does not decrease to zero but converges to fixed friction force F0 close to zero.

On the other hand, if the transducer 110 is not oscillating and the oscillation amplitude is zero, when a coefficient of friction between the contact body 143 and the sliding section 122a is represented as μ, assuming that pressing force=Fp, generated friction force is F=μ×Fp. When the oscillation amplitude is controlled by the voltage control circuit 174, the friction force can be changed from F to F0. In order to generate a sense of click, the friction force between the contact body 143 and the sliding section 122a only has to be changed to correspond to a rotation position of the operation ring 111. A sense of click can be realized if the oscillation amplitude is changed to correspond to a position of the operation ring 111.

Figures 14A, 14B, 14C:
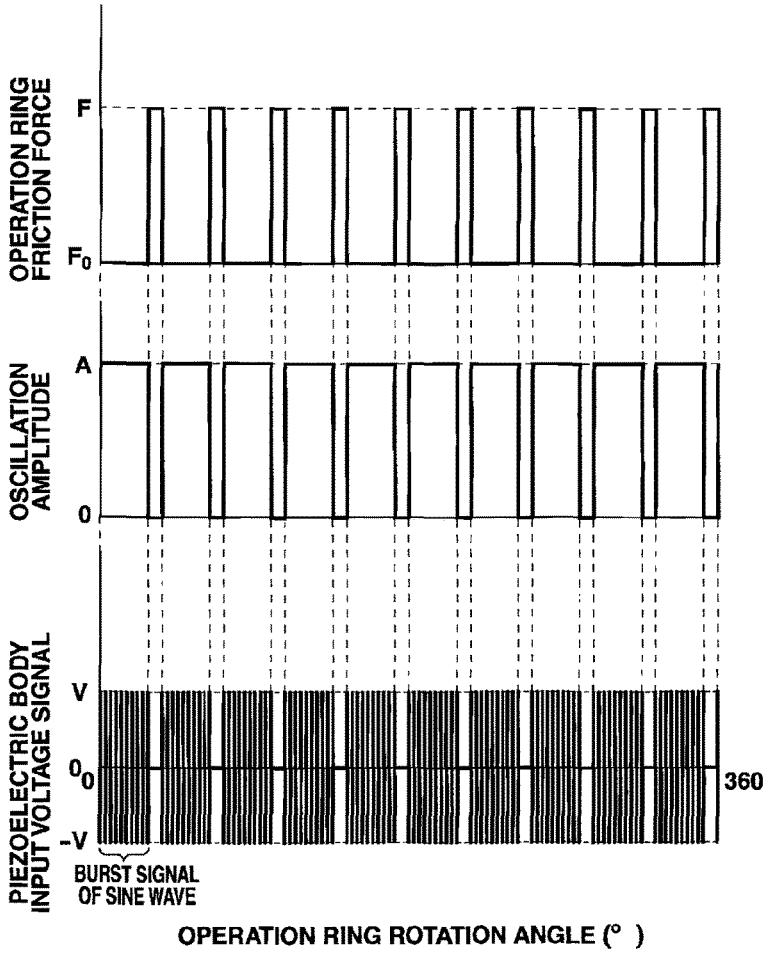
FIG. 14A is a graph showing a relation between a corresponding rotation angle of the operation ring for generating a sense of click and an operation force amount of the operation ring (operation ring friction force)
FIG. 14B is a graph showing oscillation amplitude of the transducer corresponding to the operation force amount (the operation ring friction force) of the operation ring shown in FIG. 14A.
FIG. 14C is a graph showing a piezoelectric body input voltage signal corresponding to the oscillation amplitude of the transducer shown in FIG. 14B.

FIGS. 14A, 14B, and 14C are graphs of a corresponding oration angle of the operation ring 111 for generating a sense of click, an operation force amount of the operation ring 111, and oscillation amplitude of the transducer 110 corresponding to the operation force amount.

Examples shown in FIGS. 14A to 14C are only examples. A form of the graphs can be changed. For example, in FIGS. 14A to 14C, ten places are clicked in one rotation of the operation ring 111. However, the number of clicks can be freely changed.

In FIGS. 14A to 14C, clicks are distributed to the entire circumference at equal intervals. However, it is also possible to distribute clicks within a predetermined angle (e.g., 180°) and set the operation ring friction force to F in the remaining 180°.

Further, it is possible to distribute clicks at unequal intervals rather than equal intervals. When the operation ring 111 is set to focusing not requiring a sense of click, if the oscillation amplitude is fixed irrespective of a position of the operation ring 111, the friction force between the contact body 143 and the sliding section 122a is fixed and the operation force amount of the operation ring 111 is fixed.

If the oscillation amplitude of the transducer 110 is set to a different value, the operation force amount of the operation ring 111 can be set to a different operation force amount.

Figures 15A, 15B, 15C:
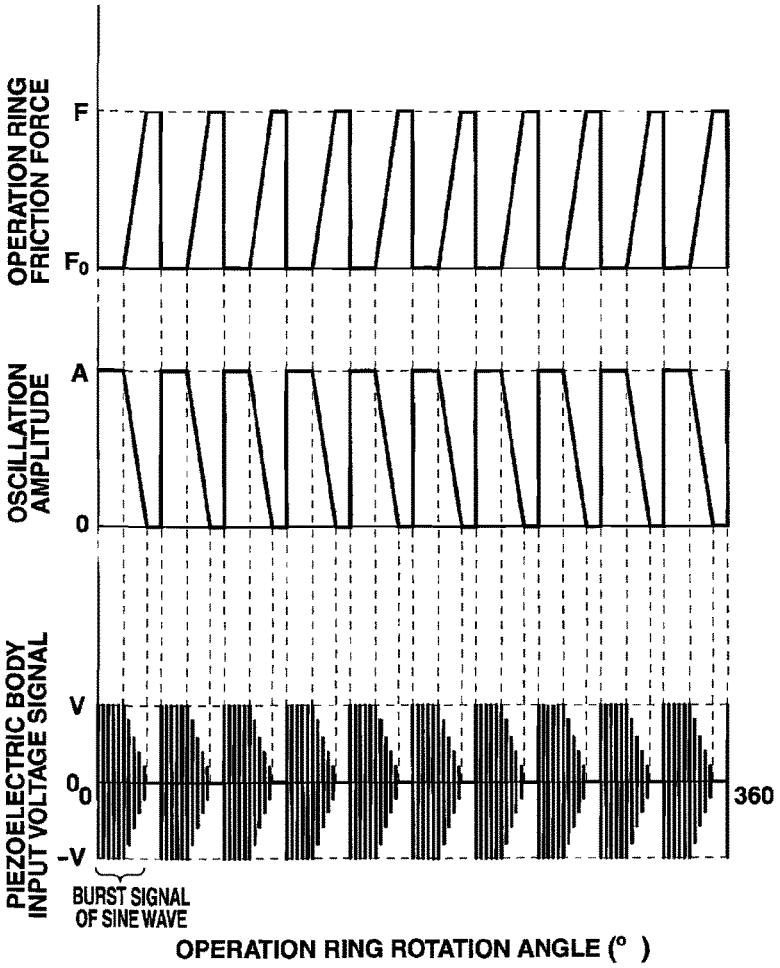
FIG. 15A is a graph showing a modification of FIG. 14A.
FIG. 15B is a graph showing a modification of FIG. 14B.
FIG. 15C is a graph showing a modification of FIG. 14C.

As in modifications shown in FIGS. 15A to 15C, it is possible to obtain a sense of click different from that shown in FIGS. 14A to 14C by giving an input voltage signal different from that shown in FIGS. 14A to 14C to the piezoelectric body 142.

When the piezoelectric body 142 is driven, the MOS transistor Q00 has to be in an ON state and a voltage has to be applied from the voltage control circuit 174 to a center tap of the transformer 173. In this case, ON/OFF control for the MOS transistor Q00 is performed via the IO port P_PwCont of the microcomputer for lens 106. A setting value "N" of the N-ary counter 170 can be set from the IO port D_NCnt of the microcomputer for lens 106. Therefore, the microcomputer for lens 106 can arbitrarily change a driving frequency of the piezoelectric body 142 by appropriately controlling the setting value "N".

It is also possible to set the driving frequency to a resonant frequency of the transducer 110, expand the oscillation amplitude of the transducer 110, and cause the transducer 110 to operate at a low voltage. When the driving frequency is set to the resonant frequency, it is necessary to detect an oscillation state of the piezoelectric body 142 and perform control for tracking the resonant frequency. The detection of the oscillation state can be performed by detecting an electric current inputted to the piezoelectric body 142 because, for example, impedance of the piezoelectric body decreases at the resonant frequency. Alternatively, it is possible to detect resonance of the transducer 110 by forming a part of the stacked single plates of the piezoelectric body 142 as a piezoelectric body for oscillation detection and detecting a voltage or a phase of an output voltage from the piezoelectric body for oscillation detection.

A frequency outputted from the voltage control circuit 174 can be calculated according to Equation (1) below.

$$fdrv=fpls/2N \tag{1}$$

where, N represents a setting value to the N-ary counter 170, fpls represents a frequency of an output pulse of the clock generator 168, and fdrv represents a frequency of a signal applied to the piezoelectric body 142. The calculation based on Equation (1) is performed by, for example, the microcomputer for lens 106.

In this embodiment, the frequency fdry is desirably set to a frequency equal to or higher than 20 kHz. The piezoelectric body 142 oscillates at the frequency fdrv. This frequency band is an ultrasound range and inaudible to human being. The digital camera shown in FIG. 1 is used for photographing of a moving image as well. When a moving image is photographed, in some case, sound is simultaneously recorded. Therefore, noise is required to be small. Since sound in an ultrasound band exceeds an audible range of the human being, a normal microphone cannot detect the sound.

Action of this embodiment is explained.

Figure 16:
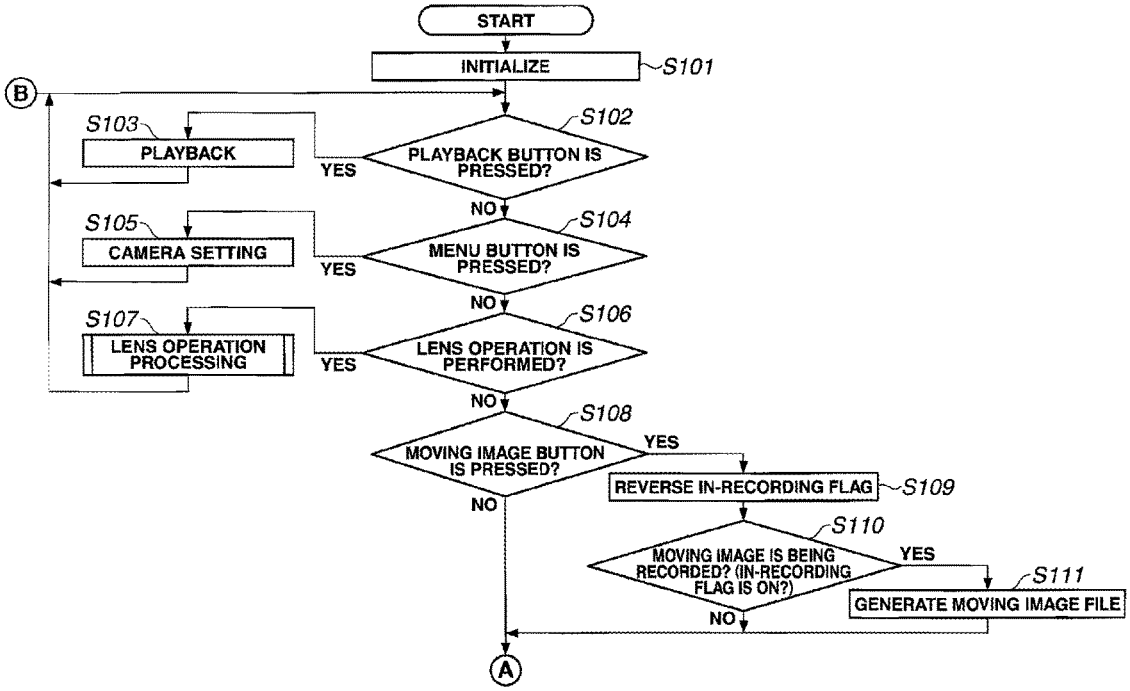
FIG. 16 is a flowchart for explaining a part (a former half) of a main processing sequence of the digital camera shown in FIG. 1.
Figure 17:
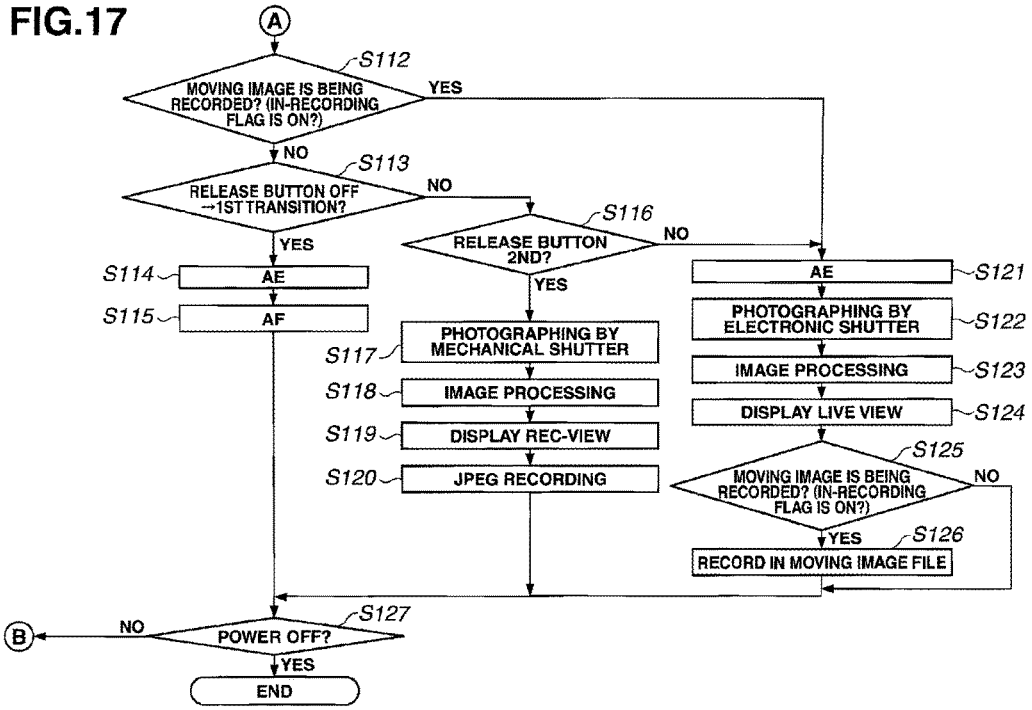
FIG. 17 is a flowchart for explaining a part (a latter half) of the main processing sequence of the digital camera shown in FIG. 1.

FIGS. 16 and 17 are flowcharts for explaining a main processing sequence performed by the digital camera to which the driving control device according to this embodiment is applied. This processing sequence starts when the power button is pressed by the user and the power supply for the digital camera is turned on.

As shown in FIG. 16, when the processing sequence starts, first, the microcomputer for main body 214 performs processing for initializing the sections of the digital camera (S101).

In this processing for initialization, for example, the microcomputer for main body 214 performs processing for resetting (setting to off) a flag indicating whether a moving image is being recorded (hereinafter referred to as "in-recording flag"). The microcomputer for main body 214 also performs, for example, processing for switching setting of the operation mode of the operation ring 111 to the focus mode and changing control of the transducer 110 such that operability corresponding to the focus mode is obtained as operability of the operation ring 111.

Subsequently, the microcomputer for main body 214 determines whether the playback button is pressed (S102). If a result of the determination is Yes, the microcomputer for main body 214 performs playback processing (a playback sequence) (S103). In this playback processing, the microcomputer for main body 214 performs processing for, for example, displaying files recorded in the recording medium 212 on the LCD 210 as a list and playing back a file selected and determined by the user among the files. After the processing in S103, the microcomputer for main body 214 returns to S102.

On the other hand, if a result of the determination in S102 is No, the microcomputer for main body 214 determines whether the menu button is pressed (S104). If a result of the determination is Yes, the microcomputer for main body 214 performs camera setting processing (a camera setting sequence) (S105). In this camera setting processing, the microcomputer for main body 214 performs processing for, for example, displaying a menu for enabling a change of camera setting on the LCD 210 and changing camera setting according to camera setting selected and determined by the user in the menu. In this processing, user can change, for example, setting of a recording mode for a still image to any one of JPEG recording, JPEG+RAW recording, RAW recording, and the like. The user can change setting of a recording format for a moving image file to any one of AVI: Motion-JPEG, AVCHD: H.264, MP4: H.264, and the like. After the processing in S105, the microcomputer for main body 214 returns to S102.

On the other hand, if a result of the determination in S104 is No, the microcomputer for main body 214 determines whether lens operation is performed (S106). Specifically, the microcomputer for main body 214 determines whether the mode switching operation section 108 is pressed or the operation ring 111 is operated to rotate (S106). If a result of the determination is Yes, the microcomputer for main body 214 performs lens operation processing (a lens operation sequence) (S107). Details of this lens operation processing are explained later with reference to FIG. 18. After the processing in S107, the microcomputer for main body 214 returns to S102.

On the other hand, if a result of the determination in S106 is No, the microcomputer for main body 214 determines whether the moving image button is pressed (S108). If a result of the determination in S108 is Yes, the microcomputer for main body 214 reverses a moving image in-recording flag (S109). The reversing the moving image in-recording flag means that, if the moving image in-recording flag is off, reversing the moving image in-recording flag to on and, if the moving image in-recording flag is on, reversing the moving image in-recording flag to off.

After the processing in S109, the microcomputer for main body 214 determines whether a moving image is being recorded. In other words, the microcomputer for main body 214 determines whether the moving image in-recording flag is on (S110). If a result of the determination is Yes, in order to start moving image recording, the microcomputer for main body 214 generates a new moving image file for recording (S111).

On the other hand, if a result of the determination in S108 is No, a result of the determination in S110 is No, or after the processing in S111, the microcomputer for main body 214 shifts to the flowchart (a latter half) in FIG. 17 and determines whether a moving image is being recorded. In other words, the microcomputer for main body 214 determines whether the moving image in-recording flag is on (S112).

If a result of the determination in S112 is No, the microcomputer for main body 214 determines whether the digital camera transitions from a state in which the release button is not pressed to a state in which the release button is pressed and the first release switch is turned on (S113). If a result of the determination is Yes, the microcomputer for main body 214 performs a photographing preparation sequence (S114 and S115). In this photographing preparation sequence, the microcomputer for main body 214 performs AE processing (S114) and AF processing (S115).

On the other hand, if a result of the determination in S113 is No, the microcomputer for main body 214 determines whether the release button is pressed and the second release switch is turned on (S116). If a result of the determination is Yes, the microcomputer for main body 214 performs a photographing sequence (S117 to S120). In this photographing sequence, the microcomputer for main body 214 performs photographing processing by the mechanical shutter 201 (S117) and applies image processing for still image photographing to obtained image data (S118). The microcomputer for main body 214 performs rec-view display for displaying the image data on the LCD 210 for an extremely short time (S119). Thereafter, the microcomputer for main body 214 records the image data in the recording medium 212 as a JPEG file (S120).

On the other hand, if a result of the determination in S112 is Yes or a result of the determination in S116 is No, the microcomputer for main body 214 performs AE processing for moving image photographing (S121), performs photographing processing by an electronic shutter (S122), applies image processing for moving image photographing to obtained image data (S123), and performs live view display for displaying the image data on the LCD 210 (S124). The microcomputer for main body 214 determines whether a moving image is being recorded. In other words, the microcomputer for main body 214 determines whether the moving image in-recording flag is on (S125). If a result of the determination is Yes, the microcomputer for main body 214 compresses the image data in a set format and records the image data in the moving image file generated in S111 (S126).

After the processing in S115, after the processing in S120, after the processing in S126, or if a result of the determination in S125 is No, the microcomputer for main body 214 determines whether the power button is pressed and the power supply for the digital camera is turned off (S127). If a result of the determination is No, the microcomputer for main body 214 returns to the processing in S102 in FIG. 16. If a result of the determination is Yes, the microcomputer for main body 214 ends this processing sequence.

Figure 18:
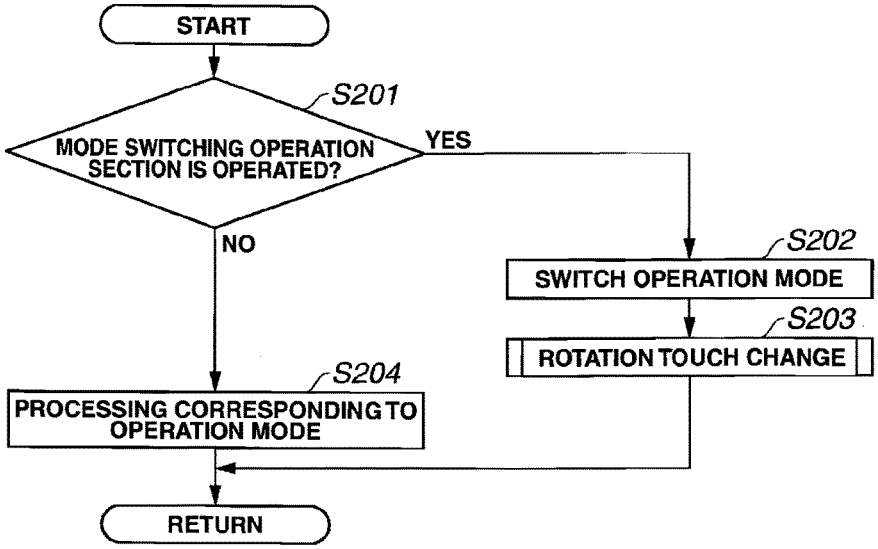
FIG. 18 is a flowchart for explaining details of a processing sequence of lens operation processing shown in FIG. 16 (step S107 in FIG. 16)

FIG. 18 is a flowchart for explaining details of a processing sequence of the lens operation processing (S107 in FIG. 16). As shown in FIG. 18, when this processing sequence is started, first, the microcomputer for main body 214 determines whether lens operation performed if a result of the determination in S106 in FIG. 16 is Yes is pressing of the mode switching operation section 108 (S201). If a result of the determination is Yes, the microcomputer for main body 214 switches setting of the operation mode of the operation ring 111 according to predetermined order (S202). The predetermined order is, for example, order of the focus mode, the zoom mode, the photographing mode, the ISO sensitivity mode, the shutter speed mode, and the diaphragm mode and, after the diaphragm mode, returning to the focus mode. In this case, for example, when the mode switching operation section 108 is pressed if the setting of the operation mode is the focus mode, the setting of the operation mode is switched from the focus mode to the zoom mode.

After the processing in S202, the microcomputer for main body 214 performs processing for changing a rotation touch of the operation ring 111 according to the switched setting of the operation mode (S203). Details of this rotation touch changing processing are explained later with reference to FIG. 19.

On the other hand, if a result of the determination in S201 is No, i.e., when the lens operation performed if a result of the determination in S106 is Yes is the operation of the operation ring 111, the microcomputer for main body 214 performs processing corresponding to the setting of the operation mode according to a rotating direction and a rotation amount of the operation ring 111 (S204).

In the processing in S204, the microcomputer for main body 214 performs processing explained below according to the setting of the operation mode. In the following explanation, rotating the operation ring 111 to the right means rotating the operation ring 111 to the right viewed from the camera main body 200 side. Rotating the operation ring 111 to the left means rotating the operation ring 111 to the left viewed from the camera main body 200 side.

(1) If the setting of the operation mode is the focus mode, the microcomputer for main body 214 performs processing for moving the focus lens 101 by a movement amount corresponding to a rotation amount of the operation ring 111 to a nearest side when the operation ring 111 is rotated to the right and to an infinite side when the operation ring 111 is rotated to the left. In this case, according to the processing in S203, the control of the transducer 110 is performed to always minimize rotation resistance of the operation ring 111. Therefore, when the user manually rotates the operation ring 111, the user can obtain a rotation touch suitable for focus operation.

(2) If the setting of the operation mode is the zoom mode, the microcomputer for main body 214 performs processing for moving the zoom lens 102 by a movement amount corresponding to a rotation amount of the operation ring 111 in a direction in which a focal length decreases when the operation ring 111 is rotated to the right and in a direction in which the focal length increases when the operation ring 111 is rotated to the left. In this case, according to the processing in S203, the control of the transducer 110 is performed to always minimize rotation resistance of the operation ring 111. Therefore, when the user manually rotates the operation ring 111, the user can obtain a rotation touch suitable for zoom operation.

(3) If the setting of the operation mode is the photographing mode, when the operation ring 111 is rotated to the right, the microcomputer for main body 214 performs processing for sequentially switching setting of the photographing mode according to predetermined order to correspond to a rotation amount of the operation ring 111. The predetermined order is order of photographing modes of, for example, P (program exposure), A (diaphragm preference AE), S (shutter speed preference AE), M (manual exposure), and art (ART). ART is a photographing mode in which artistic processing (e.g., image processing for applying a unique tone and a special effect found in posters, paintings, and the like) can be applied to a photographed image to record the image.

On the other hand, when the operation ring 111 is rotated to the left, the microcomputer for main body 214 performs processing for sequentially switching setting of the photographing mode according to order opposite to the order in the case of the right rotation to correspond to a rotation amount of the operation ring 111. If the setting of the operation mode is the photographing mode, according to the processing in S203, the control of the transducer 110 is performed such that a sense of click is obtained at predetermined rotation angles at equal angle intervals of the operation ring 111 as a rotation touch of the operation ring 111. The five rotation angles at the equal angle intervals are rotation angles from a reference position (an absolute position) of the operation ring 111 and correspond to the five photographing modes (P, A, S, M, and ART). Therefore, when the user manually rotates the operation ring 111, the user can obtain a rotation touch suitable for setting operation for the photographing mode.

If the setting of the operation mode is the ISO sensitivity mode, when the operation ring 111 is rotated to the right, the microcomputer for main body 214 performs processing for sequentially switching setting of the ISO sensitivity according to predetermined order to correspond to a rotation amount of the operation ring 111. The predetermined order is order of ISO sensitivity of, for example, 100, 200, 400, 800, 1600, 3200, 6400, and 12800.

On the other hand, when the operation ring 111 is rotated to the left, the microcomputer for main body 214 performs processing for sequentially switching the setting of the ISO sensitivity according to order opposite to that in the case of the right rotation to correspond to a rotation amount of the operation ring 111. If the setting of the operation mode is the ISO sensitivity mode, according to the processing in S203, the control of the transducer 110 is performed such that a sense of click is obtained at eight rotation angles at equal angle intervals of the operation ring 111 as a rotation touch of the operation ring 111. The eight rotation angles at the equal angle intervals are rotation angles from the reference position of the operation ring 111 and correspond to the eight kinds of ISO sensitivity (100, 200, 400, 800, 1600, 3200, 6400, and 12800). Therefore, when the user manually rotates the operation ring 111, the user can obtain a rotation touch suitable for setting operation for the ISO sensitivity.

If the setting of the operation mode is the shutter speed mode, the microcomputer for main body 214 performs processing for switching setting of shutter speed to correspond to a rotation amount of the operation ring 111 in a direction for reducing exposure time when the operation ring 111 is rotated to the right and in a direction for increasing the exposure time when the operation ring 111 is rotated to the left. The direction for reducing the exposure time is a direction for increasing the shutter speed. The direction for increasing the exposure time is a direction for reducing the shutter speed. In this case, according to the processing in S203, the control of the transducer 110 is performed such that, as a rotation touch of the operation ring 111, rotation resistance increases as a rotation angle of the operation ring 111 increases in a predetermined rotation angle range of the operation ring 111 and the rotation resistance suddenly increases outside the predetermined rotation angle range. The predetermined rotation angle range is a range of a rotation angle from the reference position of the operation ring 111 and is associated in advance with a range of shutter speed that can be switched. Therefore, a lower limit of the rotation angle range corresponds to highest shutter speed and an upper limit of the rotation angle range corresponds to lowest shutter speed. Therefore, when the user manually rotates the operation ring 111, the user can obtain a rotation touch suitable for setting operation for the shutter speed. For example, when the user switches the setting of the shutter speed to setting of desired shutter speed, the user can determine a rotating direction of the operation ring 111 for the switching according to a sense of rotation resistance of the operation ring 111. The user can sense, according to a suddenly increasing sense of rotation resistance of the operation ring 111, that the user is about to switch the setting of the shutter speed exceeding the range of the shutter speed that can be switched.

If the setting of the operation mode is the diaphragm mode, the microcomputer for main body 214 performs processing for setting of the diaphragm to correspond to a rotation amount of the operation ring 111 in a direction for stopping down the diaphragm mechanism 103 when the operation ring 111 is rotated to the right and in a direction for opening the diaphragm mechanism 103 when the operation ring 111 is rotated to the left. The direction for stopping down the diaphragm mechanism 103 is a direction for increasing a diaphragm value (an F value). The direction for opening the diaphragm mechanism 103 is a direction for reducing the diaphragm value. In this case, according to the processing in S203, the control of the transducer 110 is performed such that, as a rotation touch of the operation ring 111, rotation resistance increases as a rotation angle of the operation ring 111 increases in a predetermined rotation angle range of the operation ring 111 and the rotation resistance suddenly increases outside the predetermined rotation angle range. The predetermined rotation angle range is a range of a rotation angle from the reference position of the operation ring 111 and is associated in advance with a range of a diaphragm that can be switched. Therefore, a lower limit of the rotation angle range corresponds to a smallest F value and an upper limit of the rotation angle range corresponds to a largest F value. Therefore, when the user manually rotates the operation ring 111, the user can obtain a rotation touch suitable for setting operation for the diaphragm. For example, when the user switches the setting of the diaphragm to setting of a desired diaphragm, the user can determine a rotating direction of the operation ring 111 for the switching according to a sense of rotation resistance of the operation ring 111. The user can sense, according to a suddenly increasing sense of rotation resistance of the operation ring 111, that the user is about to switch the setting of the diaphragm exceeding the range of the diaphragm that can be switched. In the case of the diaphragm, a number-of-stages change amount (indicating a change in a diaphragm value as an exposure amount) of the diaphragm among click positions of the operation ring 111 can be set by another operation member. A change in the number of clicks and a change in a rotation angle of the operation ring 111 corresponding to an interval of the clicks are performed according to the set number-of-stages change amount.

In the processing corresponding to the setting of the operation modes, it is also possible to perform, in an opposite manner, the processing performed according to the rotating direction of the operation ring 111. Specifically, the processing performed when the operation ring 111 is rotated to the left can be performed when the operation ring 111 is rotated to the right. The processing performed when the operation ring 111 is rotated to the right can be performed when the operation ring 111 is rotated to the left.

After the processing in S204 or after the processing in S203, the microcomputer for main body 214 returns this processing sequence to the start.

Figure 19:
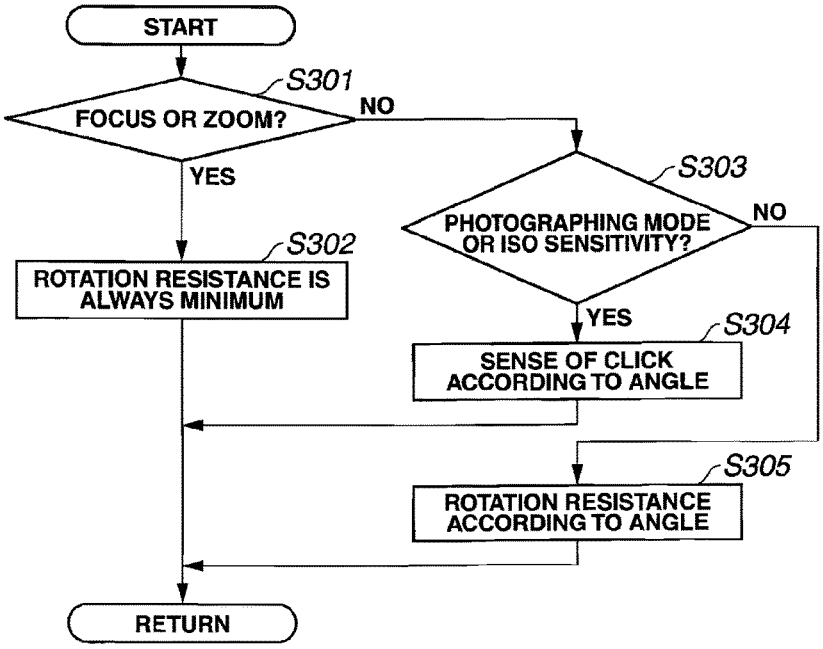
FIG. 19 is a flowchart for explaining details of a processing sequence of rotation touch changing processing shown in FIG. 18 (step S203 in FIG. 18)

FIG. 19 is a flowchart for explaining details of a processing sequence of the rotation touch changing processing (S203 in FIG. 18). As shown in FIG. 19, when this processing sequence starts, first, the microcomputer for main body 214 determines whether the setting of the operation mode switched in S202 is the focus mode or the zoom mode (S301). If a result of the determination is Yes, the microcomputer for main body 214 starts control of the transducer 110 for always minimizing rotation resistance of the operation ring 111 (S302).

On the other hand, if a result of the determination in S301 is No, the microcomputer for main body 214 determines whether the setting of the operation mode switched in S202 is the photographing mode or the ISO sensitivity mode (S303). If a result of the determination is Yes, the microcomputer for main body 214 starts control of the transducer 110 such that, as a rotation touch of the operation ring 111, a sense of click is obtained at predetermined five or eight rotation angles at equal angle intervals of the operation ring 111 (S304).

On the other hand, if a result of the determination in S303 is No, the setting of the operation mode switched in S202 is the shutter speed mode or the diaphragm mode. In this case, the microcomputer for main body 214 starts control of the transducer 110 such that, as a rotation touch of the operation ring 111, rotation resistance increases as a rotation angle of the operation ring 111 increases in a predetermined rotation angle range of the operation ring 111 and the rotation resistance suddenly increases outside the predetermined rotation angle range (S305).

After the processing in S302, after the processing in S304, or after the processing in S305, the microcomputer for main body 214 returns this processing sequence.

Figure 20:
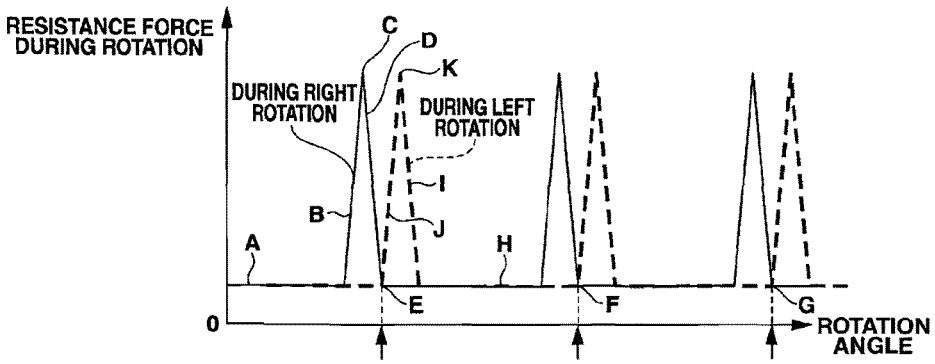
FIG. 20 is a diagram showing an example of a relation between a rotation angle and rotation resistance of the operation ring at the time when control of the transducer is started (step S304 in FIG. 19) in the rotation touch changing processing shown in FIG. 19.

FIG. 20 is a diagram showing an example of a relation between a rotation angle and rotation resistance of the operation ring at the time when control of the transducer 110 is started (step S304 in FIG. 19) in order to give a sense of click to the operation ring 111 in the rotation touch changing processing shown in FIG. 19.

In FIG. 20, an abscissa indicates a rotation angle from the reference position of the operation ring 111 and an ordinate indicates rotation resistance (resistance during rotation) of the operation ring 111. A solid line indicates a relation between a rotation angle and rotation resistance at the time when the operation ring 111 is rotated to the right. A dotted line indicates a relation between a rotation angle and rotation resistance force at the time when the operation ring 111 is rotated to the left. The operation ring 111 is set such that the rotation angle increases when the operation ring 111 is rotated to the right and the rotation angle decreases when the operation ring 111 is rotated to the left.

Three rotation angle positions E, F, and G indicated by three arrows are set at equal angle intervals from one another and indicate rotation angles at which setting in mode states of the photographing mode or the ISO sensitivity mode are switched. The rotation angles indicated by the three arrows are equivalent to three rotation angles at equal angle intervals included in the predetermined five or eight rotation angles at equal angle intervals of the operation ring 111.

As indicated by the solid line in FIG. 20, the relation between the rotation angle and the rotation resistance at the time when the operation ring 111 is rotated to the right changes as explained below.

When the control of the transducer 110 is started by the processing in S304 in FIG. 19 and the operation ring 111 is rotated to the right, as shown in FIG. 20, in a position before a rotation angle at which the setting in the mode states of the photographing mode or the ISO sensitivity mode is switched (sign A in FIG. 20), the rotation resistance increases at a fixed inclination indicated by sign B in FIG. 20. In a position closer to the rotation angle at which the setting is switched (sign C in FIG. 20), the rotation resistance decreases at a fixed inclination indicated by sign D in FIG. 20. In a position reaching the rotation angle at which the setting is switched (sign E in FIG. 20), the rotation resistance returns to the original rotation resistance, i.e., the original rotation resistance indicated by sign A in FIG. 20. According to such a change in the rotation resistance of the operation ring 111, the user can obtain a sense of click when the operation ring 111 reaches the rotation angle at which the setting is switched.

As indicated by the dotted line in FIG. 20, the relation between the rotation angle and the rotation resistance at the time when the operation ring 111 is rotated to the left changes in a manner opposite to that indicated by the solid line in the figure. When the control of the transducer 110 is started by the processing in S304 and the operation ring 111 is rotated to the left, in a position (H) before the rotation angle at which the setting in the mode states of the photographing mode or the ISO sensitivity mode is switched (rotation resistance is the same as that in the position equivalent to A), the rotation resistance increases at a fixed inclination indicated by sign I in FIG. 20. In a position indicated by sign K in FIG. 20 closer to the rotation angle at which the setting is switched, the rotation resistance decreases at a fixed inclination indicated by sign J in the figure. In a position reaching the rotation angle at which the setting is switched indicated by sign E in FIG. 20, the rotation resistance returns to the original rotation resistance indicated by signs A and H in the figure.

The rotation angle E at which the setting is switched, i.e., a rotation angle at which the setting is switched in the right rotation and a rotation angle at which the setting is switched in the left rotation are in the same rotation angle position. The rotation angle E is set such that the same sense of click is generated in the operation ring 111 in the same setting switching position irrespective of the left rotation and the right rotation and the setting in the mode states is switched. When the rotation resistance and positions for mode switching are set, the operation ring 111 can be operated to rotate with small resistance in the mode states. Since a sense of click is obtained immediately before the mode switching, it is possible to smoothly perform the operation.

Figure 21:
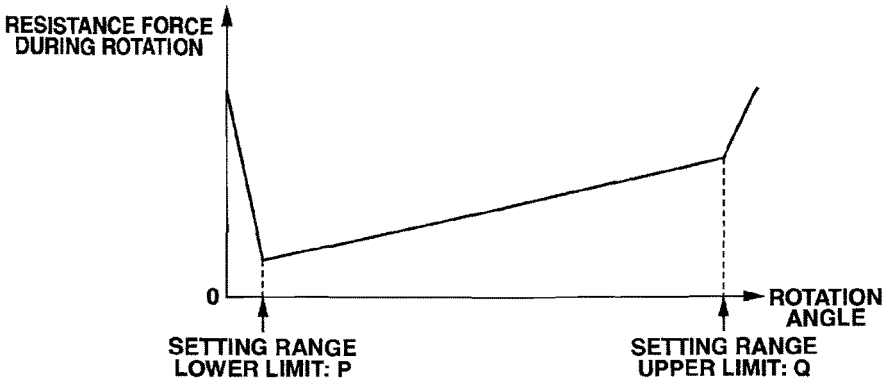
FIG. 21 is a diagram showing an example of a relation between the rotation angle and the rotation resistance of the operation ring at the time when the control of the transducer is started (step S305 in FIG. 19) in the rotation touch changing processing shown in FIG. 19.

FIG. 21 is a diagram showing an example of a relation between the rotation angle and the rotation resistance of the operation ring at the time when the control of the transducer is started (processing in step S305 in FIG. 19), for example, in the case of the shutter speed mode or the diaphragm mode in the rotation touch changing processing in FIG. 19.

In FIG. 21, an abscissa indicates a rotation angle from the reference position of the operation ring 111 and an ordinate indicates rotation resistance (resistance during rotation) of the operation ring 111.

Two rotation angle positions P and Q indicated by two arrows indicate a lower limit (P) and an upper limit (Q) in the predetermined rotation angle range of the operation ring 111. The lower limit and the upper limit correspond to highest shutter speed and lowest shutter speed or a smallest F value and a largest F value.

When control of the transducer 110 is starred by the processing in S305 in FIG. 19 and the operation ring 111 is rotated, as shown in FIG. 21, the rotation resistance changes as explained below. In the predetermined rotation angle range of the operation ring 111, the rotation resistance increases as the rotation angle of the operation ring 111 increases and the rotation resistance decreases as the rotation angle of the operation ring 111 decreases. According to such a change in the rotation resistance of the operation ring 111, in switching to desired setting, the user can determine a rotating direction of the operation ring 111 for the switching according to a sense of rotation resistance of the operation ring 111. Outside the predetermined rotation angle range of the operation ring 111 (when the rotation angle is smaller than P or larger than Q), the rotation resistance is set to suddenly increase. According to such a change in the rotation resistance of the operation ring 111, the user can sense that the user is about to switch the setting of the shutter speed or the diaphragm exceeding the range of the setting in which the shutter speed or the diaphragm can be switched.

Figure 22:
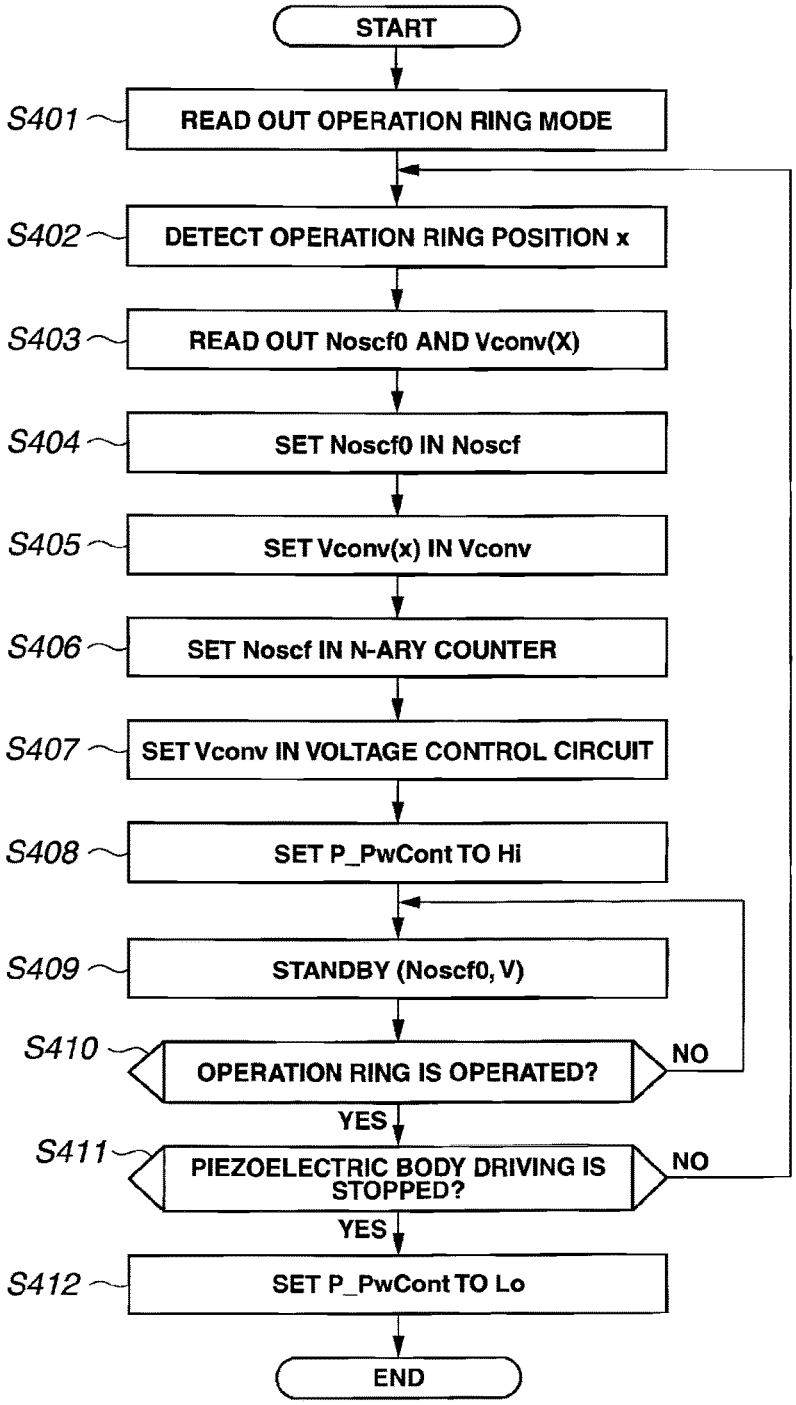
FIG. 22 is a flowchart for explaining an example of a processing sequence of the microcomputer for lens that controls a sense of operation of the operation ring.

FIG. 22 is a flowchart for explaining a processing sequence of the microcomputer for lens 106 for controlling a sense of operation of the operation ring 111. As an example, a processing sequence in obtaining an operation form of a click form is explained.

As shown in FIG. 22, when this sequence starts, first, the microcomputer for lens 106 reads out an operation ring mode of the operation ring 111 from the flash memory 107 (S401). In this example, it is assumed that, when the setting of the operation mode is switched according to pressing of the mode switching operation section 108, information concerning the switched operation mode is stored in the flash memory 107. It is assumed that the photographing mode or the ISO sensitivity mode is read out.

Subsequently, the microcomputer for lens 106 detects a position x of the operation ring 111 on the basis of an output signal of the position sensor 109 (S402). The position x of the operation ring 111 is a position with respect to the reference position of the operation ring 111.

Subsequently, the microcomputer for lens 106 reads out a frequency Noscf0 and a voltage Vconv(x) corresponding to the position x detected in the processing in S402 from the flash memory 107 (S403). In this example, it is assumed that information concerning the frequency Noscf0 and the voltage Vconv(x) corresponding to the position x is stored in the flash memory 107 in advance. The voltage Vconv(x) corresponding to the position x is, for example, experimentally determined on the basis of corresponding force amount data obtained from a mechanical click mechanism in the past. The position x corresponds to the rotation angle of the operation ring 111 shown in FIGS. 14A to 14C and FIGS. 15A to 15C.

Subsequently, the microcomputer for lens 106 sets the frequency Noscf0 read out in the processing in S403 in a frequency Noscf (S404) and sets the voltage Vconv(x) read out in the processing in S403 in a voltage Vconv (S405).

Subsequently, the microcomputer for lens 106 sets the frequency Noscf set in the processing in S404 in the N-ary counter 170 via an IO port D_Cnt of the microcomputer for lens 106 (S406).

The microcomputer for lens 106 sets the voltage Vconv set in the processing in S405 in the voltage control circuit 174 via an IO port Vcnt of the microcomputer for lens 106 (S407).

Subsequently, the microcomputer for lens 106 sets an IO port P_PwCont of the microcomputer for lens 106 to Hi (S408). Consequently, oscillation of the piezoelectric body 142 starts. The microcomputer for lens 106 changes to a standby state (S409). In the standby state, the oscillation of the piezoelectric body 142 continues under the setting.

Subsequently, the microcomputer for lens 106 determines whether the operation ring 111 is operated (S409). If a result of the determination is No, the microcomputer for lens 106 returns to S409.

On the other hand, if a result of the determination of the processing in S409 is Yes, the microcomputer for lens 106 determines whether driving of the piezoelectric body 142 is stopped (S411). When operation such as pressing of the playback button is performed, the microcomputer for lens 106 determines that the driving of the piezoelectric body 142 is stopped.

If a result of the determination of the processing in S411 is No, the microcomputer for lens 106 returns to the processing in S402 and repeats the processing in S402 and subsequent steps.

On the other hand, if a result of the determination of the processing in S411 is Yes, the microcomputer for lens 106 sets the IO port P_PwCont of the microcomputer for lens 106 to Lo (S412). Consequently, the oscillation of the piezoelectric body 142 stops. This processing sequence ends.

According to such a processing sequence, it is possible to realize the operation ring 111 having a touch same as a mechanical sense of click. When information corresponding to the photographing mode, information concerning the ISO sensitivity mode, or the like is stored in the flash memory 107 as the information concerning the voltage Vconv (x) corresponding to the position x, it is possible to realize, according to the photographing mode, the ISO sensitivity mode, or the like, the operation ring 111 having a sense of click at different position intervals (angle intervals). The piezoelectric body 142 is suitable for obtaining a sense of click of the operation ring 111 because the piezoelectric body 142 can respond at high speed shorter than 1 ms and can instantaneously change friction.

The setting of the operation mode of the operation ring 111 can be performed by a configuration explained below besides being performed by the pressing of the mode switching operation section 108.

Figure 23:
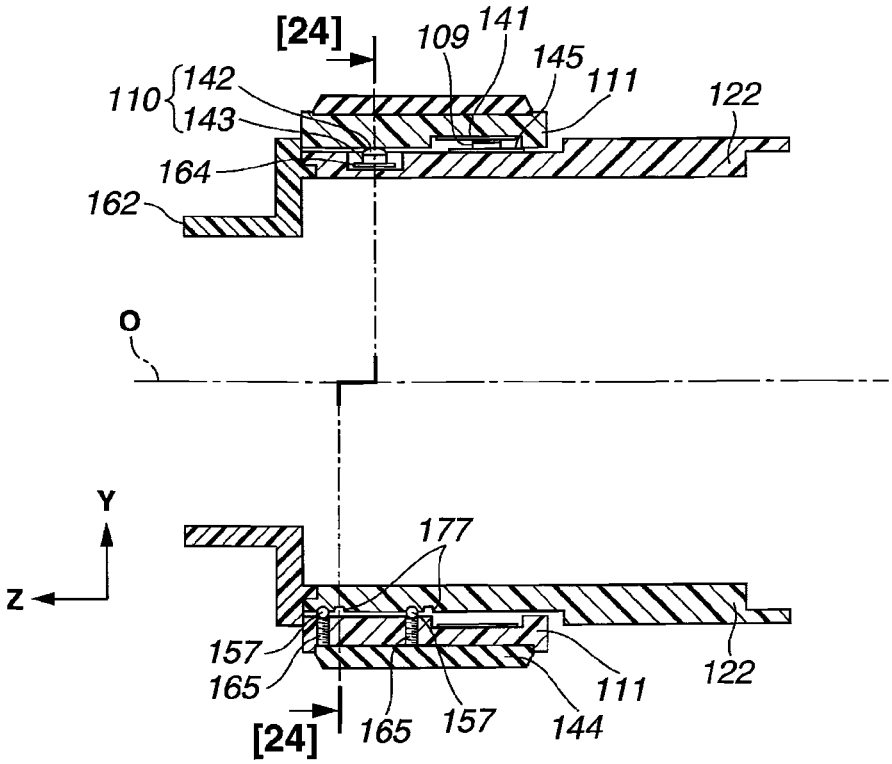
FIG. 23 is a diagram for explaining a modification in which the operation ring is configured to be capable of sliding back and forth in an optical axis direction of an interchangeable lens.
Figure 24:
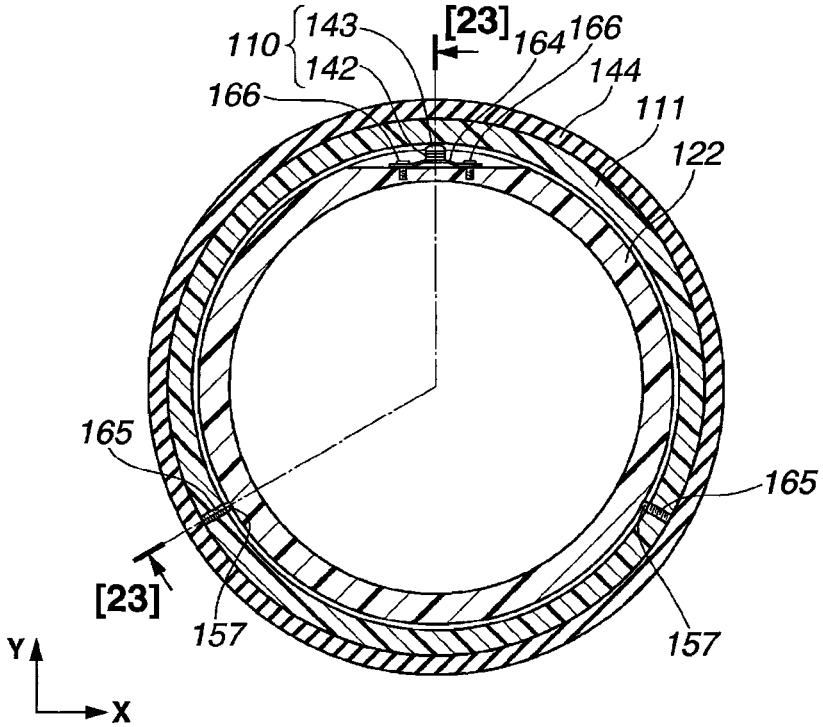
FIG. 24 is a sectional view taken along line [24]-[24] in FIG. 23.

For example, as indicated by a modification shown in FIGS. 23 and 24, the operation ring 111 shown in FIGS. 4 and 5 and the like is configured to be capable of being manually slid to the front and rear in the optical axis direction of the interchangeable lens barrel 100. However, in the example shown in FIGS. 23 and 24, the transducer 110 and the sliding section 122a shown in FIGS. 4 and 5 and the like are configured to be reversely provided. Specifically, the transducer 110 is provided on the fixed frame 122 side and the sliding section 122a is provided on the operation ring 111 side.

In such a configuration, for example, when the operation ring 111 slides to the front and rear, oscillation of the transducer 110 is controlled to reduce rotation resistance of the operation ring 111. In this case, the slide of the operation ring 111 can be detected by the position sensor 109. In this case, when the position sensor 109 detects a start of the slide of the operation ring 111, the oscillation of the transducer 110 can be controlled to reduce the rotation resistance of the operation ring 111.

For example, a slide position of the operation ring 111 can be detected by a not-shown switch. In this case, the switch is provided to be capable of detecting a position of the operation ring 111 slid to the front side and a position of the operation ring 111 slid to the rear side. Every time the switch is turned on, processing is performed to switch the setting of the operation mode. In such a configuration, for example, a ball guide 176 that guides the balls 157 of the operation ring 111 slid to the front side and a ball guide 177 that guides the balls 157 of the operation ring 111 slid to the rear side are provided in the fixed frame 122. The scale 141 is provided in a size for enabling detection of a position in a rotating direction of the operation ring 111 by the position sensor 109 even in a state in which the operation ring 111 is slid to the front and rear.

If the operation ring 111 is configured to be capable of sliding to the front and rear in this way, the switch can be configured to be turned on only once when the operation ring 111 is moved back and forth once in a front rear direction. In other words, the switch can be configured to be turned on only once when the operation ring 111 is slid back and forth once from the front to the rear and from the rear to the front or when the operation ring 111 is slid back and forth once from the rear to the front and from the front to the rear. For example, if the switch is configured to be turned on only once when the operation ring 111 is slid back and force once from the front to the rear and from the rear to the front, rotation operation of the operation ring 111 is performed in a position where the operation ring 111 is slid to the front. Further, it is also possible to detect, without mechanically sliding the operation ring 111, slide operation with a pressure sensor that detect pressure when the operation ring 111 is pressed in a slide direction and use the detection of the slide operation as a switch.

In the digital camera, modifications explained below are also possible.

For example, the processing shown in FIGS. 16 and 22 and the like performed by the digital camera can be configured to be executed only by the microcomputer for main body 214 or can be configured to be executed only by the microcomputer for lens 106. Alternatively, the processing can be configured to be executed by the microcomputer for main body 214 and the microcomputer for lens 106 in cooperation with each other.

For example, the operation ring 111 can be configured to be provided in the camera main body 200. In this case, for example, the operation ring 111 can be provided in the camera main body 200 as a rotary operation member such as a dial.

The digital camera is not limited to a camera of an interchangeable lens type and can be a camera of a lens fixed type in which a lens cannot be interchanged such as a compact camera. In this case, for example, the operation ring 111 can be provided in a lens barrel of the camera or, as explained above, the operation ring 111 can be provided as a rotary operation member such as a dial.

In the digital camera, the switching of the setting is performed according to a rotation angle from the reference position of the operation ring 111. The reference position is the absolute position. However, the reference position can be a relative position. In this case, for example, a position of the operation ring 111 at a point when the switching of the setting of the operation mode is performed can be set as a reference position and the switching of the setting can be performed according to a rotating direction and a rotation amount of the operation ring 111 from the reference position. In this case, it goes without saying that rotation resistance of the operation ring 111 is also changed as shown in, for example, FIGS. 20 and 21 according to the rotating direction and the rotation amount.

The operation ring 111 can be configured to be capable of endlessly rotating or can be configured to rotate only in a fixed rotation angle range such as 180 degrees. In this case, for example, if the reference position is a relative position, the operation ring 111 can be configured to be capable of endlessly rotating. If the reference position is an absolute position, the operation ring 111 can be configured to rotate only in a fixed angle range.

As explained above, in the first embodiment, the driving control device includes the fixed frame 122 (the fixed member), the operation ring 111 arranged to be manually rotatable with respect to the fixed frame 122, the transducer 110 arranged in one of the fixed frame 122 and the operation ring 111 and arranged to come into contact with an opposed surface of the other of the fixed frame 122 and the operation ring 111, the position detection sensor 109 (the position detecting section) that detects a position of the operation ring 111 with respect to the fixed frame 122, and the microcomputer for lens 106 and the microcomputer for main body 214 (the operation force amount control sections) that control driving of the transducer 110 and change contact friction force generated when the transducer 110 comes into contact with the fixed frame 122 or the operation ring 111.

In the driving control device, the operation force amount control sections (106 and 214) control the transducer 110 such that contact friction force applied to the operation ring 111 changes to a sense of click when the operation ring 111 is manually rotated with respect to the fixed frame 122.

Therefore, according to the first embodiment, operability of the operation ring 111 can be changed to appropriate operability according to the various operation modes such as the focus mode, the zoom mode, the photographing mode, the ISO sensitivity mode, the shutter speed mode, and the diaphragm mode.

Second Embodiment

A second embodiment of the present invention is explained below.

First, a configuration of a digital camera to which an operation device according to the second embodiment of the present invention is applied is explained below mainly with reference to FIG. 25.

A basic configuration of this embodiment is substantially the same as that in the first embodiment. Therefore, components same as the components explained in the first embodiment are shown in the figure using the same reference numerals and signs. Explanation of the same components is simplified and only differences from the first embodiment are explained in detail.

Figure 25:
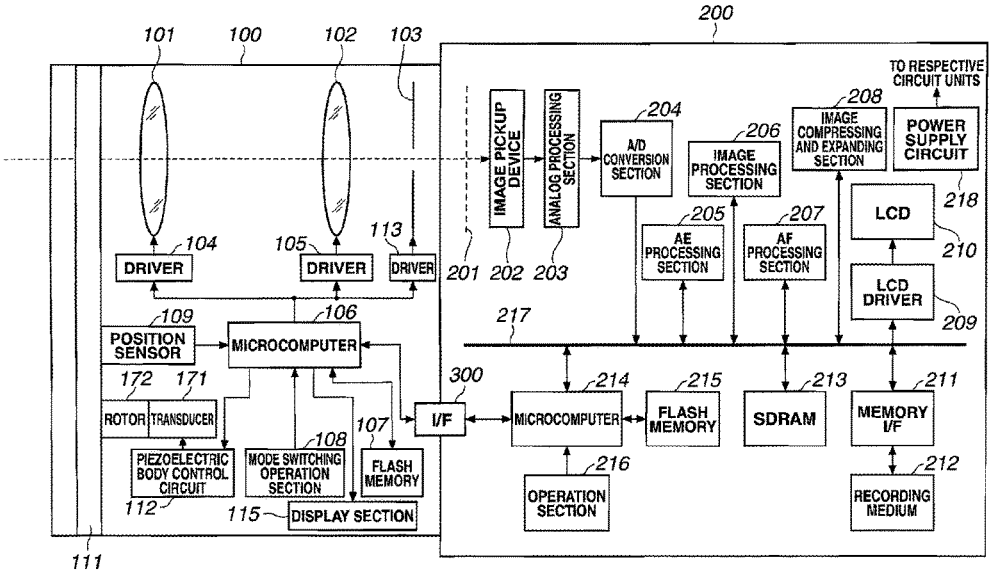
FIG. 25 is block configuration diagram showing a schematic configuration of a digital camera to which an operation device according to a second embodiment of the present invention is applied.

FIG. 25 is a diagram for explaining an operation device according to the second embodiment of the present invention and is a block diagram for explaining a configuration in which the operation device is applied to a digital camera.

The digital camera shown in FIG. 25 includes the interchangeable lens barrel 100 and the camera main body 200, which are connected to be capable of communicating with each other via the interface (I/F) 300.

As in the first embodiment, the interchangeable lens barrel 100 includes the focus lens 101, the zoom lens 102, the diaphragm mechanism 103, the drivers 104, 105, and 113, the microcomputer for lens 106, the flash memory 107, the mode switching operation section 108, the position sensor 109, a transducer 171, the operation ring 111, and the piezoelectric body control circuit 112. In this embodiment, in addition to these devices, the interchangeable lens barrel 100 includes a rotor 172 and a display section 115.

As explained in detail later, the position sensor 109 is a general term of position sensors. Specifically, the position sensor 109 includes a rotation position detection sensor 109A that detects a rotation position of the operation ring 111 with respect to the fixed frame 122 and a slide start detection sensor 109B that detects that the operation ring 111 starts to slide with respect to the fixed frame 122.

The camera main body 200 includes the mechanical shutter 201, the image pickup device 202, the analog processing section 203, the analog/digital conversion section (hereinafter referred to as "A/D conversion section") 204, the AF, processing section 205, the image processing section 206, the AF processing section 207, the image compressing and expanding section 208, the LCD driver 209, the LCD 210, the memory interface (hereinafter referred to as "memory I/F") 211, the recording medium 212, the SDRAM 213, the microcomputer for main body 214, the flash memory 215, the operation section 216, the bus 217, and a power supply circuit 218.

A detailed configuration of the interchangeable lens barrel 100 is explained.

As in the first embodiment, the microcomputer for lens 106 is connected to the drivers 104, 105, and 113, the I/F 300, the flash memory 107, the mode switching operation section 108, the position sensor 109, the piezoelectric body control circuit 112, and the like. In addition, the microcomputer for lens 106 is connected to the display section 115 as well.

The microcomputer for lens 106 controls the piezoelectric body control circuit 112 and the display section 115 on the basis of control information received from the microcomputer for main body 214. The microcomputer for lens 106 further controls the piezoelectric body control circuit 112 and the display section 115 on the basis of an output signal of the mode switching operation section 108 and an output signal of the position sensor 109 (the rotation position detection sensor 109A and the slide start detection sensor 109B).

The display section 115 is controlled by the microcomputer for lens 106 on the basis of position information of the position sensor 109A, which detects a rotation position of the operation ring 111, and speed information calculated by the microcomputer for lens 106 from the position information.

The mode switching operation section 108 is a button for instructing a change of a role of the operation ring 111 functioning as an operation member. Every time the mode switching operation section 108 is pressed, the microcomputer for lens 106 (or the microcomputer for main body 214) switches the role of the operation ring 111 between two states: mode switching and setting value change. If the role of the operation ring 111 is the mode switching, every time the operation ring 111 rotates, the microcomputer for lens 106 (or the microcomputer for main body 214) sequentially switches to any one of a focus mode, a zoom mode, a photographing mode, an ISO sensitivity mode, a shutter speed mode, a diaphragm mode, a white balance mode, and an art mode (ART-mode; an operation mode in which plural kinds of image processing for performing, for example, conversion of a photographed image into a monochrome image, a picture-like image, or the like can be selected). When a user presses the mode switching operation section 108 in the desired operation mode, the selected operation mode is decided. At the same time, the role of the operation ring 111 is changed as a role of an operation member for changing a setting value in the decided mode. For example, when the operation mode is decided as a manual focus mode (hereinafter referred to as MF mode), which is one kind of the focus mode, the operation ring 111 plays a role of a distance operation ring for adjusting a focus position.

As explained in detail later, the operation ring 111 is disposed to be fitted to, for example, an outer circumference of the interchangeable lens barrel 100 to be rotatable about an optical axis. The operation ring 111 is configured to be rotatable by manual operation by the user.

The transducer 171 is frictionally coupled to the rotor 172, which is a rotating member, in a state in which the transducer 171 is pressed against the rotor 172. The transducer 171 receives a control signal from the piezoelectric body control circuit 112 and oscillates. The piezoelectric body control circuit 112 is controlled by the microcomputer for lens 106 and controls an oscillation state of the transducer 171 to control force of the frictional coupling to the rotor 172, i.e., rotation resistance. Consequently, the piezoelectric body control circuit 112 controls rotation resistance of the operation ring 111 coupled by a mechanism for transmitting rotation force to the rotor 172. As explained in detail later with reference to FIGS. 28 to 33 and the like, a configuration of the transducer 171 includes, for example, a stacked piezoelectric body (171a) and oscillating bodies (171c and 171d) integrally formed with the piezoelectric body. In this embodiment, a load control mechanism 170 explained later is configured by the transducer 171, the rotor 172, and the like.

The rotation position detection sensor 109A of the position sensor 109 detects a rotation amount and a rotating direction of the operation ring 111 and outputs a signal of the detection to the microcomputer for lens 106. As explained in detail later, the rotation position detection sensor 109A includes, for example, a GMR element (giant magnetoresistance element) provided to be opposed to a magnetic scale provided on an inner circumference side of the operation ring 111. Naturally, a position detecting mechanism does not need to be a magnetic type and may be an optical type.

The other components are the same as those in the first embodiment.

A configuration of the camera main body 200 is the same as that in the first embodiment. In the camera main body 200 in this embodiment, as shown in FIG. 25, the power supply circuit 218 for supplying electric power to the circuit units is shown. The power supply circuit 218 is controlled by the microcomputer for main body 214 to supply necessary electric power to the circuit units at necessary timing as appropriate. Further, the power supply circuit 218 can supply electric power to the circuit units of the interchangeable lens barrel 100 as well via the I/F 300. In that case, the microcomputer for main body 214 performs power supply control in cooperation with the microcomputer for lens 106.

Figure 26:
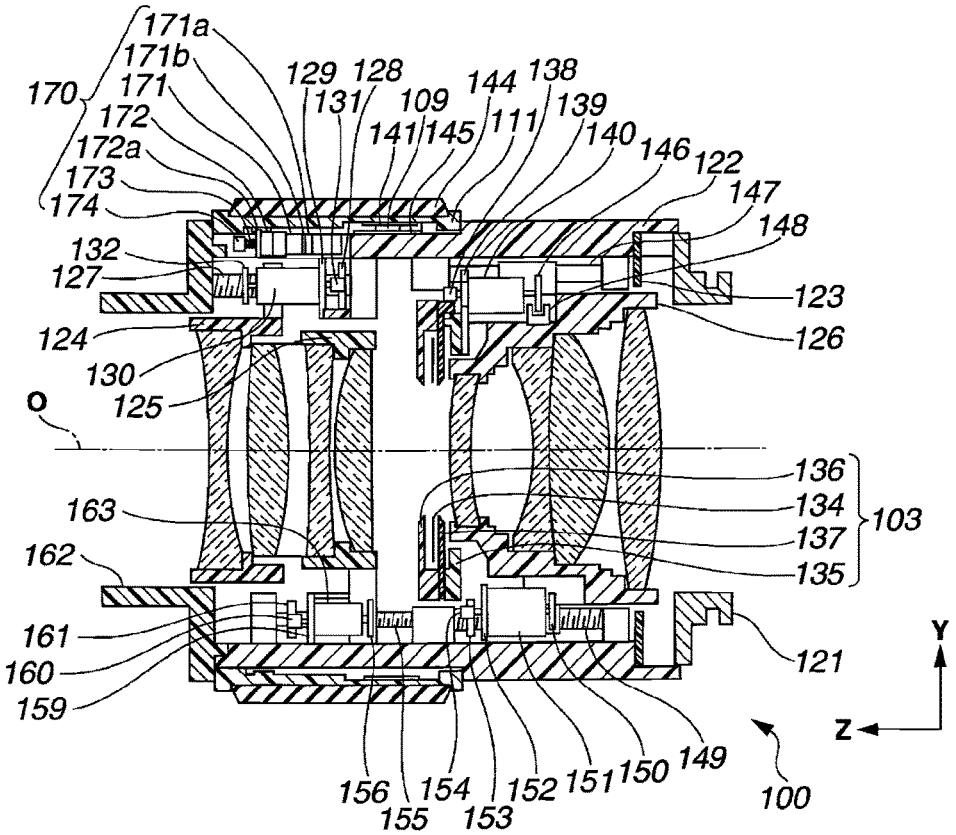
FIG. 26 is a sectional view showing a schematic configuration of a lens barrel applied to the digital camera shown in FIG. 25.

The configuration of the interchangeable lens barrel 100 in the digital camera is explained more in detail with reference to FIG. 26. As a drawing for explaining a driving mechanism for the first group frame 124 shown in FIG. 26, FIG. 3 referred to in the first embodiment is also referred to.

On an outer circumference of the first group frame 124 and the second group frame 125, the first group feed screw 127 having a shaft shape, in which a lead crew is formed, is arranged in parallel to the optical axis O and rotatable about the optical axis O. One end of the first group feed screw 127 is fitted in a hole (a camera main body side) of an inner circumference side projecting portion of the fixed frame 122 and the other end if fitted in a hole (a subject side) of the front fixed frame 162 fixed to the fixed frame 122. The first group screw gear 128 is firmly fixed to a rear end of the first group feed screw 127 by caulking, press-fitting, or the like.

The interchangeable lens barrel 100 in this embodiment adopts the form shown in FIG. 3 as in the first embodiment. Specifically, the first group motor 130 integral with the first group motor table 129 having a tabular shape is fixed to another projecting portion (not shown) of the fixed frame 122 by screws or the like. The first group motor gear 131 is fixed to one end of a rotating shaft of the first group motor 130 by press-fitting or the like. The first group screw gear 128 meshes with the first group motor gear 131. Further, the first group position detection vane 132, in which plural slits are provided radially with respect to a center of the rotating shaft, is fixed to the other end of the rotating shaft of the first group motor 130 by press-fitting or the like.

A female screw fitting with the first group feed screw 127 is formed in a projection (not shown) provided on an outer circumference side of the first group frame 124. The first group guide shaft 133, both ends of which are fixed to a projecting portion on the inner circumference side of the fixed frame 122, set in parallel to the optical axis O is held on an opposite side (see FIG. 3) of a setting position of the first group feed screw 127 with respect to the optical axis O. The first group guide shaft 133 fits in a long hole formed in the projection provided on the outer circumference of the first group frame 124 and extending in a radial direction with respect to the optical axis O. The first group guide shaft 133 is positioned in the fixed frame 122 and held by screw fitting with the first group feed screw 127.

Operation of the first group frame 124 configured as explained above is substantially the same as that in the first embodiment.

The diaphragm mechanism 103 includes the diaphragm vanes 134, the diaphragm table 135 rotatable about the optical axis, the diaphragm plate 137 held by the diaphragm cap 136, and a mechanism of a cam and a pin provided between the diaphragm plate 137 and the plural diaphragm vanes 134. With this mechanism, when the diaphragm plate 137 rotates, the plural diaphragm vanes 134 simultaneously operate along the cam and form a so-called iris diaphragm for stopping down an opening of the diaphragm cap 136. A gear is provided in an outer circumference side projecting portion of the diaphragm plate 137. The diaphragm motor gear 138 attached to one end of the motor shaft meshes with the gear.

Therefore, when the diaphragm motor 140 attached to the diaphragm table 135 via the diaphragm motor table 139 rotates, the diaphragm plate 137 rotates and the diaphragm vanes 134 simultaneously operate along the cam to form a so-called iris diaphragm for stopping down the opening of the diaphragm cap 136. A size of the iris diaphragm formed by the diaphragm vanes 134 can be changed according to brightness of a subject.

The other components are the same as those in the first embodiment.

The operation ring 111 is explained.

The position sensor 109 provided on an outer circumference of the fixed frame 122 to be opposed to the scale 141 of the operation ring 111 is the rotation position detection sensor 109A for detecting a rotation position of the operation ring 111 and is, for example, a GMR element (giant magneto-resistance element).

The rotation position detection sensor 109A is electrically connected to the electric board 123, on which a main circuit of a photographing lens is mounted, through the flexible printed circuit board 145. The rotation position detection sensor 109A is controlled by the microcomputer for lens 106 mounted on the electric board 123.

A configuration of the load control mechanism 170 including the transducer 171 that generates a sense of click in synchronization with rotation of the operation ring 111 when the user operates the operation ring 111, which is a manual operation member, to perform, for example, changes of setting items and setting values is explained.

Figure 27:
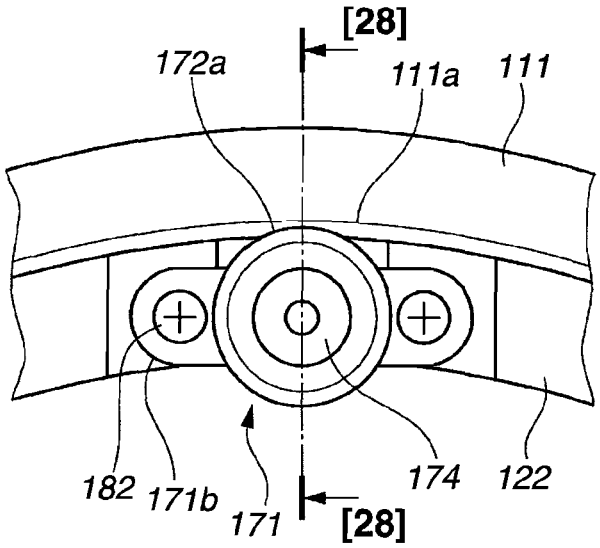
FIG. 27 is a front view showing, in enlargement, a load control mechanism attached to a fixed frame in the lens barrel shown in FIG. 26.
Figure 28:
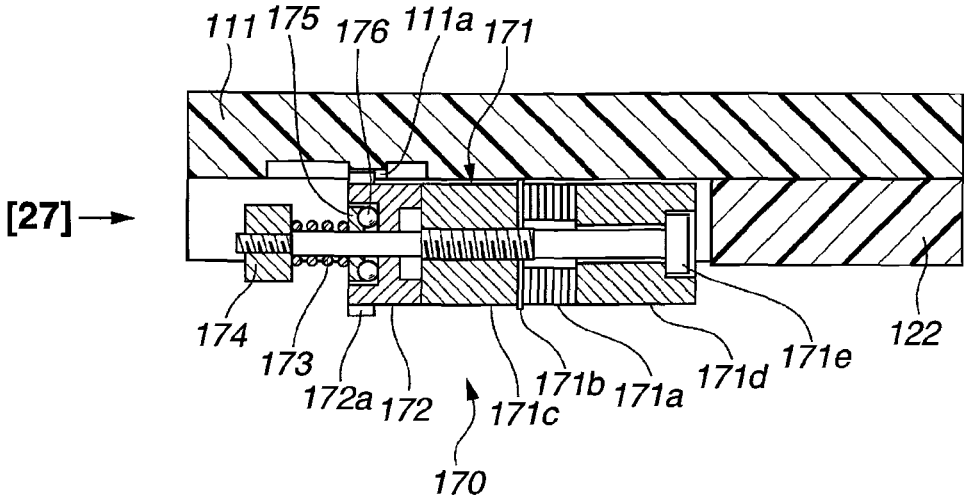
FIG. 28 is a sectional view taken along line [28]-[28] in FIG. 27.

FIG. 27 is a diagram showing a state in which the load control mechanism 170 shown in FIG. 26 is attached to the fixed frame 122. FIG. 28 is a diagram showing a detailed configuration of the load control mechanism 170.

In FIG. 27, the transducer 171 included in the load control mechanism 170 is fixed to the fixed frame 122 by screws 182 via a fixed plate 171b. As explained in detail with reference to FIG. 28, in the transducer 171 included in the load control mechanism 170, a gear 172a that meshes with an internal gear 111a of the operation ring 111 is provided.

In FIG. 28, the transducer 171 that controls rotation resistance of the operation ring 111 is formed in a cylindrical shape obtained by placing the stacked piezoelectric bodies 171a having a hole in a center and the tabular fixed plate 171b one on top of the other in a plate thickness direction and holding the piezoelectric bodies 171a and the fixed plate 171b with an oscillating body A 171c and an oscillating body B 171d. The piezoelectric bodies 171a and the fixed plate 171b, which are held between the oscillating body A 171c and the oscillating body B 171d, and the oscillating body B 171d are fit in and press-fit and fixed to the oscillating body A 171c by a bolt 171e.

The rotor 172 included in the load control mechanism 170 is load means. The rotor 172 rotatably fits with a shaft portion extended from an intermediate screw fitting portion of the bolt 171e. One end face of the rotor 172 is in contact with an outer side end face of the oscillating body A 171c and the other end of the rotor 172 is pressed by a spring 173. A recess in which balls 176 and a bearing 175 are arranged is formed at the other end. The bearing 175 arranged in the recess is pressed by the spring 173. A screw is formed at a distal end of the bolt 171e. A nut 174 is screwed with the screw and compresses the spring 173 to thereby press the bearing 175.

In a contact portion of the rotor 172 and the oscillating body A 171c, when a coefficient of friction of the contact portion is represented as μ and pressing force of the spring 173 is represented as Fp, friction force F=μ×Fp is generated. The friction force F is transmitted to the operation ring 111 meshed with the rotor 172 by a gear and applies an operation load to the operation ring 111. Although not shown in the figure, the transducer 171 is screwed to the fixed frame 122 via the fixed plate 171b. The fixed plate 171b is arranged in a node for vertical oscillation in the transducer 171 not to hinder oscillation of the transducer 171.

In a state in which a voltage is not applied to the piezoelectric body 171a, large friction force is generated in the contact portion of the rotor 172 and the oscillating body A 171c to keep relative positions of the operation ring 111 and the fixed frame 122. Therefore, for example, when the operation ring 111 is not manually operated, it is also possible to set the transducer 171 in a non-driven state and fix and hold the operation ring 111 with friction contact force.

When a frequency voltage is generated in the piezoelectric bodies 171a, the transducer 171 moves in a direction parallel to the optical axis O of the interchangeable lens barrel 100 and reduces the friction force in the contact portion of the rotor 172 and the oscillating body A 171c. When supply of the frequency voltage to the piezoelectric bodies 171a is stopped, friction force is generated between the rotor 172 and the oscillating body A 171c. An operation force amount of the operation ring 111 meshed with the rotor 172 by the gear increases to be extremely large and resistance increases. Therefore, it is possible to generate a sense of click in the operation ring 111 by repeating the supply and the stop of the frequency voltage. The friction force equivalent to a click force amount, which is resistance, can be changed by controlling a voltage applied to the piezoelectric body 171a to control oscillation amplitude of the transducer 171. The click force amount can also be controlled. When a frequency of the frequency voltage is set to a predetermined value, the transducer 171 can resonate and generate extremely large oscillation amplitude. The friction force can be reduced to be extremely small. At this point, the oscillation amplitude can be changed by slightly changing the frequency from a resonant frequency. The friction force can also be changed by changing the frequency.

Figure 29:
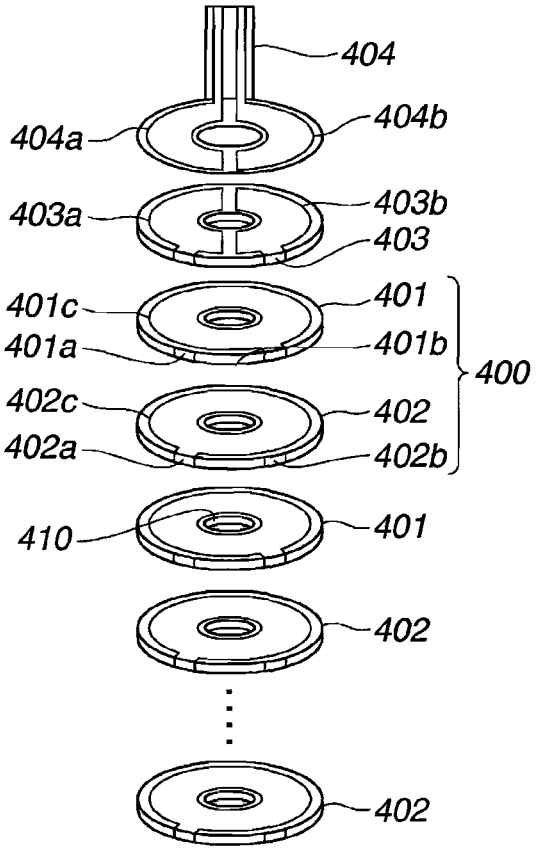
FIG. 29 is a disassembled perspective view showing a schematic configuration of a piezoelectric body that forms a transducer in the lens barrel shown in FIG. 26.
Figure 30:
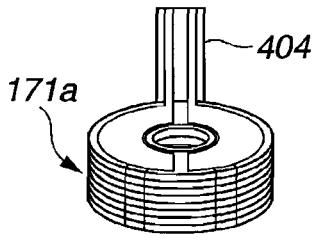
FIG. 30 is an assembly diagram showing a schematic configuration of the piezoelectric body shown in FIG. 29.

FIG. 29 is a disassembled perspective view for explaining a specific configuration of the piezoelectric body 171a included in the transducer 171. FIG. 30 is a diagram showing a state in which the transducer 171 is assembled.

As shown in FIG. 29, the piezoelectric body 171a includes a stacked piezoelectric body formed by stacking multiple piezoelectric body single plates having a circular plate shape made of piezoelectric ceramics such as lead titanate zirconate. As a basic configuration (reference numeral 400), a circular tabular piezoelectric body plate A 401 (a first tabular piezoelectric body) having predetermined thickness, in a center of which an attachment hole 410 is formed, and a circular tabular piezoelectric body plate B 402 (a second tabular piezoelectric body) having predetermined thickness, in a center of which the same hole 410 is formed, form a pair to be formed as a set of unit (400). A plurality of the units (400) are stacked. The attachment hole 410 is a hole for holding the piezoelectric body 171a with the oscillating body A 171c and the oscillating body B 171d and fixing the piezoelectric body 171a with the bolt 171e.

In the circular tabular piezoelectric body plate A 401 having the predetermined thickness, a circular electrode C 401c (a surface electrode), a rectangular tabular side electrode 1B (401b), and a rectangular tabular side electrode 1A (401a) are formed. The circular electrode C 401c is printed on a surface on one side of the circular tabular piezoelectric body plate A 401. The rectangular tabular side electrode 1B (401b) is electrically coupled to and printed in a position extending from the circular electrode C 401c to a side of the piezoelectric body plate A 401. The rectangular tabular side electrode 1A (401a) is electrically insulated from the circular electrode C (401c) and the side electrode 1B (401b) and printed on a side of the circular tabular piezoelectric body plate A 401, which is a side portion different from the side electrode 1B (401b).

In the circular tabular piezoelectric body plate B 402 having the predetermined thickness, a circular electrode C 402c (a surface electrode), a rectangular tabular side electrode 2A (402a), and a rectangular tabular side electrode 2B (402b) are formed. The circular electrode C 402c is printed on a surface on one side of the circular tabular piezoelectric body plate B 402. The rectangular tabular side electrode 2A (402a) is electrically coupled to and printed in a position extending from the circular electrode C 402c to a side of the piezoelectric body plate B 402, which is a position extending to a side portion corresponding to the side electrode 1A (401a). The rectangular tabular side electrode 2B (402b) is electrically insulated from the circular electrode C (402c) and the side electrode 2A (402a) and printed on a side of the circular tabular piezoelectric body plate B 402 corresponding to the side electrode 1B (401b), which is a side portion different from the side electrode 1B (401b).

The piezoelectric body plate A 401 and the piezoelectric body plate B 402 are stacked such that a surface of the piezoelectric body plate A 401 on which the circular electrode C 401c is not printed and a surface of the piezoelectric body plate B 402 on which the circular electrode C 402c is printed are opposed to each other. Further, as shown in FIG. 30, the piezoelectric body plate A 401 and the piezoelectric body plate B 402 are stacked such that the side electrode 1A (401a) and the side electrode 2A (402a) are linearly located and the side electrode 1B (401b) and the side electrode 2B (402b) are linearly located in a row.

Therefore, when the piezoelectric body plates are stacked, the stacked piezoelectric body plates are alternately connected to the circular electrodes (401c and 402c) by the electrodes 1A and 2A and the electrodes 1B and 2B formed on the side.

As shown in FIG. 29, an electrode plate 403 is disposed on a surface on an outermost side of the piezoelectric body 171a. On a surface of the electrode plate 403, two semicircular electrodes are formed to be symmetrical with respect to the attachment hole 410. Reference sign 403a denotes an electrode A of the electrode plate 403. A side electrode in contact with the side electrode 1A (401a) is arranged on a side portion of the electrode A 403a. Reference numeral 403b denotes an electrode B of the electrode plate 403. A side electrode in contact with the side electrode 1B (401b) is arranged on a side portion of the electrode B 403b.

The flexible printed circuit board 404 in which the attachment hole 410 is provided is connected to the electrodes A and B of the electrode plate 403 that is formed of ceramics but does not have piezoelectric action. The circuit pattern A 404a of the flexible printed circuit board 404 having a shape same as the electrode A is connected to the electrode A. The circuit pattern B 404b of the flexible printed circuit board 404 having a shape same as the electrode B is connected to the electrode B.

In FIG. 29, the plural piezoelectric body single plates are stacked. However, the same configuration can also be obtained by manufacturing the piezoelectric body 171a in a form in which the piezoelectric body single plates are folded.

FIG. 30 shows the piezoelectric body 171a obtained by stacking and sinter-forming the plural piezoelectric body single plates, which have the attachment hole 410 and on which the circular electrode C 401c and the circular electrode C 402c are alternately printed, and, after baking and printing two electrodes on a surface of a side of the piezoelectric body single plates and polarizing the electrodes, conductively joining the flexible printed circuit board 404 to an external electrode. After circular tabular piezoelectric body single plates without a hole are stacked and sinter-formed, a hole may be opened in a center of the piezoelectric body single plates by cutting.

Figure 31:
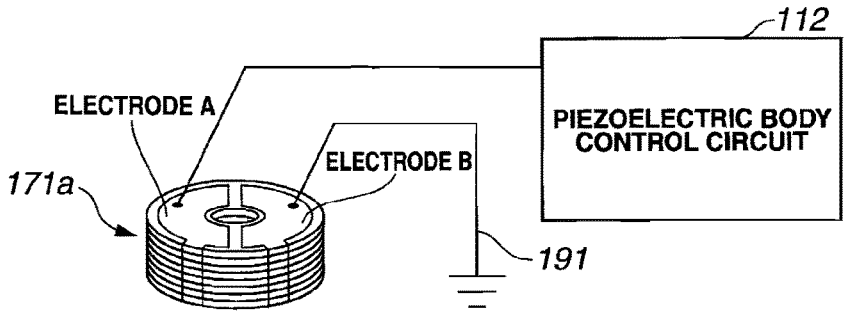
FIG. 31 is a connection conceptual diagram of the piezoelectric body shown in FIG. 30 and a piezoelectric body control circuit that applies a voltage to the piezoelectric body.

In the stacked piezoelectric body formed in this way, by applying a high voltage between the electrode A (1A and 2A) and the electrode B (1B and 2B), the electrodes A and B are polarized in the same direction in a plate thickness direction. Therefore, as shown in FIG. 31 indicating a concept of voltage application to the piezoelectric body, one of the polarized electrode A and electrode B of the piezoelectric body 171a is connected to a ground 191 of the piezoelectric body control circuit 112 and a signal output terminal of the piezoelectric body control circuit 112 is connected to the other to apply a frequency voltage to the piezoelectric body 171a. Then, the piezoelectric body 171a expands and contracts in the plate thickness direction.

A modification concerning the piezoelectric body (see FIGS. 29 to 31) in this embodiment is explained below with reference to FIGS. 32 and 33.

Figure 32:
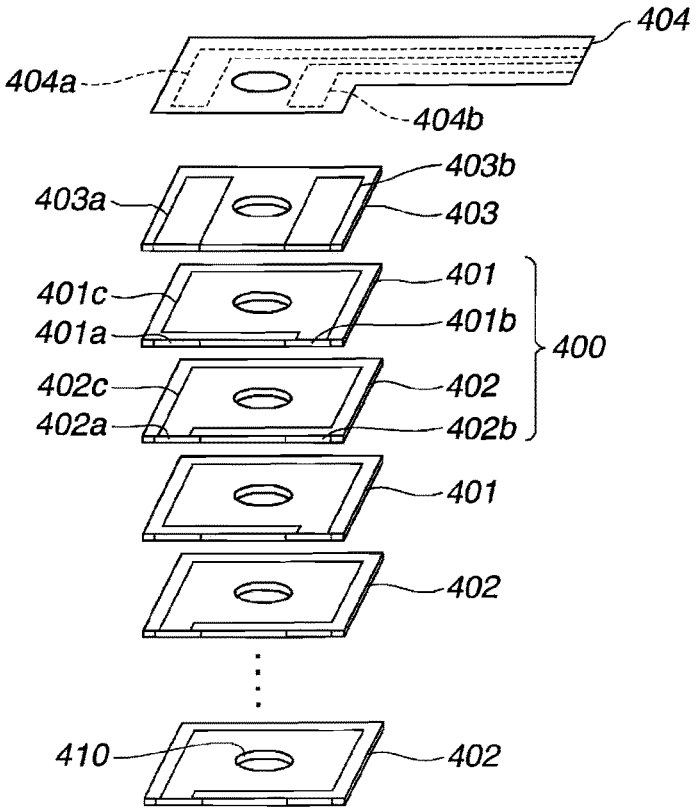
FIG. 32 is a disassembled perspective view showing a modification of the piezoelectric body shown in FIG. 29.
Figure 33:
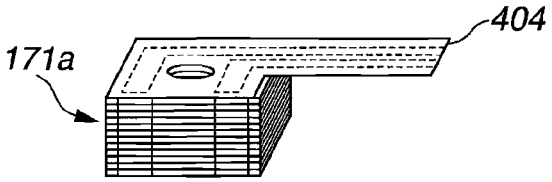
FIG. 33 is a piezoelectric body assembly diagram of the modification shown in FIG. 32.

FIGS. 32 and 33 are diagrams respectively corresponding to FIGS. 29 and 30. A piezoelectric body shown in FIGS. 32 and 33 is substantially different from the piezoelectric body shown in FIGS. 29 to 32 in that a shape of piezoelectric body plates is changed from a circular shape to a rectangular shape. Accordingly, the circular electrode is changed to a rectangular electrode having an attachment hole. Further, a shape of the flexible printed circuit board 404 and an electrode shape of an electrode C arranged on an outermost side are changed from the semicircular shape to a rectangular shape.

As explained above, in this modification (FIGS. 32 and 33), the circular electrode shown in FIG. 29 is changed to the rectangular shape. However, in FIG. 32, components having functions same as those of the components explained with reference to FIG. 29 are denoted by the same reference numerals and signs and explained. In this modification, the shape of the piezoelectric body plates A and B is rectangular (oblong). However, the piezoelectric body plates A and B only have to be angular at ends and may be formed in a square shape or a polygonal shape. When the shape of the stacked piezoelectric body is changed from circular to square, plural piezoelectric bodies can be sliced from one piece of piezoelectric ceramics. Therefore, slicing efficiency is improved. This is advantageous in terms of cost.

A modification in which the piezoelectric body explained in the modification explained above (FIGS. 32 and 33) is applied to the (transducer of) the load control mechanism is explained below with reference to FIGS. 34, 35, and 36.

Figure 34:
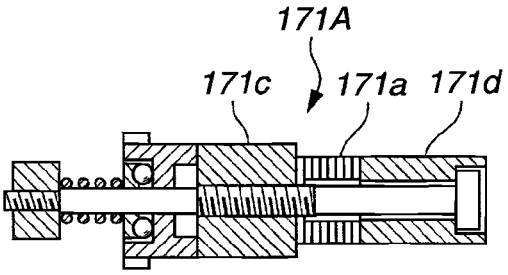
FIG. 34 is a sectional view showing a schematic configuration of a modification of a transducer applied to the lens barrel shown in FIG. 26.

FIG. 34 is a sectional view of a modification of a transducer (171A) applied to the load control mechanism in the second embodiment. FIG. 35 is an external view of the transducer. FIG. 36 is a diagram showing an attached state of the transducer. In the following explanation, only differences from the transducer applied to the load control mechanism (see FIG. 28) in this embodiment are explained. Components corresponding to those in this embodiment are denoted by the same reference numerals and signs and explained.

Figure 35:
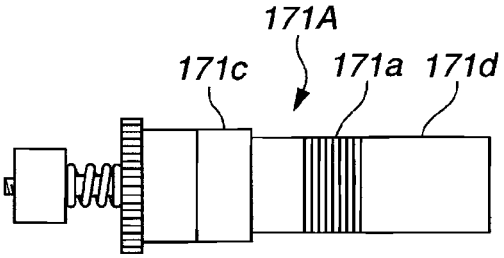
FIG. 35 is an external view of the transducer of the modification shown in FIG. 34.
Figure 36:
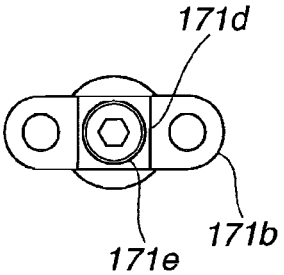
FIG. 36 is a diagram showing an attachment state of the transducer of the modification shown in FIG. 34.

As it is evident from the external view of FIG. 35, in the transducer 171A in this modification, a shape of the oscillating body A 171c is substantially different. Specifically, a side of the oscillating body A 171c in contact with the rotor 172 is a cylinder. A side of the oscillating body A 171c in contact with the piezoelectric body 171a is a prism internally in contact with the cylinder. In a center of the oscillating body A 171c, a hole through which the bolt 171e is inserted is opened. Further, the piezoelectric body 171a and the oscillating body B 171d are also formed in shapes corresponding to the prism of the oscillating body A 171c.

Since a rear end side of the transducer 171 is formed as the prism in this way, the transducer 171 can be formed small. An arrangement space for the flexible printed circuit board 404 extending from the piezoelectric body 171a can be secured. The stacked piezoelectric body having the square external shape can be manufactured by printing plural electrodes on one large plate of a piezoelectric body, a plurality of the stacked plates on which the plural electrodes are printed are sintered, and cutting the sintered stacked plates. Therefore, there is an effect that a large quantity of piezoelectric bodies can be easily manufactured. Further, since square piezoelectric bodies of the same shape are stacked, when the bolt 171e is rotated and tightened, it is easy to hold the oscillating body A 171c and the oscillating body B 171d not to rotate.

A mechanism for control of friction acting between contact portions of the oscillating body A 171c and the rotor 172 shown in FIGS. 27 and 28, in particular, a friction reduction is explained below with reference to FIGS. 37A, 37B, 37C, 37D, 37E, 37F, and 37G showing, for each predetermined time, a state of a transducer and a rotor driven by applying a predetermined frequency voltage to a piezoelectric body. Concerning a frequency voltage inputted to the piezoelectric body 171a included in the transducer 171 (an input voltage in changing the piezoelectric body 171a), FIG. 10 referred to in the first embodiment is referred to.

Figure 37A:
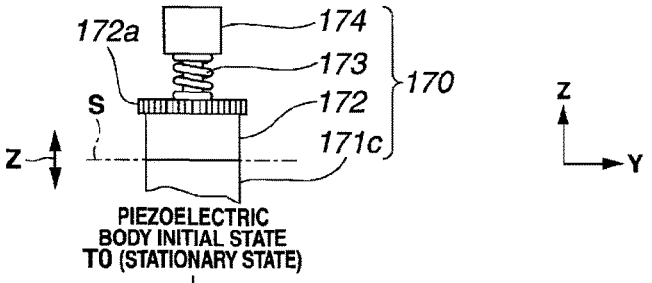
FIG. 37A is a diagram showing a state in which the transducer and a rotor are in an initial state (a stationary state) among states of the transducer and the rotor in applying a frequency voltage to the piezoelectric body shown in FIG. 31 to cause the piezoelectric body to oscillate.

As shown in FIG. 37A, in an initial state of the piezoelectric body, the rotor 172 in which the gear 172a is formed is pressed in a direction of the oscillating body A 171c by a spring 173. The rotor 172 and the oscillating body A 171c are in friction contact with each other. Pressing force applied to the oscillating body A 171c is adjusted by adjusting a position of a nut 174 that meshes with the bolt 171e.

In the example explained above, a compression coil spring is used for the adjustment of the pressing force. However, a disc spring or the like may be used. Any mechanism can be used as long as the mechanism can generate pressure between the oscillating body A 171c and the rotor 172 such as magnetic force by a magnet.

As a material of the oscillating body A 171c, metal, ceramics, or the like having high rigidity is desirable. As a material of the rotor 172 in contact with the oscillating body A 171c, it is desirable to use metal, ceramics, or the like having high rigidity and abrasion resistance. To suppress occurrence of audible sound, it is advisable to form the rotor 172 with a material obtained by kneading carbon fiber, glass fiber, or ceramic powder in resin such as PPS.

In an initial state (FIG. 37A and T0 in FIG. 10) in which a voltage is not applied to the piezoelectric body 171a, the rotor 172 is pressed against the oscillating body A 171c by pressing force of the spring 173 and is in contact with the oscillating body A 171c. The piezoelectric body 171a is caused to oscillate to generate acceleration in a several tens thousand $m/s^2$ level due to ultrasound oscillation on an end face of the oscillating body A 171c included in an end of the transducer 171.

Figure 37B:
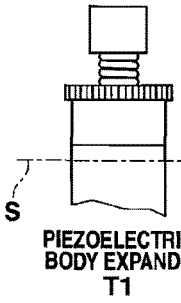
FIG. 37B is a diagram showing a state in which a maximum voltage is applied to the piezoelectric body and the piezoelectric body expands to the maximum after the state shown in FIG. 37A.

When a voltage equal to or higher than 20 kHz of a sine wave is applied to the piezoelectric body 171a, ultrasound oscillation of about 1 μm occurs on a contact surface of the rotor 172 and the oscillating body A 171c. The rotor 172 rises from the oscillating body A 171c and hardly comes into contact with the oscillating body A 171c. When a voltage is applied to the piezoelectric body 171a such that the piezoelectric body 171a extends, the oscillating body A 171c is pressed by the rotor 172 in a state in which force of a product of acceleration of displacement of the piezoelectric body and mass of the transducer 171 is applied to the oscillating body A 171c anew. The displacement acceleration gradually decreases to zero. A maximum voltage is applied to the piezoelectric body 171a. The piezoelectric body 171a expands to the maximum (FIG. 37B and T1 in FIG. 10). When generated acceleration in an initial period is extremely large, depending on conditions, the oscillating body A 171c does not come into contact with the rotor 172 in this state.

Figure 37C:
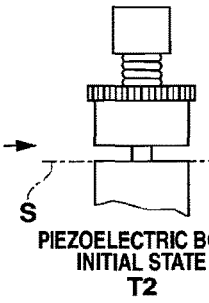
FIG. 37C is a diagram showing a state in which the piezoelectric body contracts and returns to the initial state after the state shown in FIG. 37B (after maximum deformation)

After being deformed to the maximum, the piezoelectric body 171a starts to contract and returns to the initial state. At this point, the spring 173 cannot sufficiently draw back displacement due to the acceleration generated by the piezoelectric body 171a (a response delay occurs because the piezoelectric body 171a has a small time constant but the spring 173 has a relatively extremely large time constant). Therefore, a state in which the oscillating body A 171c does not come into contact with the rotor 172 is realized (FIG. 37C and T2 in FIG. 10).

Figure 37D:
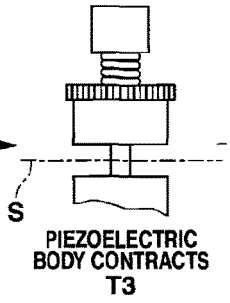
FIG. 37D is a diagram showing a state in which a maximum voltage in a direction for contracting the piezoelectric body is applied to the piezoelectric body after the state shown in FIG. 37C.

Subsequently, in a maximum voltage applied state in a direction in which the piezoelectric body 171a contracts, the state in which the oscillating body A 171c does not come into contact with the rotor 172 continues (FIG. 37D and T3 in FIG. 10).

Figure 37E:
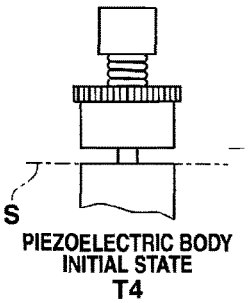
FIG. 37E is a diagram showing a state in which the applied voltage to the piezoelectric body is reduced to zero and the piezoelectric body returns to the initial state after the state shown in FIG. 37D.

The voltage applied to the piezoelectric body 171a decreases to zero and the piezoelectric body 171a returns to a state of displacement 0 in the initial state. However, the oscillating body A 171c does not come into contact with the rotor 172 (FIG. 37E and T4 in FIG. 10).

Further, when a voltage is applied in a direction in which the piezoelectric body 171a expands and the piezoelectric body 171a extends, the oscillating body A 171c comes into contact with the rotor 172 in a predetermined place. Acceleration is applied to the fixed frame 122 in a direction away from the oscillating body A 171c (FIG. 37F and T5 in FIG. 10).

Figure 37F:
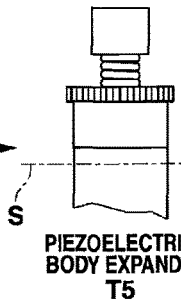
FIG. 37F is a diagram showing a state in which a voltage in a direction for expanding the piezoelectric body is applied to the piezoelectric body and the piezoelectric body expands again after the state shown in FIG. 37E.
Figure 37G:
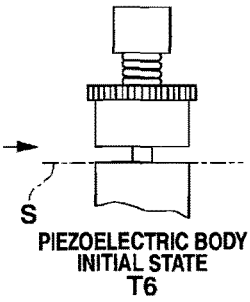
FIG. 37G is a diagram showing a state in which a voltage in a direction for contracting the piezoelectric body is applied to the piezoelectric body and the piezoelectric body returns to the initial state again after the state shown in FIG. 37F.

When a voltage is applied to the piezoelectric body 171a in the contracting direction again and the piezoelectric body 171a returns to the initial state, the oscillating body A 171c and the rotor 172 are not in contact with each other again (FIG. 37G and T6 in FIG. 10).

As explained above, the operation in one period of FIG. 37C to FIG. 37G is repeated. FIGS. 37A to 37C are states of transitional characteristics from a stationary state to steady oscillation occurrence. Therefore, in a steady state, FIGS. 37C to 37G are repeated.

In one period from FIGS. 37C to 37G, the oscillating body A 171c comes into contact with the rotor 172 only at an instance near FIG. 37F. In most time of one period, the oscillating body A 171c and the rotor 172 are in the non-contact state. The friction force F is zero during the time.

Therefore, average friction force F in one period is extremely small. Actually, if the operation ring 111 is caused to operate during the noncontact time of the rotor 172 and the oscillating body A 171c, the operation ring 111 operates at the friction force F=0. A brake is applied with instantaneous friction force at an interval of an oscillation period of the piezoelectric body 171a. However, since the oscillation period is extremely small, the operation ring 111 smoothly operates as if friction is steadily reduced.

As is seen from this operation, when the oscillation amplitude of the piezoelectric body 171a is changed, a contact time of the oscillating body A 171c and the rotor 172 changes. When the oscillation amplitude is reduced to be extremely small (amplitude is reduced to a value close to 0), the oscillating body A 171c and the rotor 172 are in a state substantially the same as the state in which the oscillating body A 171c and the rotor 172 are steadily in contact with each other. The friction force is $F \approx Fp$, where μ is a coefficient of friction of the contact surface of the oscillating body A 171c and the rotor 172 and Fp is the pressing force of the spring 173.

Figure 38:
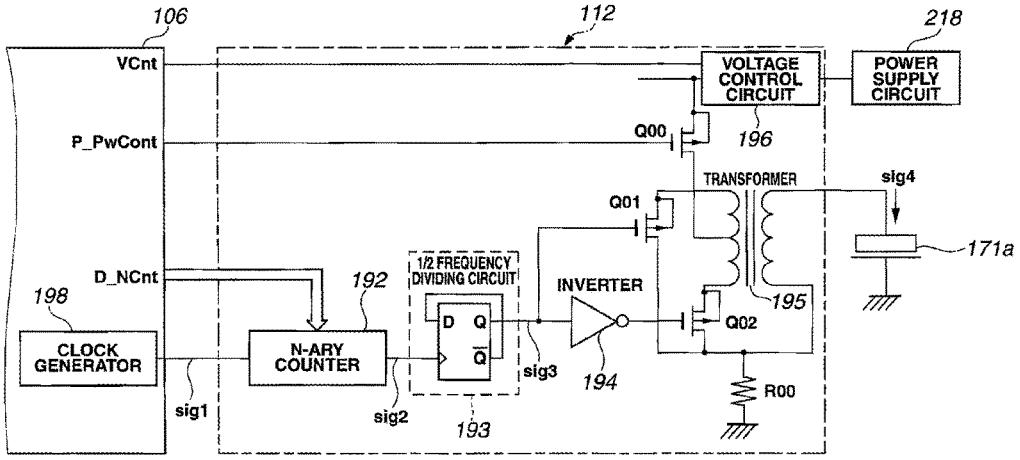
FIG. 38 is a circuit diagram showing a schematic configuration of the piezoelectric body control circuit for the piezoelectric body shown in FIG. 31.

FIG. 38 is a circuit diagram schematically showing a configuration of the piezoelectric body control circuit 112 of the piezoelectric body 171a. Forms of signals outputted from the components in the piezoelectric body control circuit 112 are the same as those in the piezoelectric body control circuit in the first embodiment. As time charts for the signal forms, FIGS. 12A, 12B, 12C, and 12D are referred to.

The piezoelectric body control circuit 112 illustrated herein includes a circuit configuration shown in FIG. 38. In the sections of the piezoelectric body control circuit 112, signals same as the signals (Sig1 to Sig4) having the waveforms represented by the time charts of FIGS. 12A to 12D are generated. The piezoelectric body control circuit 112 is controlled as explained below on the basis of the signals.

As illustrated in FIG. 38, the piezoelectric body control circuit 112 includes an N-ary counter 192, a ½ frequency dividing circuit 193, an inverter 194, plural MOS transistors Q00, Q01, and Q02, a transformer 195, and a resistor R00.

According to an ON/OFF switching operation of the MOS transistor Q01 and the MOS transistor Q02 connected to a primary side of the transformer 195, the signal (Sig4) of a predetermined period is generated on a secondary side of the transformer 195. The piezoelectric body 171a is driven on the basis of the signal of the predetermined period to cause oscillation shown in FIG. 35.

The microcomputer for lens 106 controls the piezoelectric body control circuit 112 as explained below via the two IO ports P_PwCont and D_NCnt provided as control ports and a clock generator 198 present on an inside of the microcomputer for lens 106.

The clock generator 198 outputs a pulse signal (a basic clock signal) to the N-ary counter 192 at a frequency sufficiently earlier than a signal frequency applied to the piezoelectric body 171a. This output signal corresponds to the signal Sig1 having the waveform shown in FIG. 12A. This basic clock signal is inputted to the N-ary counter 192.

The N-ary counter 192 counts the pulse signal and outputs a count end pulse signal every time the count reaches a predetermined value "N". In other words, the N-ary counter 192 divides a frequency of the basic clock single into 1/N. This output signal corresponds to the signal Sig2 having the waveform shown in FIG. 12B. In the frequency-divided pulse signal, a duty ratio of High and Low is not 1:1. Therefore, the piezoelectric body control circuit 112 converts the duty ratio into 1:1 through the ½ frequency dividing circuit 193. This converted pulse signal corresponds to the signal Sig3 having the waveform shown in FIG. 12.

In a High state of the converted pulse signal, the MOS transistor Q01 to which this signal is inputted is turned on. On the other hand, the pulse signal is applied to the MOS transistor Q02 through the inverter 194. Therefore, in a Low state of the pulse signal, the MOS transistor Q02 to which this signal is inputted is turned on. When the MOS transistor Q01 and the MOS transistor Q02 connected to the primary side of the transformer 195 are alternately turned on, a signal of a period like the signal Sig4 shown in FIG. 12D is generated on the secondary side.

A winding ratio of the transformer 195 is determined from an output voltage of the voltage control circuit 196 and a voltage necessary for driving of the piezoelectric body 171a. The resistor R00 is provided to restrict an excessively large current from flowing to the transformer 195. The power supply circuit 218 is provided, for example, in the camera main body 200. An output voltage of the power supply circuit 218 is supplied from the camera main body 200 (see FIG. 25) to the voltage control circuit 196 provided in the interchangeable lens barrel 100 (see FIG. 25) through the I/F 300 (see FIG. 25).

An output voltage of the voltage control circuit 196 is set and an applied voltage to the piezoelectric body 171a is determined from VCnt of the microcomputer for lens 106.

Oscillation amplitude of the piezoelectric body 171a is determined by the output voltage of the voltage control circuit 196.

A state of displacement of the contact portion at the time when oscillation amplitude of basic oscillation is changed by the voltage control circuit is the same as that in the first embodiment. Therefore, as a graph showing the state, FIG. 13 is referred to. Specifically, as it is evident from FIG. 13, a contact position in a Z direction (an optical axis direction) of the oscillating body A 171c and the rotor 172 changes when amplitude is expanded with respect to reference amplitude. According to this expansion of the oscillation amplitude, time in which the oscillating body A 171c is in contact with the rotor 172 decreases and friction force of the oscillating body A 171c and the rotor 172 changes. However, even if the oscillation amplitude is expanded, friction force does not decrease to zero and converges to the fixed friction force F0 close to zero.

On the other hand, if the transducer 171 is not oscillating, i.e., if the oscillation amplitude is zero, when a coefficient of friction between the oscillating body A 171c and the rotor 172 is represented as μ, assuming that pressing force=Fp, generated friction force is F=μ×Fp. When the oscillation amplitude is controlled by the voltage control circuit 196, the friction force can be changed from F to F0.

In order to generate a sense of click, the friction force between the oscillating body A 171c and the rotor 172 only has to be changed to correspond to a rotation position of the operation ring 111. A sense of click can be realized if the oscillation amplitude is changed to correspond to a position of the operation ring 111.

In this case, a relation between a corresponding rotation angle of the operation ring for generating a sense of click and an operation force amount of the operation ring and oscillation amplitude and an input voltage of a transducer corresponding to the operation force amount is the same as that in the first embodiment. Concerning the relation, FIGS. 14A, 14B, and 14C can be referred to. This graph can be changed. For example, in the example explained above (FIGS. 14A, 14B, and 14C), clicks in ten places are set to be generated in one rotation of the operation ring 111. However, the number of clicks can be freely changed.

In the example (FIGS. 14A, 14B, and 14C), clicks are distributed to the entire circumference at equal intervals. However, it is also possible to distribute clicks within a predetermined angle (e.g., 180°) and set the operation ring friction force to F in the remaining 180°. Further, it is also possible to distribute the clicks at unequal intervals rather than the equal intervals.

When the operation ring 111 is set to focusing not requiring a sense of click, if the oscillation amplitude is fixed irrespective of a position of the operation ring 111, the friction force between the oscillating body A 171c and the rotor 172 is fixed and the operation force amount of the operation ring 111 is fixed. If the oscillation amplitude of the transducer 171 is set to a different value, the operation force amount of the operation ring 111 can be set to a different operation force amount.

As in the example shown in FIGS. 15A, 15B, and 15C in the first embodiment, it is possible to obtain a sense of click different from that shown in FIGS. 14A to 14C by giving an input voltage signal different from that in the example shown in FIGS. 14A to 14C to the piezoelectric body 171a. Specifically, after suddenly expanding the oscillation amplitude from 0 to A, the oscillation amplitude is maintained for a predetermined time. Thereafter, rather than suddenly being reduced to 0 as shown in FIG. 14A to 14C, the oscillation amplitude is reduced to 0 for a predetermined time. Consequently, it is also possible to increase the operation ring friction force F0 to a maximum F for a predetermined time.

In FIG. 38, when the piezoelectric body 171a is driven, the MOS transistor Q00 has to be in an ON state and a voltage has to be applied from the voltage control circuit 196 to a center tap of the transformer 195. In this case, ON/OFF control for the MOS transistor Q00 is performed via the IO port P_PwCont of the microcomputer for lens 106. A setting value "N" of the N-ary counter 192 can be set from the IO port D_NCnt of the microcomputer for lens 106. Therefore, the microcomputer for lens 106 can arbitrarily change a driving frequency of the piezoelectric body 171a by appropriately controlling the setting value "N".

It is also possible to set the driving frequency to a resonant frequency of the transducer 171, expand the oscillation amplitude of the transducer 171, and cause the transducer 171 to operate at a low voltage. When the driving frequency is set to the resonant frequency, control for detecting an oscillation state of the piezoelectric body 171a and tracking the resonant frequency is necessary. The detection of the oscillation state can be performed by detecting an electric current and a voltage inputted to the piezoelectric body 171a because, for example, at the resonant frequency, impedance of the piezoelectric body decreases, the electric current inputted to the piezoelectric body 171a increases, and phases of the electric current and the voltage change. Alternatively, it is possible to detect resonance of the transducer 171 by forming a part of the stacked single plates of the piezoelectric body 171a as piezoelectric bodies for oscillation detection and detecting a voltage or a phase of an output voltage from the piezoelectric body for oscillation detection.

As in the first embodiment, according to Equation (1) above, a frequency outputted from the voltage control circuit 196 can be calculated.

Figure 39:
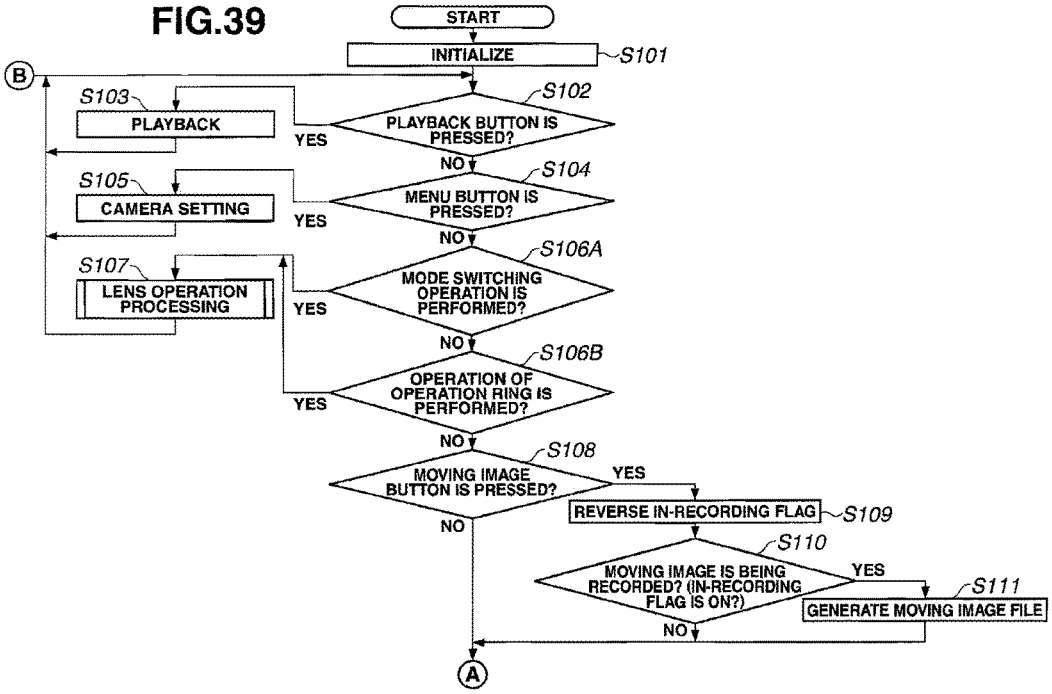
FIG. 39 is a flowchart for explaining a part (a former half) of a main processing sequence of the digital camera shown in FIG. 25.

FIG. 39 is a flowchart for explaining a part (a former half) of a main processing sequence performed in the digital camera to which the operation device according to the present invention is applied. The main processing sequence is substantially the same as that in the first embodiment. The former half shown in FIG. 39 is equivalent to FIG. 16 in the first embodiment. A latter half following FIG. 39 corresponds to FIG. 17. Therefore, in the following explanation, only the former half is explained and explanation of the latter half is omitted. This processing flow starts when the power button is pressed by the user and the power supply for the digital camera is turned on.

As shown in FIG. 39, when this processing flow starts, first, the microcomputer for main body 214 performs processing for initializing the sections of the digital camera (S101).

In this processing for initialization, for example, the microcomputer for main body 214 performs processing for resetting (setting to off) a flag indicating whether a moving image is being recorded (hereinafter referred to as "moving image in-recording flag"). The microcomputer for main body 214 also performs, for example, processing for switching setting of the operation mode of the operation ring 111 to the focus mode and changing control of the transducer 171 such that operability corresponding to the focus mode is obtained as operability of the operation ring 111.

Subsequently, the microcomputer for main body 214 determines whether the playback button is pressed (S102). If a result of the determination is Yes, the microcomputer for main body 214 performs playback processing (a playback sequence) (S103). In this playback processing, the microcomputer for main body 214 performs processing for, for example, displaying files recorded in the recording medium 212 on the LCD 210 as a list and playing back a file selected and determined by the user among the files. After the processing in S103, the microcomputer for main body 214 returns to S102.

On the other hand, if a result of the determination in S102 is No, the microcomputer for main body 214 determines whether the menu button is pressed (S104). If a result of the determination is Yes, the microcomputer for main body 214 performs camera setting processing (a camera setting sequence) (S105). In this camera setting processing, the microcomputer for main body 214 performs processing for, for example, displaying a menu for enabling a change of camera setting on the LCD 210 and changing camera setting according to camera setting selected and determined by the user in the menu. In this processing, user can change, for example, setting of a recording mode for a still image to any one of JPEG recording, JPEG+RAW recording, RAW recording, and the like. The user can change setting of a recording format for a moving image file to any one of AVI: Motion-JPEG, AVCHD: H.264, MP4: H.264, and the like. After the processing in S105, the microcomputer for main body 214 returns to S102.

On the other hand, if a result of the determination in S104 is No, the microcomputer for main body 214 determines whether mode switching operation is performed (S106A). If the mode switching operation section 108 is pressed, i.e., if a result of the determination is Yes, the microcomputer for main body 214 performs lens operation processing (a lens operation sequence) (S107). Concerning details of this lens operation processing, the processing sequence shown in FIG. 17 is executed in the same manner as in the first embodiment. After the processing in S107, the microcomputer for main body 214 returns to S102.

If the mode switching operation is not performed in S106A, the microcomputer for main body 214 determines whether the operation ring 111 is rotationally operated (S106B). If the rotation operation of the operation ring 111 is performed, the microcomputer for main body 214 proceeds to S107 and performs the lens operation processing (S107; refer to FIG. 18 for details). If the rotation operation for the operation ring 111 is not performed, i.e., if a result of the determination in S106B is No, the microcomputer for main body 214 determines whether the moving image button is pressed (S108).

If a result of the determination of the processing in S108 is Yes, the microcomputer for main body 214 reverses a moving image in-recording flag (S109). After the processing in S109, the microcomputer for main body 214 determines whether a moving image is being recorded. In other words, the microcomputer for main body 214 determines whether the moving image in-recording flag is on (S110). If a result of the determination is Yes, in order to start moving image recording, the microcomputer for main body 214 generates a new moving image file for recording (S111).

On the other hand, if a result of the determination of the processing in S108 is No, a result of the determination in S110 is No, or after the processing in S111, the microcomputer for main body 214 proceeds to the processing shown in FIG. 16 (sign A). Thereafter, the microcomputer for main body 214 performs the same processing.

In this embodiment, the processing corresponding to the setting of the operation mode (see S204 in FIG. 18) performed in the lens operation processing (S107 in FIG. 39; refer to FIG. 18 for details) is processing for changing a rotation touch set in S203 in the figure. For example, the processing is set as explained below.

(1) If the setting of the operation mode is the focus mode, rotation resistance of the operation ring 111 is set to be always minimized in a range in which the rotation resistance can be set. Therefore, a sense of click operation is set not to be generated. When the operation ring 111 is rotated to the right (a direction viewed from the camera main body side; the same applies below), the focus lens 101 is moved to a nearest side by a movement amount corresponding to a rotation amount (or a rotation position) of the operation ring 111. When the operation ring 111 is rotated to the left (a direction viewed from the camera main body side; the same applies below), the focus lens 101 is moved to an infinite side by the movement amount.

As explained above, the operation ring 111 and the rotor 172 are rotationally coupled to each other and rotation resistance generated due to friction contact between the rotor 172 and the transducer 171 can be controlled by changing the friction force through control of the transducer 171. Therefore, when the user manually rotates the operation ring 111, the user can generate rotation resistance of a predetermined magnitude as a rotation touch suitable for focus operation.

(2) If the setting of the operation mode is the zoom mode, as in the focus mode, the rotation resistance is set to be always minimized in the range in which the rotation resistance can be set. Therefore, a sense of click is set not to be generated. When the operation ring 111 is rotated to the right, the zoom lens 102 is moved by a movement amount corresponding to a rotation amount (or a rotation position) of the operation ring 111 in a direction in which a focal length decreases. When the operation ring 111 is rotated to the left, the zoom lens 102 is moved by the movement amount in a direction in which the focal length increases.

(3) If the setting of the operation mode is the photographing mode, when the operation ring 111 is rotated to the right with a predetermined sense of click operation, the microcomputer for main body 214 performs processing for sequentially switching setting of the photographing mode according to predetermined order to correspond to a rotation amount (or a rotation position) of the operation ring 111. The predetermined order is order of photographing modes of, for example, P (program exposure), A (diaphragm preference AE), S (shutter speed preference AE), M (manual exposure), and art (ART).

On the other hand, when the operation ring 111 is rotated to the left with a predetermined sense of click operation, the microcomputer for main body 214 performs processing for sequentially switching setting of the photographing mode according to order opposite to the order in the case of the right rotation to correspond to a rotation amount (or a rotation position) of the operation ring 111. A sense of click operation obtained when the setting of the operation mode is the photographing mode is set by processing equivalent to S203 in FIG. 18 such that a rotation angle of the operation ring 111 is divided into angles of 72 degrees at equal angle intervals and a sense of click is obtained five times in one rotation. Control of the transducer 171 is performed to obtain such a sense of click.

The predetermined five rotation angles at the equal angle intervals are rotation angles from a reference position (an absolute position) of the operation ring 111 and correspond to the five photographing modes (P, A, S, M, and ART). Therefore, when the user manually rotates the operation ring 111, the user can obtain a rotation touch suitable for setting operation for the photographing mode.

Even if the photographing mode is set to the five photographing modes (P, A, S, M, and ART), the photographing mode can be set not to generate a sense of click operation. In this case, a "sense of click unnecessary mode" is added to the operation modes selected by pressing of the mode switching operation section 108. If the "sense of click unnecessary mode" is selected in the processing equivalent to S202 in FIG. 18, rotation resistance of the operation ring 111 only has to be set to a predetermined value in the processing equivalent to S203. Besides the "sense of click unnecessary mode", an "A rotation resistance mode", a "B rotation resistance mode", and the like may be provided in the operation modes selected by the pressing of the mode switching operation section 108 such that the rotation resistance can be selected. In this case, the operation ring 111 only has to be manually rotated with reference to a liquid crystal display section, an indicator, or the like provided in the lens barrel.

(4) If the setting of the operation mode is the ISO sensitivity mode, when the operation ring 111 is rotated to the right with a predetermined sense of click operation, the microcomputer for main body 214 performs processing for sequentially switching setting of the ISO sensitivity according to predetermined order to correspond to a rotation amount (a rotation position) of the operation ring 111. The predetermined order is order of ISO sensitivity of, for example, 100, 200, 400, 800, 1600, 3200, 6400, and 12800. On the other hand, when the operation ring 111 is rotated to the left with a predetermined sense of click operation, the microcomputer for main body 214 performs processing for sequentially switching the setting of the ISO sensitivity according to order opposite to that in the case of the right rotation to correspond to a rotation amount of the operation ring 111.

A sense of click operation obtained when the setting of the operation mode is the ISO sensitivity mode is set by processing equivalent to S203 in FIG. 18 such that a rotation angle of the operation ring 111 is divided into angles of 45 degrees at equal angle intervals and a sense of click is obtained eight times in one rotation. Control of the transducer 171 is performed to obtain such a sense of click.

The predetermined eight rotation angles at the equal angle intervals are rotation angles from the reference position of the operation ring 111 and correspond to the eight kinds of ISO sensitivity (100, 200, 400, 800, 1600, 3200, 6400, and 12800). Therefore, when the user manually rotates the operation ring 111, the user can obtain a click sense suitable for setting operation for the ISO sensitivity. As in the photographing mode, the "sense of click unnecessary mode", the "A rotation resistance mode", the "B rotation resistance mode", and the like can be selected. Even if the ISO sensitivity is set to the eight kinds of ISO sensitivity (100, 200, 400, 800, 1600, 3200, 6400, and 12800), the ISO mode can be set not to generate a sense of click operation. In this case, the operation ring 111 only has to be manually rotated with reference to a liquid crystal display section, an indicator, or the like provided in the lens barrel.

(5) If the setting of the operation mode is the shutter speed mode, rotation resistance is set to increase as the rotation angle of the operation ring 111 increases in the predetermined rotation angle range of the operation ring 111 and suddenly increase outside the predetermined rotation angle range. Processing for switching setting of shutter speed is performed according to a rotation amount (or a rotation position) of the operation ring 111 in a direction for reducing exposure time when the operation ring 111 is rotated to the right and in a direction for increasing the exposure time when the operation ring 111 is rotated to the left. The direction for reducing the exposure time is also a direction for increasing the shutter speed. The direction for increasing the exposure time is also a direction for reducing the shutter speed. The predetermined rotation angle range is a range of a rotation angle from the reference position of the operation ring 111 and is associated in advance with a range of shutter speed that can be switched. A lower limit of the rotation angle range corresponds to highest shutter speed and an upper limit of the rotation angle range corresponds to lowest shutter speed.

Consequently, when the user switches the setting of the shutter speed to setting of desired shutter speed, the user can determine a rotating direction of the operation ring 111 for the switching according to a sense of rotation resistance of the operation ring 111. The user can sense, according to a suddenly increasing sense of rotation resistance of the operation ring 111, that the user is about to switch the setting of the shutter speed exceeding the range of the shutter speed that can be switched.

(6) If the setting of the operation mode is the diaphragm mode, as in the shutter speed mode, rotation resistance is set to increase as the rotation angle of the operation ring 111 increases in a range of the predetermined rotation angle range of the operation ring 111 and suddenly increase outside the predetermined rotation angle range. Processing for switching setting of a diaphragm is performed according to a rotation amount (or a rotation position) of the operation ring 111 in a direction for stopping down the diaphragm mechanism 103 when the operation ring 111 is rotated to the right and in a direction for opening the diaphragm mechanism 103 when the operation ring 111 is rotated to the left. The direction for stopping down the diaphragm mechanism 103 is also a direction for increasing a numerical value of a diaphragm value (an F value). The direction for opening the diaphragm mechanism 103 is also a direction for reducing the numerical value of the diaphragm value (the F value). The predetermined rotation angle range is a range of a rotation angle from the reference position of the operation ring 111 and is associated in advance with a range of a diaphragm that can be switched. Therefore, a lower limit of the rotation angle range corresponds to a smallest F value and an upper limit of the rotation angle range corresponds to a largest F value.

Consequently, when the user switches the setting of the diaphragm to setting of a desired diaphragm, the user can determine a rotating direction of the operation ring 111 for the switching according to a sense of rotation resistance of the operation ring 111. The user can sense, according to a suddenly increasing sense of rotation resistance of the operation ring 111, that the user is about to switch the setting of the diaphragm exceeding the range of the diaphragm that can be switched.

The shutter speed mode and the diaphragm mode may be set such that a sense of click can be obtained. When the shutter speed mode and the diaphragm mode are set such that a sense of click can be obtained, when the user manually rotates the operation ring 111, the user can sense, for example, a number-of-stages change amount (indicating a change in a diaphragm value as an exposure amount) of the diaphragm among click positions of the operation ring 111 as a rotation touch suitable for setting operation for the diaphragm. In this case, a change of the number of clicks and a change of a rotation angle of the operation ring 111 corresponding to the click intervals may be performed according to the set number-of-steps change amount.

The setting of the operation modes and the processing operation for the setting are explained above. However, it is also possible to perform, in an opposite manner, the processing performed according to the rotating direction of the operation ring 111. Specifically, the processing performed when the operation ring 111 is rotated to the left can be performed when the operation ring 111 is rotated to the right. The processing performed when the operation ring 111 is rotated to the right can be performed when the operation ring 111 is rotated to the left.

The other action is the same as that in the first embodiment explained above.

Third Embodiment

A third embodiment of the present invention is explained with reference to FIGS. 40 to 44.

In this embodiment, a manual focus mode (hereinafter referred to as MF mode) is further added as a mode selected by the mode switching operation section 108. This embodiment is an embodiment concerning a state of the display section 115 at the time when the operation ring 111 is rotated in a state in which the mode is switched to this MF mode.

A basic configuration of this embodiment is the same as that in the first and second embodiments. Therefore, the same components are denoted by the same reference numerals and signs and detailed explanation of the components is omitted.

Figure 40:
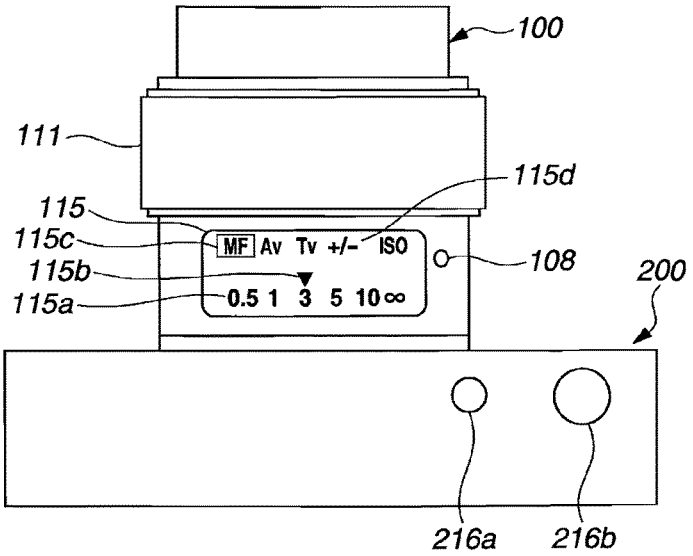
FIG. 40 is a diagram showing a schematic configuration of a digital camera to which an operation device according to a third embodiment of the present invention is applied.

FIG. 40 shows a display example performed when the mode switching operation section 108 is depressed and the MF mode is selected in processing equivalent to the processing in S202 in FIG. 17 in the action flowchart in the first and second embodiments.

FIG. 40 shows a state of the display section 115 at the time when the interchangeable lens barrel 100 is mounted on the camera main body 200 and a power switch 216a is turned on after the initialization processing in S101 in FIG. 39 in the action flowchart in the second embodiment.

FIGS. 41A to 41D respectively show states in which the operation ring 111 is rotated to switch display during the MF mode selected by the mode switching operation section 108.

FIGS. 42A to 42C and FIGS. 43A to 43E show two modifications concerning the display example in this embodiment.

Figure 44:
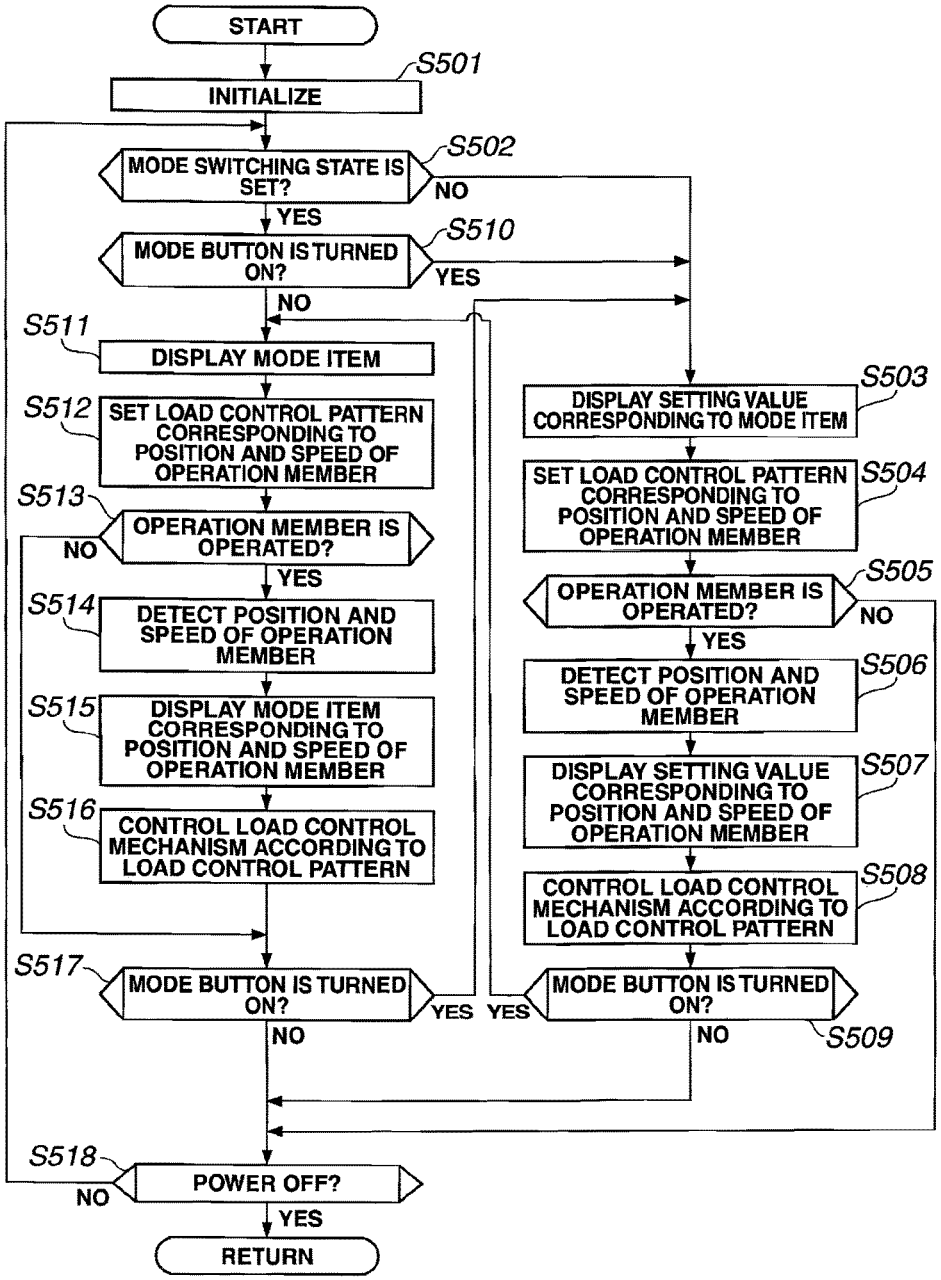
FIG. 44 is a flowchart for explaining a processing sequence of display operation (FIGS. 42A to 42C and FIGS. 43A to 43E) of the lens display section in the digital camera shown in FIG. 40.

FIG. 44 is a flowchart for explaining a display operation sequence in a lens barrel of a digital camera to which an operation device according to this embodiment is applied.

In FIG. 40, in the display section 115, mode items such as "MF" indicating the manual focus mode, "Av" indicating the mode for setting a diaphragm value, "Tv" indicating the mode for switching shutter speed, "+/−" indicating the mode for setting an exposure correction value, and "ISO" indicating the mode for setting ISO sensitivity are displayed on a mode display section 115d. When the user selects a desired mode out of these mode items by depressing the mode switching operation section 108, the selected mode is displayed while being surrounded by a mode display frame 115c having a rectangular shape. Mode content of the selected mode is displayed on a lower side of the mode display frame 115c as a memory 115a. The memory 115a is moved with respect to an indicator 115b and displayed according to rotation of the operation ring 111.

Figure 41A:
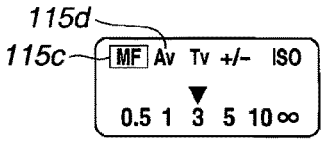
FIG. 41A is a display example of a lens display section of the digital camera shown in FIG. 40 and is a diagram showing a state of being set in an MF mode.

As indicated by initial state display in FIG. 41A, a mode name "MF" indicating the MF mode is displayed while being surrounded by the mode display frame 115c. This indicates that the MF mode is selected by the mode switching operation section 108 as a present mode.

Concerning a photographing distance of the interchangeable lens barrel 100, the indicator 115b indicates "3" of the memory 115a. Therefore, it is displayed that the operation ring 111 is rotated and a photographing distance of 3 m is selected.

When the operation ring 111 is rotated in this state, according to a rotating direction and a rotation position of the operation ring 111, the memory 115a is sequentially moved in the rotating direction and displayed.

Figure 41B:
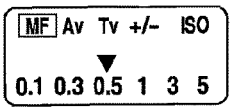
FIG. 41B is a diagram showing a state after rotation operation for an operation ring is performed in the state shown in FIG. 41A to perform display switching.

FIG. 41B shows that a photographing distance of 0.5 m is selected by right rotation (a direction viewed from the user) of the operation ring 111.

Figure 41C:
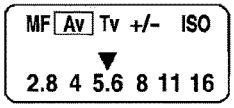
FIG. 41C is a diagram showing a state after depression operation for a mode switching operation section is performed in the state shown in FIG. 41A to perform operation mode switching.
Figure 41D:
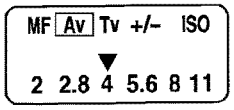
FIG. 41D is a diagram showing a state after rotation operation for the operation ring is performed in the state shown in FIG. 41C to perform display switching.

FIG. 41C shows a state in which the user depresses a mode button, which is the mode switching operation section 108, to select the diaphragm mode (hereinafter referred to as Av mode) (mode switching operation section ON) in the initial state display in FIG. 41A. When the Av mode is selected, the memory 115a changes to F number display of a diaphragm set beforehand. An F number indicated by the indicator 115b is also set beforehand. As this F number, a numerical value stored in the flash memory 107 of the interchangeable lens barrel 100 is invoked and displayed.

When the operation ring 111 is rotationally operated in the state shown in FIG. 41C, according to a rotating direction and a rotation position of the operation ring 111, the memory 115a sequentially moved in the rotating direction and displayed. At this point, as explained in the processing in S305 in FIG. 19, the load control mechanism 170 (the transducer 110) is controlled and a sense of click is generated in the operation ring 111. Specifically, a sense of click is generated every time the F number shifts by one with respect to the indicator 115b according to the rotation of the operation ring 111.

Figure 42A:
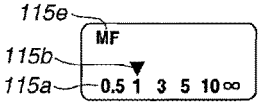
FIG. 42A is another display example of the lens display section of the digital camera shown in FIG. 40 and is a diagram showing a state of being set in the MF mode.
Figure 42B:
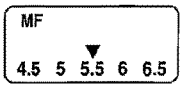
FIG. 42B is a diagram showing a state after low-speed rotation operation for the operation ring is performed in the state shown in FIG. 42A to perform display switching.
Figure 42C:
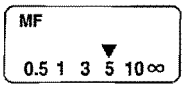
FIG. 42C is a diagram showing a state after high-speed rotation operation for the operation ring is performed in the state shown in FIG. 42B to perform display switching.

FIGS. 42A to 42C are modifications in which display content is changed according to rotating speed of the operation ring 111.

In the following explanation, "low-speed rotation" is defined as a value of clicks in a rotating direction of the operation ring 111 equal to or smaller than twice/sec and "high-speed rotation" is defined as a value of rotation clicks of the operation ring 111 larger than twice/sec. However, since a sense is different depending on a person, this definition is only an example.

Detection of rotating speed is performed by a publicly-known photo-sensor or magnetic sensor and determined by the microcomputer 106 on the basis of the criteria explained above.

As indicated by an initial state shown in FIG. 42A, when the MF mode is selected by the mode button, which is the mode switching operation section 108, a mode name 115e "MF" is displayed on the mode display section 115. A subject distance and the indicator 115b indicating that a photographing distance is "1 m" are displayed on the memory 115a.

When the operation ring 111 is rotated at low speed with clicks in this initial state, as indicated by operation ring low-speed rotation in FIG. 42B, the subject distance of the memory 115a is changed to finer numerical values (4.5 to 6.5 at an interval of 0.5). When the operation ring 111 continues to be rotated at low speed with clicks, the memory 115a moves with respect to the indicator 115b. A change in the subject distance with respect to a rotation angle of the operation ring 111 also becomes finer in association with the change of the display.

When the operation ring 111 is rotated at high speed with clicks from the state shown in FIG. 42B, as shown in FIG. 42C, the subject distance of the memory 115a changes to rough values. A change in the subject distance with respect to the rotation operation angle of the operation ring 111 also becomes rough. It goes without saying that, as in a general MF mode, rotation resistance to the operation ring 111 may be set in a state without a sense of click.

The display is changed according to the rotating speed of the operation ring 111 and the rotation angle of the operation ring 111 is associated with the change in this way. Consequently, when the user desires to precisely adjust the subject distance, it is possible to slowly rotate the operation ring 111 and precisely adjust the subject distance.

When the user desires to quickly change the subject distance, it is possible to quickly rotate the operation ring 111 to substantially change the subject distance. Therefore, irrespective of where the subject is present, operation and display are associated. Therefore, it is possible to smoothly and quickly change the subject distance without a sense of discomfort.

FIGS. 43A to 43E show another modification. Control is performed to enable the user to perform mode change operation according to rotation speed of the operation ring 111.

More specifically, in the other modification, the user changes the camera to a mode changeable state by depressing the mode switching operation section 108 once rather than performing a mode change by depressing the mode switching operation section 108 plural times. Thereafter, the user performs the mode change in a rotation position of the operation ring 111.

Figure 43A:
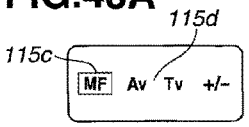
FIG. 43A is still another display example of the lens display section of the digital camera shown in FIG. 40 and is a diagram showing a state of being set in the MF mode.

In the other modification, when the mode switching operation section 108, which is the mode button, is turned on in the initial state shown in FIG. 42A, the display of the mode display section 115 changes to a mode button ON state as shown in FIG. 43A. This state is a mode switching state in which a mode can be changed according to rotation of the operation ring 111. At this point, the modes of MF, Av, Tv, and +/− are displayed on the mode display section 115. Further, the mode display frame 115c is displayed, whereby it is displayed that the mode display section 115 is in a state in which "MF" is selected.

When the operation ring 111 is slowly rotated with clicks in the state shown in FIG. 43A, the mode display frame 115c sequentially moves in the right direction and the mode is switched. For example, a state shown in FIG. 43B ("operation ring low-speed rotation") is a display example of a state in which the mode is switched to "Av".

Figure 43B:
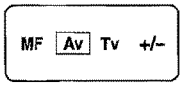
FIG. 43B is a diagram showing a state after the rotation operation for the operation ring is performed in the state shown in FIG. 43A to perform mode switching.
Figure 43C:
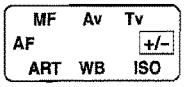
FIG. 43C is a diagram showing a state after the high-speed rotation operation for the operation ring is performed in the state shown in FIG. 43B to perform mode switching.

When the operation ring 111 is quickly rotated with clicks from the state shown in FIG. 43B, the display changes to display representing the modes as shown in FIG. 43C ("operation ring high-speed rotation"). Specifically, MF, Av, Tv, +/−, ISO, WB, ART, and AF are displayed while being arranged in order clockwise in positions along a peripheral edge of the display section 115. The mode is sequentially switched to correspond to a rotation direction of the operation ring 111. In the state shown in FIG. 43C, the mode display frame 115c is displayed to surround "+/−". It is displayed that the "+/−" mode is selected and the mode is switched.

Figure 43D:
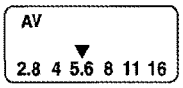
FIG. 43D is a diagram showing a state after an operation mode is decided by depression operation for a mode switching operation section in the state shown in FIG. 43B.

On the other hand, when the mode switching operation section 108 is turned on in the display state shown in FIG. 43B, a mode selected at that point (the Av mode in the example shown in FIG. 43B) is decided. As shown in FIG. 43D, the Av mode is selected and selection items in the Av mode are displayed. In other words, in a display example shown in FIG. 43D, the Av mode is selected and F numbers are displayed on the memory 115a.

Figure 43E:
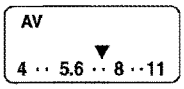
FIG. 43E is a diagram showing a state after the low-speed rotation operation for the operation ring is performed in the state shown in FIG. 43D to perform display switching.

When the operation ring 111 is slowly rotated (low-speed rotation) in this state, as shown in FIG. 43E, as in the subject distance display (see FIG. 42C), the memory 115a changes to finer display. Specifically, in the display shown in FIG. 43E, the F number display is performed, numerical value display for each stage of an exposure amount is performed, and display of plural dots is performed among numerical values. The dots of the dot display represent, with one scale, an interval of an exposure amount of a ⅓ stage. Such a number-of-stages interval may be set rougher or plural modes having different intervals of the number of stages may be provided.

FIG. 44 is an example of a flowchart for explaining a processing sequence in causing the display section 115 to execute the display operation shown in FIGS. 42A to 42C and FIGS. 43A to 43E.

When the power switch 216a (see FIG. 40) of the camera is turned on, the microcomputer for lens 106 in the lens executes operation for initialization (S501).

Subsequently, the microcomputer for lens 106 determines whether the mode switching operation section 108 is depressed and the camera is in the mode changeable state (S502). If a result of the determination is No, the microcomputer for lens 106 determines that it is possible to change the mode according to a rotation position of the operation ring 111 and displays the mode set in the operation ring 111 on the memory 115a of the display section 115 (S503).

The microcomputer for lens 106 reads a load pattern corresponding to a position and speed of the operation ring 111 in that mode state into the microcomputer for lens 106 (S504) and determines whether the operation ring 111, which is the operation member, is operated (S505). If a result of the determination is No, the microcomputer for lens 106 determines whether the power switch is turned off (S518).

On the other hand, if a result of the determination in the processing in S505 is Yes, the microcomputer for lens 106 detects a position and speed of the operation ring 111 (S506)

and displays a setting value corresponding to the position and the speed (S507). Setting values and load patterns corresponding to positions and speeds are stored, for example, in the flash memory 107 as a table in advance.

Subsequently, the microcomputer for lens 106 controls the load control mechanism 170 according to the load pattern and gives a predetermined sense of operation of the operation ring 111 (S508). The microcomputer for lens 106 determines whether the mode button is turned on (S509). If the mode button is not turned on, the microcomputer for lens 106 determines whether the power switch is off (S518).

On the other hand, if a result of the determination in the processing in S509 is Yes, as in the case of Yes in the determination in the processing in S510, the operation ring 111 changes to a mode setting state. The microcomputer for lens 106 displays mode items (S511).

The microcomputer for lens 106 reads a load pattern corresponding to a position and speed of the operation ring 111 into the microcomputer for lens 106 (S512). Since the operation ring 111 is the operation member for performing mode setting, a load pattern for generating a sense of click is set for each of the modes.

The microcomputer for lens 106 determines, from an output signal of the position sensor 109A that detects a position of the operation ring 111, whether the operation ring 111 is operated (S513). If the operation ring 111 is operated, the microcomputer for lens 106 performs, in steps S514, S515, and S516, operation same as the operation in steps S506, S507, and S508 and determines whether the mode button is turned on (S517).

On the other hand, if a result of the determination in the processing in step S513 is No, the microcomputer for lens 106 determines whether the mode button is turned on (S517). If a result of the determination in the processing in S517 is Yes, the microcomputer for lens 106 executes a series of operation in step S503 and subsequent steps. If a result of the determination is No, the microcomputer for lens 106 determines whether the power supply is off (S518). If a result of the determination in the processing in S518 is Yes, the operation ends. If a result of the determination is No, the microcomputer for lens 106 returns to the determination of a mode switching state in step S502.

Fourth Embodiment

A fourth embodiment of the present invention is explained below with reference to FIGS. 45 to 49.

A basic configuration of this embodiment is substantially the same as that of the second embodiment. Therefore, components same as those shown in FIGS. 25 and 26 explained in the second embodiment are denoted by the same reference numerals and signs. Different members are denoted by new reference numerals and signs and explained.

Figure 45:
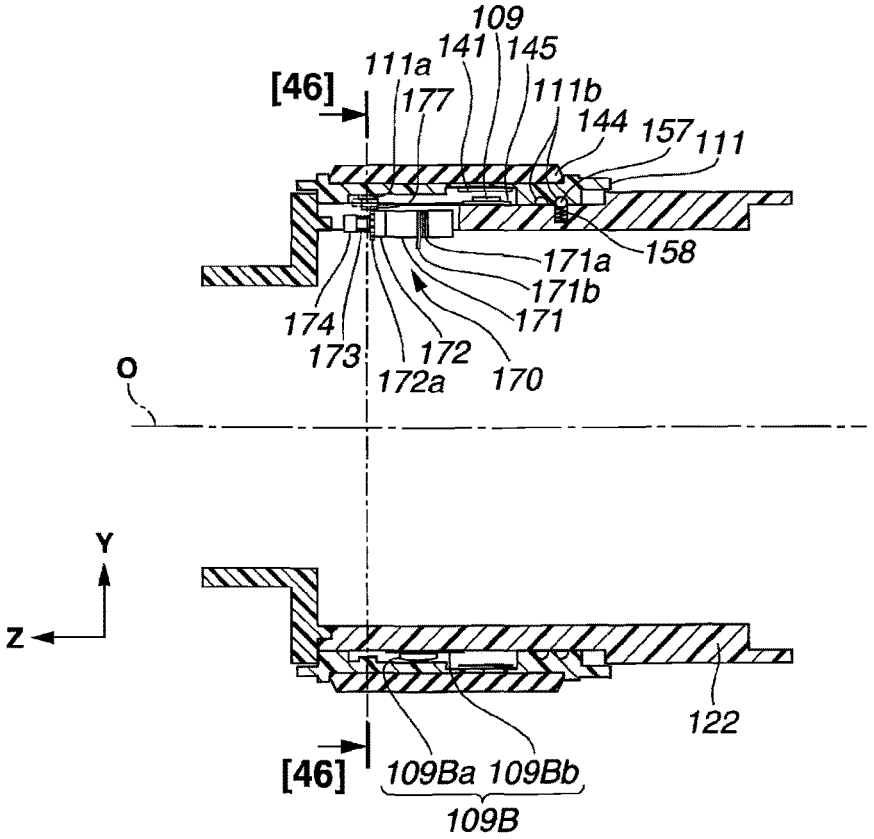
FIG. 45 is a main part sectional view showing a schematic configuration in an interchangeable lens barrel to which an operation device according to a fourth embodiment of the present invention is applied.
Figure 46:
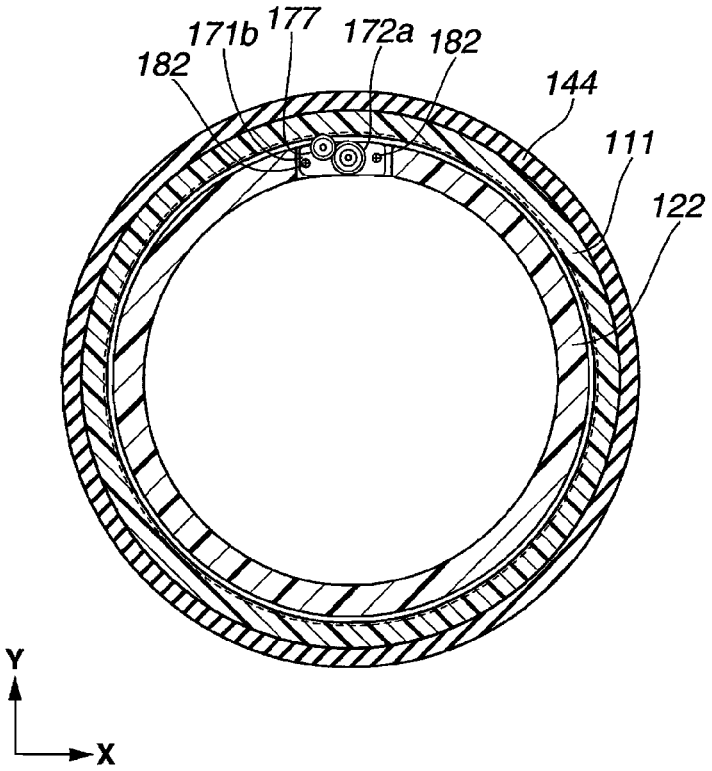
FIG. 46 is a sectional view taken along line [46]-[46] in FIG. 45.

FIG. 45 is a schematic sectional view of a lens barrel to which an operation device according to the fourth embodiment of the present invention is applied. FIG. 46 is a sectional view taken along line [46]-[46] in FIG. 45.

Figure 47:
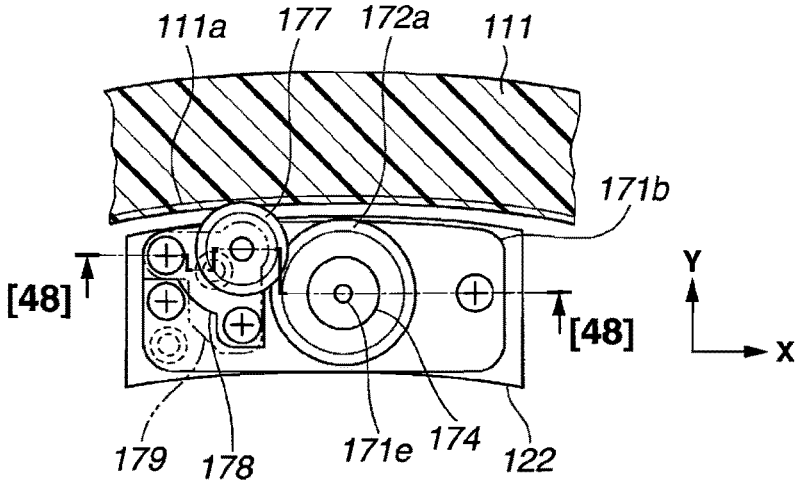
FIG. 47 is a front view showing, in enlargement, a load control mechanism in the interchangeable lens barrel shown in FIG. 46.
Figure 48:
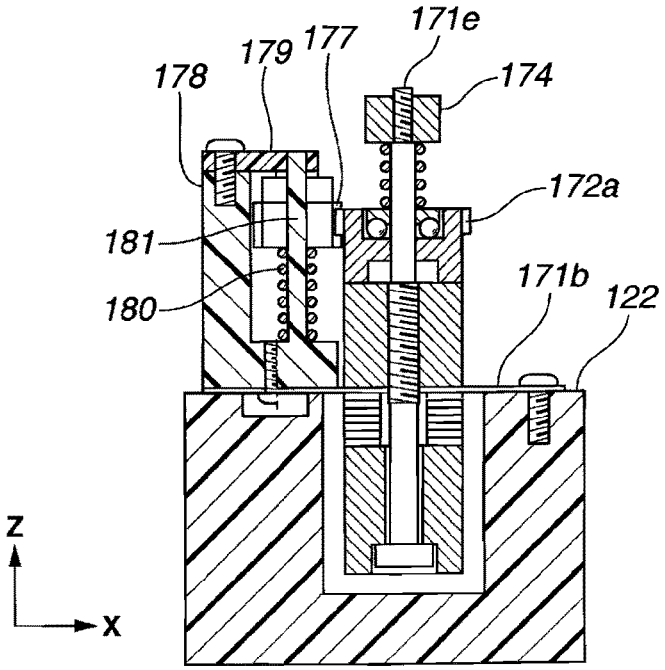
FIG. 48 is a sectional view taken along line [48]-[48] in FIG. 47.
Figure 49:
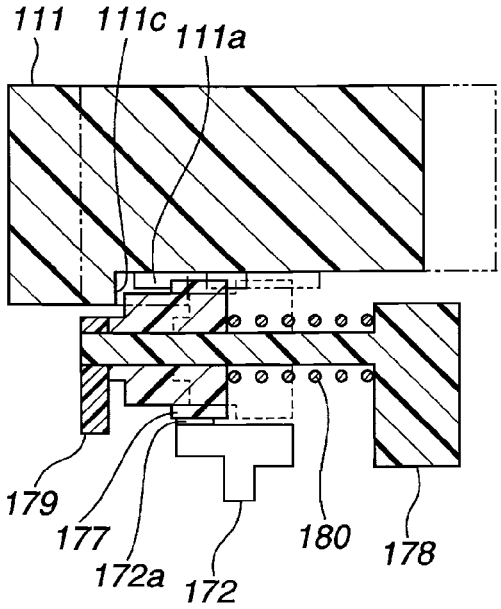
FIG. 49 is a diagram for explaining switching operation for a gear in sliding an operation ring in the interchangeable lens barrel shown in FIG. 45.

FIG. 47 is a diagram for explaining transmission mechanisms (gears 172a, 177, etc.) included in the load control mechanism 170 and is an enlarged view of a periphery of the gear 172a, the gear 177, and the fixed plate 171b shown in FIG. 46. FIG. 48 is a schematic sectional view of a cross section along line [48]-[48] in FIG. 47 and is a diagram for explaining a relation between the gear 172a and the gear 177 included in the load control mechanism 170. Further, FIG. 49 is a diagram for explaining operation of the gear 177 in sliding the operation ring 111. The gear 172a and the gear 177 are load means in this embodiment.

In the lens barrel in this embodiment, an operation ring is configured to be capable of being slid back and forth in an optical axis direction.

As shown in FIGS. 45 and 46, the operation ring 111, on an outer circumference of which the rubber 144 for slip resistance is provided and on an inner surface of which the gear 111a is provided, is configured to be capable of being manually slid back and forth and rotated with respect to the fixed frame 122 in an optical axis direction of the interchangeable lens barrel 100. On an inner circumferential surface side of the operation ring 111, plural grooves 111b in which the balls 157 fit are formed along the circumference.

The balls 157 are pressed to the grooves 111b side by a spring 158 provided in the fixed frame 122. For example, when the operation ring 111 slides to the camera main body 200 side, the fitting of the balls 157 changes from the grooves 111b to the grooves 111b to give a sense of click to the user and inform, with the sense of click, the user that the operation ring 111 slides.

As shown in FIGS. 47 and 48, the load control mechanism 170 same as the one explained with reference to FIG. 26 in the second embodiment and a gear table 178 arranged in parallel to the load control mechanism 170 are fixed to the fixed frame 122 via the fixed plate 171b.

On the gear table 178, a shaft 181 parallel to the bolt 171e included in the load control mechanism 170 and a spring 180 and the gear 177 arranged on the shaft 181 are arranged. The gear 111a of the operation ring 111 meshes with a gear of the rotor 172 included in the load control mechanism 170 via the gear 177. The gear 177 and the gear of the rotor 172 configure load means in this embodiment.

As shown in FIG. 49, in the operation ring 111, a flange 111c for moving the gear 177 against the spring 180 when the operation ring 111 is slid to the camera main body 200 side is provided. Therefore, the gear 177 is pushed and moves in a sliding direction in association with the sliding of the operation ring 111, whereby meshing of the gear 177 and the gear 111a is released. Then, the operation ring 111 can smoothly rotate without receiving a load of the load control mechanism 170, i.e., even if the load control mechanism 170 is not energized.

A rotation position of the operation ring 111 is detected by the sensor 109 and the scale 141. However, a position and size of the scale 141 are set such that a position in a rotation direction of the operation ring 111 by the position sensor 109 can be performed even in a state in which the operation ring 111 is slid back and forth as shown in FIG. 49.

A state in which the operation ring 111 slides to the subject side with respect to the camera main body 200, i.e., a state in which the gear 172a of the rotor 172 and the gear 177 mesh with each other (a state shown in FIG. 49) is a state of operation mode switching, which is the processing in S203 in FIG. 18 explained in the first embodiment. A state in which the operation ring 111 slides to the camera main body 200 side, i.e., a state in which the meshing of the gear 172a of the rotor 172 and the gear 177 is released is a state of the manual focus mode in which smooth zoom focus is possible.

When the operation ring 111 is slid to the subject side again, the gear 177 is pressed to the subject side by the spring 180 and about to mesh with the gear of the rotor 172. However, if a rotation shift (play) of the operation ring 111 is large, teeth of the gear of the rotor 172 and teeth of the gear 177 interfere with each other and the gear of the rotor 172 and the gear 177 do not easily mesh with each other. To prevent such a situation, if the operation ring 111 is rotated a very small amount with the rotation shift (play) reduced to a level equal to or smaller than one pitch of the gear, the gear of the rotor 172 and the gear 177 surely mesh with each other.

A slide position of the operation ring 111 is detected by the slide start detection sensor 109B including a switch and a switch substrate as shown in FIG. 45. The slide start detection sensor 109B is provided to be capable of detecting a position of the operation ring 111 slid to the subject side and a position of the operation ring 111 slid to the camera main body 200 side. The camera is switched to the manual focus by turn-off of the switch at the time when the operation ring 111 is slid to the camera main body 200 side. The camera is switched to the operation mode for switching the operation mode (the processing in S203 in FIG. 18; operation mode switching) by turn-on of the switch at the time when the operation ring 111 is slid to the subject side.

If the operation ring 111 is configured to be capable of sliding back and forth in this way, the switch can be configured to be turned on only once when the operation ring 111 is reciprocatingly slid in a front rear direction. For example, the switch is turned on in a position where the operation ring 111 is slid to the subject side and the switch is changed over from on to off when the operation ring 111 is slid to the camera main body 200 side. Then, a rotation touch of the operation ring 111 can be changed in the position where the operation ring 111 is slid to the subject side. The operation ring 111 can be used as an operation member for automatic focus in the position where the operation ring 111 is slid to the switched-off camera main body 200 side.

Further, the operation ring 111 may be pressed to the subject side or the camera main body 200 side rather than being mechanically slid. A pressure sensor that detects pressure during the pressing may be provided in the operation ring 111 or the fixed frame 122 to detect that slide operation is performed using detected pressure of the pressure sensor instead of the switch.

The embodiments of the present invention are explained above. However, the present invention is not limited to the embodiments. Various improvements and alterations are possible without departing from the spirit of the present invention.

For example, only the microcomputer for main body 214 or the microcomputer for lens 106 can be configured to execute the main flow shown in FIG. 39 (FIGS. 16 and 17) and the processing flow of the digital camera explained in the control operation for the operation ring . Alternatively, the microcomputer for main body 214 and the microcomputer for lens 106 can be configured to execute the flows in cooperation with each other.

For example, the operation ring 111 can be configured to be provided in the camera main body 200. In this case, the operation ring 111 can be provided in the camera main body 200 as a rotary operation member such as a dial.

The digital camera is not limited to the camera of the interchangeable lens type and can be a camera of an uninterchangeable lens type (a fixed lens type). In this case, for example, the operation ring 111 can be provided in a lens barrel of the camera. As explained above, the operation ring 111 can be provided as a rotary operation member such as a dial.

In the above-described digital camera, the switching of the setting is performed according to a rotation angle from the reference position of the operation ring 111 and the reference position is an absolute position. However, the reference position can be a relative position. A position of the operation ring 111 at a point when the switching of the setting of the operation mode is performed may be set as a reference position to perform the switching of the setting according to a rotation direction and a rotation amount of the operation ring 111 from the reference position. In this case, it goes without saying that, for example, like the sense of click shown in FIG. 20 and the rotation resistance shown in FIG. 21, rotation resistance of the operation ring 111 is changed according to the rotation direction and the rotation amount.

The operation ring 111 can be configured to be capable of endlessly rotating or configured to rotate only in a fixed rotation angle range such as 180 degrees. In this case, for example, if the reference position is a relative position, the operation ring 111 can be configured to be capable or endlessly rotating. If the reference position is an absolute position, the operation ring 111 can be configured to rotate only in a fixed angle range.

The embodiments of the present invention are explained above. According to the embodiments, the operability of the operation ring 111 can be set to an appropriate sense of click and appropriate weight of the operation ring 111 according to the operation modes such as the focus mode, the zoom mode, the photographing mode, the ISO sensitivity mode, the shutter speed mode, and the diaphragm mode. The display of the operation mode changed by the operation ring 111 is changed to correspond to a position and speed of the operation ring 111. Therefore, it is possible to perform display having a sense of unity with operation.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

[1. A driving control device comprising:

a fixed member;

an operation member arranged to be manually rotatable with respect to the fixed member;

a transducer arranged in one of the fixed member and the operation member and arranged to come into contact with an opposed surface of the other of the fixed member and the operation member;

a position detecting section configured to detect a position of the operation member with respect to the fixed member; and an operation force amount control section configured to control driving of the transducer to change contact friction force generated when the transducer comes into contact with the fixed member or the operation member, wherein the operation force amount control section controls the transducer such that the contact friction force applied to the operation member when the operation member is manually rotated with respect to the fixed member changes to a sense of click.]

[2. The driving control device according to claim 1, wherein the operation force amount control section changes the sense of click according to a set mode.]

[3. The driving control device according to claim 1, wherein the operation member is arranged to be capable of being manually slid with respect to the fixed member to change a mode, and the operation force amount control section controls the transducer to reduce the contact friction force when the position detecting section detects that the operation member is displaced in a slide direction or displacement force is applied to the operation member.]

[4. The driving control device according to claim 1, wherein the transducer is brought into press contact with and urged to an inner circumferential surface of the operation member.]

[5. The driving control device according to claim 4, wherein the operation force amount control section controls to drive the transducer to change oscillation amplitude in a direction of the press contact with the inner circumferential surface of the operation member.]

[6. The driving control device according to claim 1, wherein, when the operation member is not manually operated, the operation force amount control section changes the transducer to a non-driven state and fixes and holds the operation member with the contact friction force and, when the position detecting section detects that manual operation of the operation member is started, the operation force amount control section controls to drive the transducer to reduce the contact friction force of the operation member and give a sense of click.]

[7. The driving control device according to claim 1, wherein the operation force amount control section controls a driving voltage of the transducer to change oscillation amplitude of the transducer to thereby control a click force amount.]

[8. The driving control device according to claim 1, wherein the operation force amount control section repeats supply and stop of a frequency voltage as a driving voltage of the transducer to thereby give a sense of click.]

[9. The driving control device according to claim 1, wherein when the operation member is manually rotated to a predetermined rotation position or when the operation member is manually rotated to pass the predetermined rotation position, the operation force amount control section increases the contact friction force applied to the operation member and reduces rotation resistance before the predetermined rotation position, and the operation force amount control section controls the transducer to reset the contact friction force applied to the operation member in the predetermined position to an original contact friction force to thereby give a sense of click in the predetermined rotation position.]

[10. An operation device comprising:

a fixed member;

an operation member arranged to be manually rotatable with respect to the fixed member;

a load member arranged in the fixed member and configured to apply a predetermined load to the operation member when the operation member rotates;

a transducer configured to frictionally come into contact with the load member in a state in which the transducer is pressed against the load member;

a position detecting section configured to detect a relative position of the operation member with respect to the fixed member or the load member;

an operation mode setting section configured to set an operation mode; and an operation sense control section configured to control oscillation applied to the load member by the transducer to thereby change a sense of operation obtained from the operation member when the operation member is rotationally operated, wherein the operation sense control section causes the operation member to generate a sense of click corresponding to the set operation mode on the basis of an output from the position detecting section.]

[11. The operation device according to claim 10, wherein the load member includes a first rotation member that rotates in association with the rotation of the operation member and a second rotation member that is rotatably coupled to the first rotation member and in friction contact with the transducer in a state in which the second rotation member is pressed to the transducer side, and when the first rotation member is given rotation force via the operation member, rotation driving force from the first rotation member to the second rotation member is controlled by oscillation from the transducer.]

[12. The operation device according to claim 11, wherein the operation member is arranged to be capable of sliding to a first position or a second position along a rotation axis of the operation member, and when the operation member slides to the first position, the first rotation member moves to a position where the first rotation member can transmit driving force to the second rotation member and, when the operation member slides to the second position, the first rotation member moves to a position where the first rotation member cannot transmit driving force to the second rotation member.]

[13. The operation device according to claim 12, further comprising a slide start detecting section configured to detect that the operation member starts sliding to the first position or the second position, wherein the operation sense control section changes the transducer to a non-driven state and fixes and holds the second rotation member when the slide start detecting section detects that the operation member starts sliding.]

[14. The operation device according to claim 10, further comprising a storing section configured to store a mode and a setting item of the mode and a period for giving the sense of click to correspond to the setting item, wherein when the operation mode is set, the operation sense control section reads out the set mode and setting item of the mode and the period corresponding to the setting item from the storing section and controls the transducer on the basis of read-out content to change the oscillation applied to the load member.]

[15. The operation device according to claim 10, wherein the operation sense control section includes a piezoelectric body control section configured to control the transducer, and the piezoelectric body control section controls a click force amount by changing oscillation amplitude in a direction in which the transducer and the load member are pressed to come into press contact with each other.]

[16. The operation device according to claim 10, wherein the operation sense control section gives the sense of click by repeating supply and stop of a frequency voltage, which is a driving voltage for driving the transducer.]

[17. The operation device according to claim 10, wherein when the operation member is manually rotated to right from a first rotation position to a reference position, the operation sense control section performs control to gradually increase, for a predetermined time, first contact friction force applied to the operation member in the first rotation position and then change the first contact friction force to second contact friction force and gradually decrease the second contact friction force for the predetermined time and then change the second contact friction force to the first contact friction force, and when the operation member is manually rotated to left from the second rotation position to the reference position, the operation sense control section performs control to gradually increase, for the predetermined time, the first contact friction force applied to the operation member in the second rotation position and then change the first contact friction force to the second contact friction force and gradually decrease the second contact friction force for the predetermined time to change the second contact friction force to the first contact friction force, the operation sense control section thereby enabling an operator to switch the operation member in the same reference position after the sense of click is given irrespective of whether the operation member is rotated to the right or rotated to the left.]

[18. The operation device according to claim 10, wherein when the operation member is not manually operated, the operation sense control section controls to drive the transducer to be in, a non-driven state and fix and hold the operation member with contact friction force, and when the position detecting section detects that rotation operation of the operation member is started, to reduce the contact friction force of the operation member and give a sense of click corresponding to the set mode.]

*19. A digital camera comprising:*

*a fixed member;*

*an operation ring rotatable with respect to the fixed member, the operation ring including on a surface thereof a plurality of recesses;*

*a switch configured to be switched between two states, one of the two states being a regulated state in which rotation regulation of the operation ring is present, and the other of the two states being a non-regulated state in which rotation regulation of the operation ring is absent, the two states corresponding to two assigned functions of the operation ring in a photographing mode, the two functions being switched irrespective of a function other than the two functions when the switch is switched to one of the two states; and*

*a load control mechanism that regulates rotation of the operation ring in a state of being engaged with the recesses of the operation ring when the switch is switched to the regulated state,*

*wherein the regulated state has an assigned discrete diaphragm value and the non-regulated state has an assigned continuous value of focus, and*

*the operation ring is rotatable to generate an output corresponding to an assigned function of a state switched to by the switch.*

*20. The digital camera according to claim 19, wherein*

*the fixed member includes an engaging portion that engages with the switch, and*

*when the operation ring slides to move to either a first position or a second position in an optical axis direction, the switch engages with the engaging portion to perform switching to either one of the two states.*

*21. The digital camera according to claim 20, wherein when a half-pressing of a shutter is detected, a function assigned to the operation ring is controlled as focus, and regulation by the load control mechanism is cancelled.*

*22. A controlling method of a digital camera comprising:*

*causing an operation ring to rotate with respect to a fixed member, the operation ring including on a surface thereof a plurality of recesses;*

*switching, by a switch, between two states, one of the two states being a regulated state in which rotation regulation of the operation ring is present, and the other of the two states being a non-regulated state in which rotation regulation of the operation ring is absent, the two states corresponding to two functions assigned to the operation ring in a photographing mode, the two functions being switched irrespective of a function other than the two functions when the switch is switched to one of the two states; and*

*regulating, by a load control mechanism, rotation of the operation ring in a state where the load control mechanism is engaged with the recesses of the operation ring when the switch is switched to the regulated state,*

*wherein a discrete diaphragm value is assigned to the regulated state and a continuous output value of focus is assigned to the non-regulated state, and*

*output corresponding to a function assigned to a state selected by the switch is performed through the rotation operation of the operation ring.*

*23. A digital camera comprising:*

*a fixed member;*

*an operation ring rotatable with respect to the fixed member, the operation ring including on a surface thereof a plurality of recesses;*

*a switch configured to be switched between two states, one of the two states being a regulated state in which rotation regulation of the operation ring is present, and the other of the two states being a non-regulated state in which rotation regulation of the operation ring is absent, the two states corresponding to two assigned functions of the operation ring in a photographing mode, the two functions being switched irrespective of a function other than the two functions when the switch is switched to one of the two states; and*

*a load control mechanism that controls rotation resistance at a time when the operation ring rotates in a state where the load control mechanism is engaged with the recesses of the operation ring when the switch is switched to the regulated state,*

*wherein the load control mechanism causes the operation ring to generate a sense of click when the operation ring is manually rotated with respect to the fixed member.*

*24. The digital camera according to claim 23, further comprising position detecting means that detects a rotation position of the operation ring with respect to the fixed member, wherein*

*the load control mechanism causes the operation ring to generate a sense of click based on an output from the position detecting means.*

*25. The digital camera according to claim 24, wherein the load control mechanism includes*

*load means arranged in the fixed member, the load means being configured to apply a predetermined load to the operation ring when the operation ring rotates, and*

*a transducer configured to frictionally come into contact with the load means in a state where the transducer is pressed against the load means.*

*26. A digital camera comprising:*

*a fixed member;*

*an operation ring rotatable with respect to the fixed member, the operation ring including on a surface thereof a plurality of recesses;*

*a switch configured to be switched between two states, one of the two states being a regulated state in which rotation regulation of the operation ring is present, and the other of the two states being a non-regulated state in which rotation regulation of the operation ring is absent, the two states corresponding to two assigned functions of the operation ring in a photographing mode, the two functions being switched when the switch is switched to one of the two states; and*

*a load control mechanism that regulates rotation of the operation ring in a state of being engaged with the recesses of the operation ring when the switch is switched to the regulated state,*

*wherein the regulated state has an assigned discrete diaphragm value and the non-regulated state has an assigned continuous value of focus, and*

*the operation ring is rotatable to generate an output corresponding to an assigned function of a state switched to by the switch.*

*27. A controlling method of a digital camera comprising:*

*causing an operation ring to rotate with respect to a fixed member, the operation ring including on a surface thereof a plurality of recesses;*

*switching, by a switch, between two states, one of the two states being a regulated state in which rotation regulation of the operation ring is present, and the other of the two states being a non-regulated state in which rotation regulation of the operation ring is absent, the two states corresponding to two functions assigned to the operation ring in a photographing mode, the two functions being switched when the switch is switched to one of the two states; and*

*regulating, by a load control mechanism, rotation of the operation ring in a state where the load control mechanism is engaged with the recesses of the operation ring when the switch is switched to the regulated state,*

*wherein a discrete diaphragm value is assigned to the regulated state and a continuous output value of focus is assigned to the non-regulated state, and*

*output corresponding to a function assigned to a state selected by the switch is performed through the rotation operation of the operation ring.*

*28. A digital camera comprising:*

*a fixed member;*

*an operation ring rotatable with respect to the fixed member, the operation ring including on a surface thereof a plurality of recesses;*

*a switch configured to be switched between two states, one of the two states being a regulated state in which rotation regulation of the operation ring is present, and the other of the two states being a non-regulated state in which rotation regulation of the operation ring is absent, the two states corresponding to two assigned functions of the operation ring in a photographing mode, the two states being switched independently of a third function other than the two functions; and*

*a load control mechanism that regulates rotation of the operation ring in a state of being engaged with the recesses of the operation ring when the switch is switched to the regulated state,*

*wherein the regulated state has an assigned discrete diaphragm value and the non-regulated state has an assigned continuous value of focus, and*

*the operation ring is rotatable to generate an output corresponding to an assigned function of a state switched to by the switch.*

* * * * *